United States Patent
Ogawa et al.

(10) Patent No.: US 10,896,678 B2
(45) Date of Patent: Jan. 19, 2021

(54) ORAL COMMUNICATION DEVICE AND COMPUTING SYSTEMS FOR PROCESSING DATA AND OUTPUTTING ORAL FEEDBACK, AND RELATED METHODS

(71) Applicant: FACET LABS, LLC, Los Gatos, CA (US)

(72) Inventors: Stuart Ogawa, Los Gatos, CA (US); Lindsay Alexander Sparks, Seattle, WA (US); Koichi Nishimura, San Jose, CA (US); Wilfred P. So, Mississauga (CA)

(73) Assignee: FACET LABS, LLC, Los Gatos, CA (US)

(*) Notice: Subject to any disclaimer, the term of this patent is extended or adjusted under 35 U.S.C. 154(b) by 0 days.

(21) Appl. No.: 16/314,744

(22) PCT Filed: Aug. 10, 2018

(86) PCT No.: PCT/US2018/046269
§ 371 (c)(1),
(2) Date: Jan. 2, 2019

(87) PCT Pub. No.: WO2019/032996
PCT Pub. Date: Feb. 14, 2019

(65) Prior Publication Data
US 2020/0349932 A1 Nov. 5, 2020

Related U.S. Application Data

(60) Provisional application No. 62/543,777, filed on Aug. 10, 2017.

(51) Int. Cl.
*G10L 15/22* (2006.01)
*G06F 16/61* (2019.01)
(Continued)

(52) U.S. Cl.
CPC .............. *G10L 15/22* (2013.01); *G06F 3/167* (2013.01); *G06F 16/61* (2019.01);
(Continued)

(58) Field of Classification Search
CPC ... G10L 15/00–15/34; G10L 13/00–2013/105; G06F 16/61; G06F 3/167; H04L 51/02
See application file for complete search history.

(56) References Cited

U.S. PATENT DOCUMENTS

| | | | |
|---|---|---|---|
| 5,528,726 A * | 6/1996 | Cook | G10L 13/04 704/261 |
| 2011/0165912 A1* | 7/2011 | Wang | G10L 13/033 455/563 |

(Continued)

*Primary Examiner* — Abul K Azad

(57) ABSTRACT

Typical graphical user interfaces and predefined data fields limit the interaction between a person and a computing system. An oral communication device and a data enablement platform are provided for ingesting oral conversational data from people, and using machine learning to provide intelligence. At the front end, an oral conversational bot, or chatbot, interacts with a user. On the backend, the data enablement platform has a computing architecture that ingests data from various external data sources as well as data from internal applications and databases. These data and algorithms are applied to surface new data, identify trends, provide recommendations, infer new understanding, predict actions and events, and automatically act on this computed information. The chatbot then provides audio data that reflects the information computed by the data enablement platform. The system and the devices, for example, are adaptable to various industries.

17 Claims, 35 Drawing Sheets

(51) Int. Cl.
*G06F 3/16* (2006.01)
*G10L 13/033* (2013.01)
*G10L 13/047* (2013.01)
*G10L 13/08* (2013.01)
*G10L 15/05* (2013.01)
*G10L 15/18* (2013.01)
*G10L 15/30* (2013.01)
*H04L 12/58* (2006.01)

(52) U.S. Cl.
CPC ........ G10L 13/0335 (2013.01); G10L 13/047 (2013.01); G10L 13/08 (2013.01); G10L 15/05 (2013.01); G10L 15/1815 (2013.01); G10L 15/30 (2013.01); H04L 51/02 (2013.01); *G10L 2015/223* (2013.01); *G10L 2015/228* (2013.01)

(56) References Cited

U.S. PATENT DOCUMENTS

| | | |
|---|---|---|
| 2011/0208522 A1 | 8/2011 | Pereg |
| 2012/0265819 A1 | 10/2012 | McGann |
| 2013/0218339 A1 | 8/2013 | Maisonnier |
| 2013/0266925 A1 | 10/2013 | Nunamaker, Jr. et al. |
| 2014/0365216 A1 | 12/2014 | Gruber et al. |
| 2015/0012277 A1 | 1/2015 | Stephens, Jr. |
| 2015/0100157 A1 | 4/2015 | Houssin et al. |
| 2015/0373183 A1 | 12/2015 | Woolsey et al. |
| 2016/0300135 A1 | 10/2016 | Moudy et al. |
| 2017/0169816 A1 | 6/2017 | Blandin et al. |
| 2018/0166065 A1* | 6/2018 | Kepner .................. A63F 13/87 |

* cited by examiner

ORAL COMMUNICATION DEVICE AND COMPUTING SYSTEMS FOR PROCESSING DATA AND OUTPUTTING ORAL FEEDBACK, AND RELATED METHODS

CROSS-REFERENCE TO RELATED APPLICATION

This patent application claims priority to U.S. Provisional Patent Application No. 62/543,777, filed on Aug. 10, 2017, and titled "Oral Communication Device and Computing Architecture For Processing Data and Outputting User Feedback, and Related Methods", the entire contents of which are hereby incorporated by reference.

TECHNICAL FIELD

In one aspect, the following generally relates to an oral communication device and related computing architectures and methods for processing data and outputting user feedback, such as via audio or visual media, or both. In another aspect, the following generally relates to computing architectures and machine intelligence to ingest large volumes of data from many different data sources, and to output actionable data.

DESCRIPTION OF THE RELATED ART

In recent years computing technology has been developed to provide users, with computer devices, data that is actionable. Different computing architectures and software programs have been developed to ingest data and process the same. Many of the existing computing architectures are suitable for processing data from internal databases. Furthermore, the computer networks are more conventionally designed, where multiple user devices (e.g. desktop computers) access a central server or a cloud server over the Internet to input and retrieve data. However, it is herein recognized that these computing architectures and software programs are not suitable for ingesting the growing velocity, volume and variety of data. In particular, the proliferation of different types of electronic devices (e.g. machine-to-machine communication, user-oriented devices, Internet of Things devices, etc.) has increased the volume and the variety of data to be analyzed and processed.

Furthermore, users typically interact with their user devices to study the data using a keyboard and a mouse or trackpad, along with a display device (e.g. a computer monitor). With the growing popularity of tablets and mobile devices (e.g. smart phones), applications or "apps" have been developed that allow a user to see the data on built-in touchscreens. Graphical user interfaces (GUIs), such as in Customer Relations Management (CRM) software, has many input forms, tables, charts and graphs in order to visually organize the data. However, it is herein recognized that these types of computing device interactions are still complex, difficult and time consuming for a user. Furthermore, the input forms (e.g. data fields, data types, data entries, etc.) are typically predetermined by design and, therefore, limit the type of data being inputted.

These, and other technical challenges, lead to more limited outputted data and more limited automated machine actions.

BRIEF DESCRIPTION OF THE DRAWINGS

Embodiments will now be described by way of example only with reference to the appended drawings wherein.

DETAILED DESCRIPTION

Figure 1:
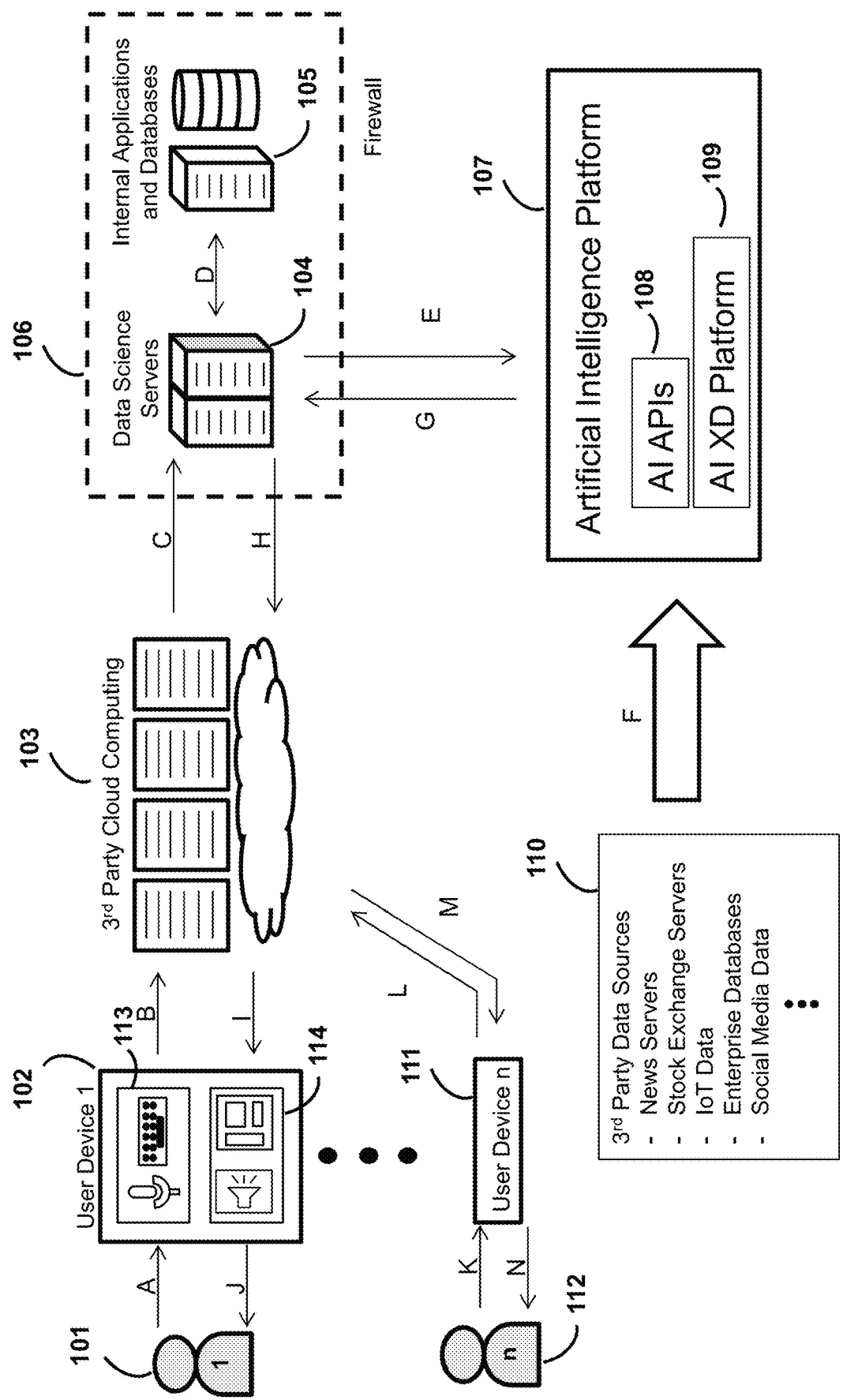
FIG. 1 is a schematic diagram of an example computing architecture for ingesting user data via user devices, and providing big data computations and machine learning using a data enablement platform.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that typical computing architectures and software programs, such as for CRMs, are limited to ingest limited types of data. These types of data are based on internal databases. However, it is herein recognized that there are many more types of data, and from different data sources, that can be used and processed to provide actionable data to a person or to machines to initiate automatic actions. For example, it is recognized that data sources can include, but are not limited to, any one or more of: data from Internet of Things (IoT) devices, CRM software, social data networks and related platforms, internal databases, data obtained via individual user devices, stock exchange platforms, news servers, blogs, third-party search engines, etc. From these example sources, it is appreciated that the types of data are varied and that the data can be constantly updating.

For example, it is herein recognized that a sales team is investigating a potential sale of product or services, which involve certain things (e.g. the product itself, supporting equipment that relates to one or more of the manufacture, storage or delivery of the product, supporting equipment or things that relate to the provision of the service). It is recognized that current CRM technology does not track these certain things in real-time. Nor does CRM technology track these certain things with high detail and accuracy, which would inform the capability and the parameters of the potential sale of the product or services.

Furthermore, it is herein recognized that in many data assistive computing systems, such as for CRM technology, the data inputs include predefined fields. A person typically uses a keyboard or a touchscreen device to input text into the predefined fields of a GUI. For example, companies such as Salesforce, Microsoft, and SugarCRM, to name a few, provide technology systems and software that are predominantly compliance driven systems and that do not encourage nor provide the right information at the right time for sales people when a new opportunity presents itself. These predefined input forms and input GUIs are processed using more typical computing software. It is herein recognized that such an approach inherently ignores utilizing the variety and the volume of data that is available for various data sources, which likely have data types and data formats that do not conform to the predefined input forms and input GUIs.

It is herein recognized that people often think, talk and act in non-predefined patterns. In other words, the thought process or a conversation between people does not typically follow predefined GUIs and predefined input forms. Using existing CRM software, a person, such as a sales associate, will need to extract their notes from a conversation and input the extracted portions of information into the predefined GUIs and input forms. This process is even more burdensome and complex when many people have a meeting, and a person must identify the relevant information to type into a predefined GUI or predefined input forms. Not only is this data entry process inefficient, but the technology inherently ignores other data from the individual's thoughts, or the conversations, or the meetings, or combinations thereof.

Furthermore, typical CRM GUIs attempt to display actionable data using various charts, diagrams, and graphs. However, this technical approach to conveying data can be overwhelming to a user's cognitive abilities. Furthermore, a user, such as a sales representative, may be multitasking (e.g. driving, trying to read other information, etc.) while trying to understand the charts, diagrams, graphs, and text, which may make understanding the information presented in the CRM GUI's even more difficult.

Furthermore, it herein recognized that existing CRM technologies lacks user devices and related computing architecture that can process oral data from a user, and interact with the user using one or more of audio and visual feedback. It is recognized these above technical challenges and others, in turn, lead to other difficulties and limitations in the context of CRM technologies.

It will be appreciated that while many of the examples relate to CRM technology and sales, the technologies described herein are applicable to other data enabling systems, also called data assistive decision making systems. For example, the devices, computing architectures and computational functionality described herein could be assistive in a military environment, a security environment, a political environment, a medical operations environment, a company operations environment, an education environment, etc.

Sales people, sales management, and senior executives continue to waste a lot of time understanding, qualifying, evaluating, and predicting sales opportunities, even when using existing CRM technologies. For example, the wasted time areas, aforementioned, begins when a new opportunity presents itself to the sales person and the amount of wasted time continues to aggregate and increase as the opportunity moves from one sales process step to the next.

Examples of wasted time to understand, qualify, evaluate and predict sales opportunities include but are not limited to:
  Salesperson working on an opportunity that is already known as not a good fit for the product or service that the company offers, but the salesperson should pursue other leads;
  Salesperson is researching the opportunity organization and doesn't realize the executive champion or the buyer has left the company;

Salesperson is spending more time researching about the target opportunity organization, the industry, the people involved with the opportunity and not enough time in front of face to face leads;

Salesperson forced to enter opportunities into a CRM system with little to no confidence in the information being entered into the CRM system, but required for compliance purposes;

Salespersons' manager evaluating all of the low to no confidence opportunities in his or her sales team and wasting time attempting to evaluate and gain confidence on these low confidence opportunities for compliance purposes; and President and CFO's evaluating low to no confidence opportunities with the intent to predict revenue knowing the pipeline revenue data is inaccurate, that a revenue shortfall is expected, and that unexpected revenue gaps will arise.

The above technical limitations of current CRM technologies can also further cause any one or more of the following: unexpected projected revenue gaps and blips; last minute forecast revenue projection corrections; inability to forecast revenue with little to no confidence; late sales opportunity pipeline discrepancies and corrections for the entire sales organization; late sales opportunity pipeline discrepancies and corrections for sales groups; late sales opportunity pipeline discrepancies and corrections for individual salespeople; inability to provide timely feedback to specific sales people with sales strategy and tactic recommendations; and inability to provide timely feedback from sales to marketing with specific successful and unsuccessful marketing campaign information that turn into successful or unsuccessful sales leads/early stage opportunities.

Therefore, one or more user devices, computing architecture and computing functionality are described herein to address one or more of the above technical challenges.

In an example embodiment, an oral communication user device (e.g. a device that includes a microphone, or some other sensor that records user's language input) records oral information from a user (e.g. the user's word and sounds) to interact with a data enablement system. The data enablement system processes the voice data to extract, at least the words and of the spoken language, and accordingly processes the data using artificial intelligence computing software and data science algorithms. The data obtained from the oral communication device is processed in combination with, or comparison with, or both, internal data specific to an organization (e.g. a given company) and external data (e.g. available from data sources outside a given company). The computing architecture ingests data from external data sources and internal data sources to provide real-time outputs or near real-time data outputs, or both. The data outputs are presented to the user as audio feedback, or visual feedback, or both. Other types of user feedback may be used, including tactile feedback. Other machine actions may be initiated or executed based on the data outputs.

In an example embodiment, the devices, systems and the methods described herein provide salespeople, sales managers, and executives with more intelligent, timely, and predictable sales opportunity and revenue information while encouraging and helping sales people to actively engage with opportunities prior to entering information into traditional CRM systems.

Turning to FIG. 1, a user device 102 interacts with a user 101. The user device 102 includes, amongst other things, input devices 113 and output devices 114. The input devices include, for example, a microphone and keyboard (e.g. physical keyboard or touchscreen keyboard, or both). The output devices include, for example, an audio speaker and a display screen. Non-limiting examples of user devices include a mobile phone, a smart phone, a tablet, a desktop computer, a laptop, an e-book, an in-car computer interface, wearable devices, augmented reality devices, and virtual reality devices. The user device is in communication with a $3^{rd}$ party cloud computing service 103, which typically includes banks of server machines. Multiple user devices 111, which correspond to multiple users 112, can communicate with the $3^{rd}$ part cloud computing service 103.

The cloud computing service 103 is in data communication with one or more data science server machines 104. These one or more data science server machines are in communication with internal application and databases 105, which can reside on separate server machines, or, in another example embodiment, on the data science server machines. In an example embodiment, the data science computations executed by the data science servers and the internal applications and the internal databases are considered proprietary to given organization or company, and therefore are protected by a firewall 106. Currently known firewall hardware and software systems, as well as future known firewall systems can be used.

The data science server machines, also called data science servers, 104 are in communication with an artificial intelligence (AI) platform 107. The AI platform 107 includes one or more AI application programming interfaces (APIs) 108 and an AI extreme data (XD) platform 109. As will be discussed later, the AI platform runs different types of machine learning algorithms suited for different functions, and these algorithms can be utilized and accessed by the data science servers 104 via an AI API.

The AI platform also is connected to various data sources 110, which may be $3^{rd}$ party data sources or internal data sources, or both. Non-limiting examples of these various data sources include: news servers, stock exchange servers, IoT data, enterprise databases, social media data, etc. In an example embodiment, the AI XD platform 109 ingests and processes the different types of data from the various data sources.

In an example embodiment, the network of the servers 103, 104, 105, 107 and optionally 110 make up a data enablement system. The data enablement system provides relevant to data to the user devices, amongst other things. In an example embodiment, all of the servers 103, 104, 105 and 107 reside on cloud servers.

An example of operations is provided with respect to FIG. 1, using the alphabetic references. At operation A, the user device 102 receives input from the user 101. For example, the user is speaking and the user device records the audio data (e.g. voice data) from the user. The user could be recording or memorializing thoughts to himself or herself, or providing himself or herself a to-do list to complete in the future, or providing a command or a query to the data enablement system. In an example embodiment, a data enablement application is activated on the user device and this application is placed into a certain mode, either by the user or autonomously according to certain conditions.

At operation B, the user device transmits the recorded audio data to the $3^{rd}$ party cloud computing servers 103. In an example embodiment, the user device also transmits other data to the servers 103, such as contextual data (e.g. time that the message was recorded, information about the user, the mode of the data enablement application during which the message was recorded, etc.). Non-limiting examples of modes of the data enablement application include: to-do list mode; opportunities mode; introductions mode; meeting notes mode; calendar mode; news mode; and other functional modes for different user applications. These servers 103 apply machine intelligence, including artificial intelligence, to extract data features from the audio data. These data features include, amongst other things: text, sentiment, emotion, background noise, a command or query, or metadata regarding the storage or usage, or both, of the recorded data, or combinations thereof.

At operation C, the servers 103 send the extracted data features and the contextual data to the data science servers 104. In an example embodiment, the servers 103 also send the original recorded audio data to the data science servers 104 for additional processing.

At operation D, the data science servers 104 interact with the internal applications and databases 105 to process the received data. In particular, the data science servers store and executed one or more various data science algorithms to process the received data (from operation C), which may include processing proprietary data and algorithms obtained from the internal applications and the databases 105.

In alternative, or in addition to operation D, the data science servers 104 interact with the AI platform 107 at operations E and G. In an example embodiment, the data science servers 104 have algorithms that process the received data, and these algorithms transmit information to the AI platform for processing (e.g. operation E). The information transmitted to the AI platform can include: a portion or all of the data received by the data science servers at operation C; data obtained from internal applications and databases at operation D; results obtained by the data science servers from processing the received data at operation C, or processing the received data at operation D, or both; or a combination thereof. In turn, the AI platform 107 processes the data received at operation E, which includes processing the information ingested from various data sources 110 at operation F. Subsequently, the AI platform 107 returns the results of its AI processing to the data science servers in operation G.

Based on the results received by the data science servers 104 at operation G, the data science servers 104, for example, updates its internal applications and databases 105 (operation D) or its own memory and data science algorithms, or both. The data science servers 104 also provide an output of information to the $3^{rd}$ party cloud computing servers 104 at operation H. This outputted information may be a direct reply to a query initiated by the user at operation A. In another example, either in alternative or in addition, this outputted information may include ancillary information that is either intentionally or unintentionally requested based on the received audio information at operation A. In another example, either in alternative or in addition, this outputted information includes one or more commands that are either intentionally or unintentionally initiated by received audio information at operation A. These one or more commands, for example, affect the operation or the function of the user device 102, or other user devices 111, or IoT devices in communication with the $3^{rd}$ party cloud computing servers 104, or a combination thereof.

In an example embodiment at operation H and I, the text data along with the current mode of the data enablement application is sent to the user device 102, and the user device 102 locally uses a synthesized voice library and the text to generate and output spoken audio data at operation J. After the user device receives the text data, the user device and the current mode, the user device propagates this text data to other modes of the data enablement application, even though they are not being currently activated.

In an alternative example embodiment, the $3^{rd}$ party cloud computing servers 104 take the data received at operation H and applies transformation to the data, so that the transformed data is suitable for output at the user device 102. For example, the servers 104 receive text data at operation H, and then the servers 104 transform the text data to spoken audio data. This spoken audio data is transmitted to the user device 102 at operation I, and the user device 102 then plays or outputs the audio data to the user at operation J.

This process is repeated for various other users 112 and their user devices 111. For example, another user speaks into another user device at operation K, and this audio data is passed into the data enablement platform at operation L. The audio data is processed, and audio response data is received by the another user device at operation M. This audio response data is played or outputted by the another user device at operation N.

In some other example embodiments, the user uses one or more of touchscreen gestures, augmented reality gestures or movements, neuromuscular gestures, brain signal inputs, virtual reality gestures or movements, typing, etc. to provide inputs into the user device 102 at operation A, either in addition or in alternative to the oral input. In another example embodiment, the user device 102 provides visual information (e.g. text, video, pictures) either in addition or in alternative to the audio feedback at operation J.

Figure 2:
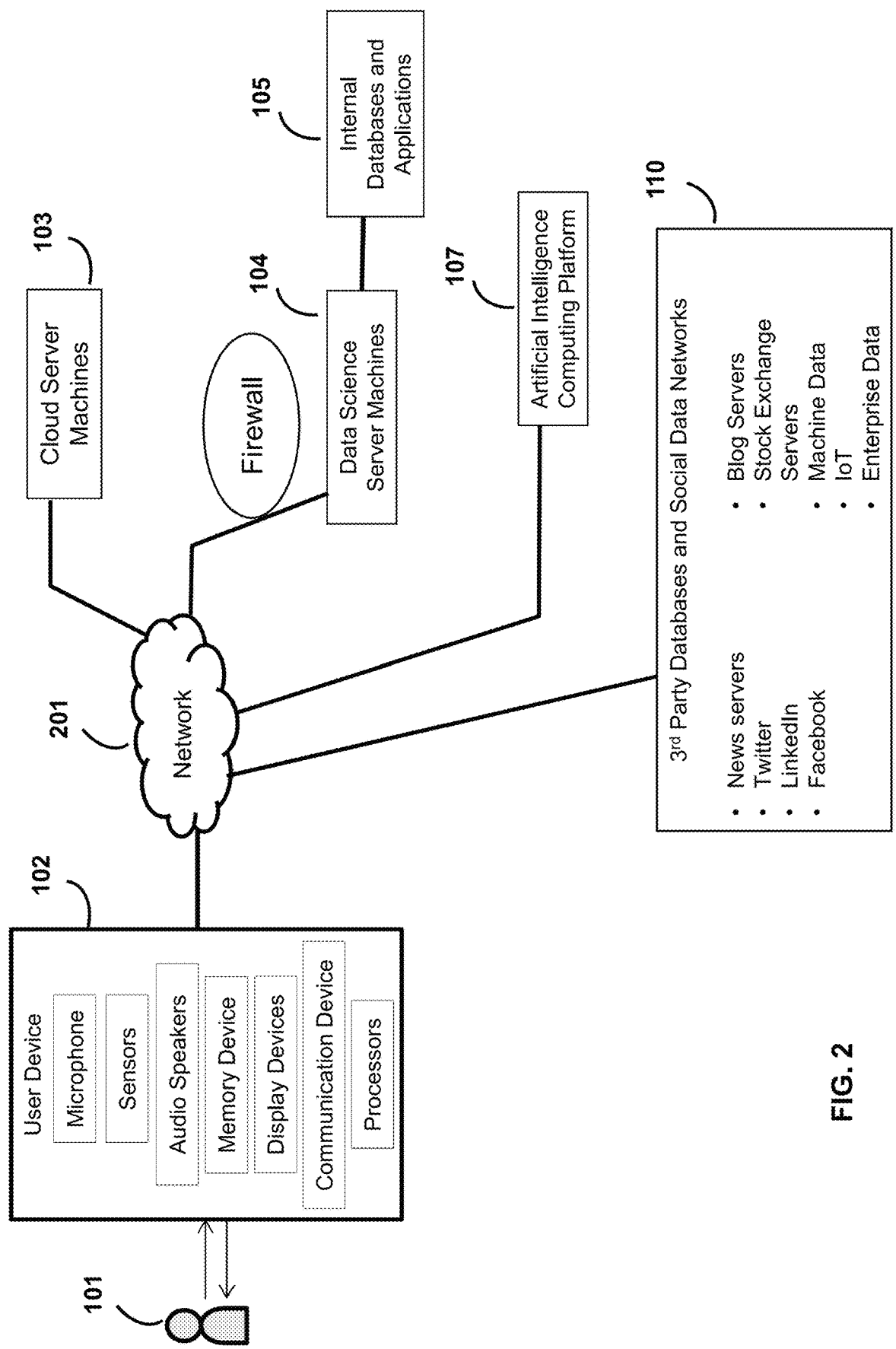
FIG. 2 is another schematic diagram, show another representation of the computing architecture in FIG. 1.

Turning to FIG. 2, another example of the servers and the devices are shown in a different data networking configuration. The user device 102, the cloud computing servers 103, the data science servers 104, AI computing platform 107, and the various data sources 110 are able to transmit and receive data via a network 201, such as the Internet. In an example embodiment, the data science servers 104 and the internal applications and databases 105 are in communication with each other over a private network for enhanced data security. In another example embodiment, the servers 104 and the internal applications and the databases 105 are in communication with each other over the same network 201.

As shown in FIG. 2, example components of the user device 102 include a microphone, one or more other sensors, audio speakers, a memory device, one or more display devices, a communication device, and one or more processors.

In an example embodiment, the user device's memory includes various "bots" that are part of the data enable application, which can also reside on the user device. In an example aspect, the one or more bots are considered chat bots or electronic agents. These bots include processing that also resides on the $3^{rd}$ party cloud computing servers 103. Examples of chat bot technologies that can be adapted to the system described herein include, but are not limited to, the trade names Siri, Google Assistant, and Cortana. In an example aspect, the bot used herein has various language dictionaries that are focused on various industries (e.g. including, but not limited to, sales and marketing terminology). In an example aspect, the bot used herein is configured to understand questions and answers specific to various industries (e.g. sales and marketing, etc.). In an example embodiment, the chat bots have access to different voice libraries associated with different people, and can speak using a synthesized voice using a given one of the voice libraries.

In an example aspect, the bot used herein learns the unique voice of the user, which the bot consequently uses to learn behavior that may be specific to the user. This anticipated behavior in turn is used by the data enablement system to anticipate future questions and answers related to a given topic. This identified behavior is also used, for example, to make action recommendations to help the user achieve a result, and these action recommendations are based on the identified behaviors (e.g. identified via machine learning) of successful users in the same industry. In an example application, the questions and answers are for a given sales opportunity, and the recommendations and the behaviors relates to achieving sales and marketing goals.

In an example aspect, the bot applies machine learning to identify unique data features in the user voice. Machine learning can include, deep learning. Currently known and future known algorithms for extracting voice features are applicable to the principles described herein. Non-limiting examples of voice data features include one or more of: tone, frequency (e.g. also called timbre), loudness, rate at which a word or phrase is said (e.g. also called tempo), phonetic pronunciation, lexicon (e.g. choice of words), syntax (e.g. choice of sentence structure), articulation (e.g. clarity of pronunciation), rhythm (e.g. patterns of long and short syllables), and melody (e.g. ups and downs in voice). As noted above, these data features can be used identify behaviors and meanings of the user, and to predict the content, behavior and meaning of the user in the future. It will be appreciated that prediction operations in machine learning include computing data values that represent certain predicted features (e.g. related to content, behavior, meaning, action, etc.) with corresponding likelihood values.

The user device may additional or alternatively receive video data or image data, or both, from the user, and transmit this data via a bot to the data enablement platform. The data enablement platform is therefore configured to apply different types of machine learning to extract data features from different types of received data. For example, the $3^{rd}$ party cloud computing servers use natural language processing (NLP) algorithms or deep neural networks, or both, to process voice and text data. In another example, the $3^{rd}$ party cloud computing servers use machine vision, or deep neural networks, or both, to process video and image data.

Figure 3:
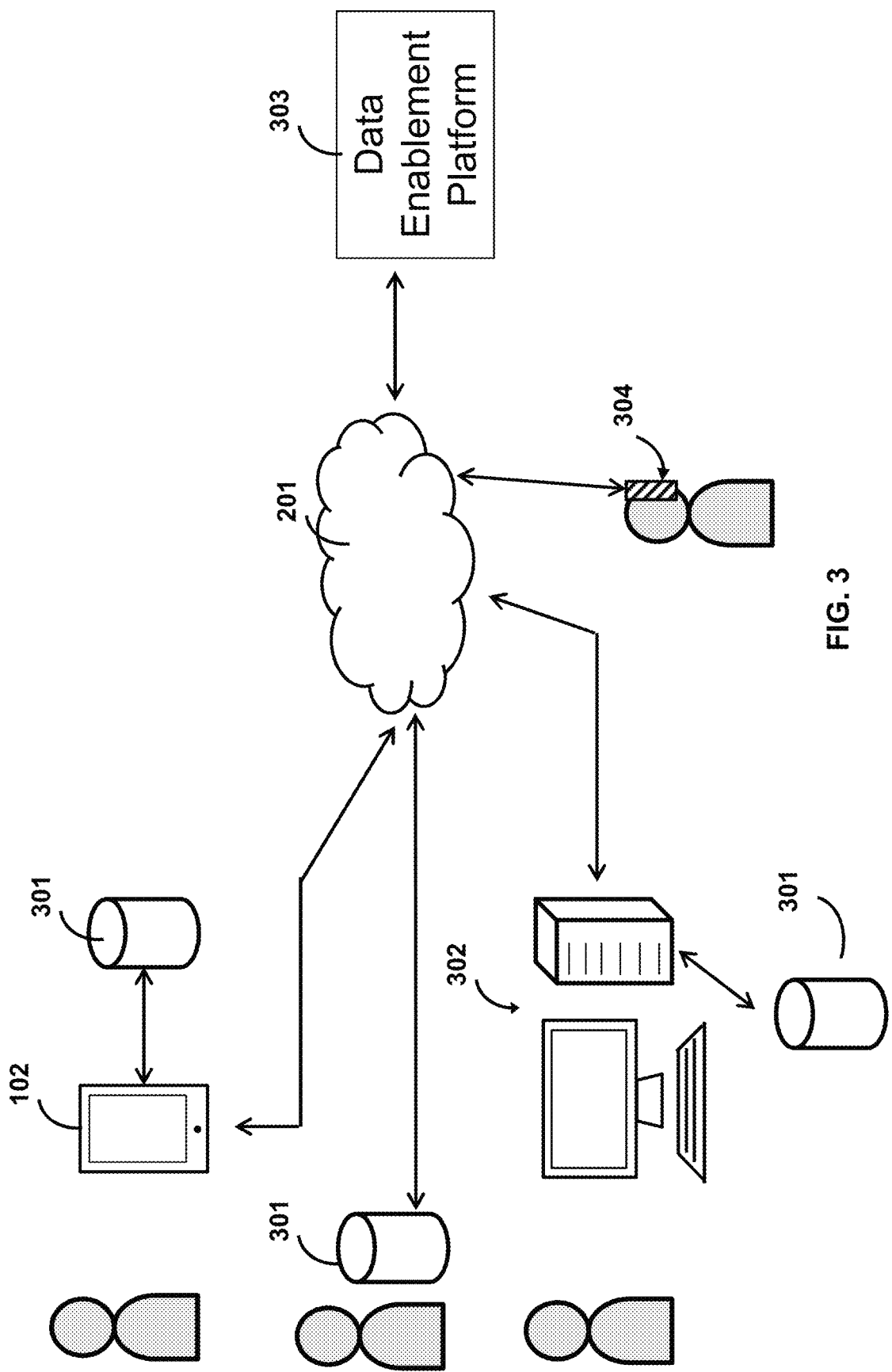
FIG. 3 is a schematic diagram of oral communication devices (OCDs) in communication with respective user devices, which are in turn in communication with the data enablement platform.

Turning to FIG. 3, an example embodiment of an oral communication device (OCD) 301 is shown, which operates in combination with the user device 102 to reduce the amount of computing resources (e.g. hardware and processing resources) that are consumed by the user device 102 to execute the data enablement functions, as described herein. In some cases, the OCD 301 provides better or additional sensors than a user device 102. In some cases, the OCD 301 is equipped with better or additional output devices compared to the user device 102. For example, the OCD includes one or more microphones, one or more cameras, one or more audio speakers, and one or more multimedia projects which can project light onto a surface. The OCD also includes processing devices and memory that can process the sensed data (e.g. voice data, video data, etc.) and process data that has been outputted by the data enablement platform 303. As noted above, the data enablement platform 303 includes, for example, the servers 103, 104, 105, and 107.

As shown in FIG. 3, the OCD 301 is in data communication with the user device via a wireless or wired data link. In an example embodiment, the user device 102 and the OCD 301 are in data communication using a Bluetooth protocol. The user device 102 is in data communication with the network 201, which is in turn in communication with the data enablement platform 303. In operation, when a user speaks or takes video, the OCD 301 records the audio data or visual data, or both. The OCD 301, for example, also pre-processes the recorded data, for example, to extract data features. The pre-processing of the recorded data may include, either in addition or in the alternative, data compression. This processed data or the original data, or both, are transmitted to the user device 102, and the user device transmits this data to the data enablement platform 303, via the network 201. The user device 102 may also transmit contextual data along with the data obtained or produced by the OCD 301. This contextual data can be generated by the data enablement application running on the user device 102, or by the OCD 301.

Outputs from the data enablement platform 303 are sent to the user device 102, which then may or may not transmit the outputs to the OCD 301. For example, certain visual data can be displayed directly on the display screen of the user device 102. In another example embodiment, the OCD receives the inputs from the user device and provides the user feedback (e.g. plays audio data via the speakers, displays visual data via built-in display screens or built-in media projectors, etc.).

In an example embodiment, the OCD 301 is in data connection with the user device 102, and the OCD 301 itself has a direct connection to the network 201 to communicate with the data enablement platform 303.

Similar functionality is applicable to the other instance of the OCD 301 that is in data communication with the desktop computer 302. In particular, it is herein recognized that many existing computing devices and user devices are not equipped with sensors of sufficient quality, nor with processing hardware equipped to efficiently and effectively extract the features from the sensed data. Therefore, the OCD 301 supplements and augments the hardware and processing capabilities of these computing devices and user devices.

In an example embodiment, a different example of a silent OCD 304 is used to record the language inputs of the user. The silent OCD 304 includes sensors that detects other user inputs, but which are not the voice. Examples of sensors in the silent OCD 304 include one or more of: brain signal sensors, nerve signal sensors, and muscle signal sensors. These sensors detect silent gestures, thoughts, micro movements, etc., which are translated to language (e.g. text data). In an example embodiment, these sensors include electrodes that touch parts of the face or head of the user. In other words, the user can provide language inputs without having to speaking into a microphone. The silent OCD 304, for example, is a wearable device that is worn on the head of the user. The silent OCD 304 is also sometimes called a silent speech interface or a brain computer interface. The silent OCD 304, for example, allows a user to interact with their device in a private manner while in a meeting (see FIG. 4A) or in public.

Figure 4A:
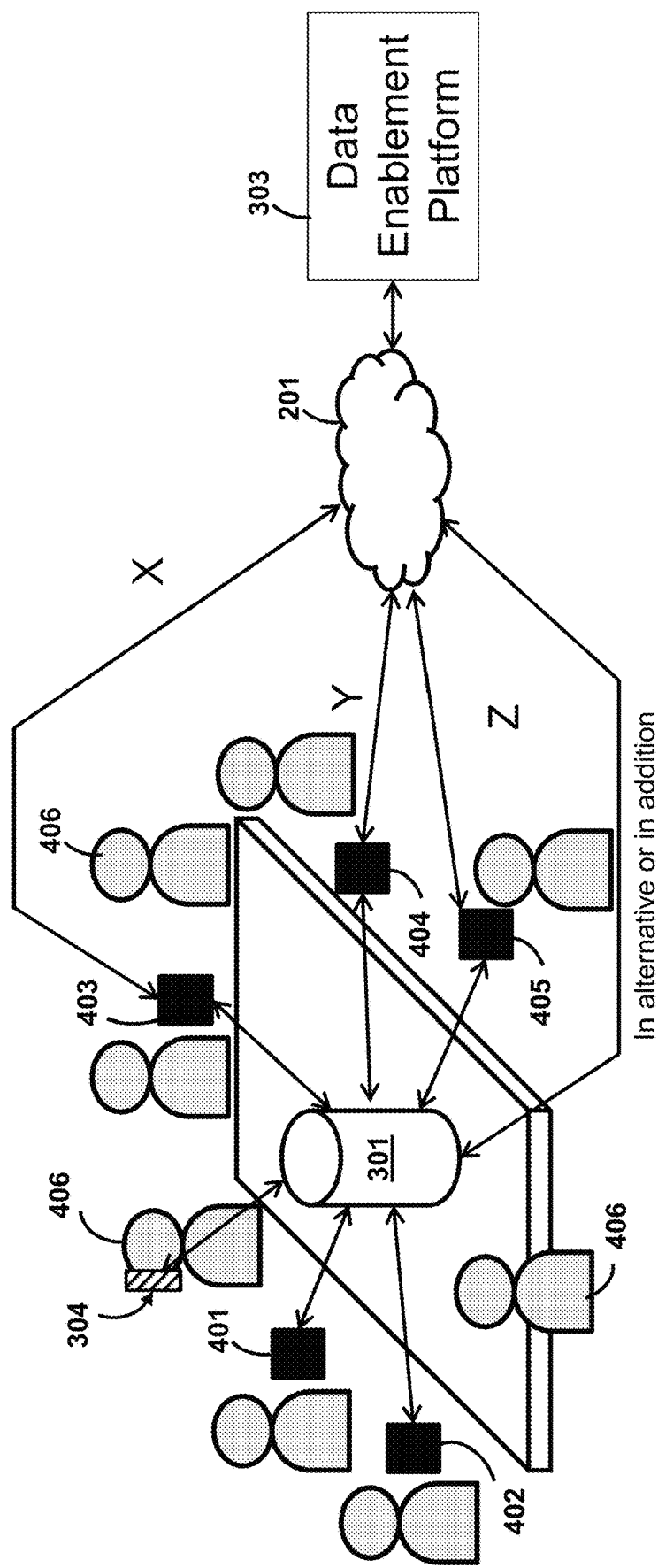
FIG. 4A is a schematic diagram showing an OCD being used in a meeting and showing the data connections between various devices and the data enablement platform.

Turning to FIG. 4A, the OCD 301 and the corresponding data enablement application is shown being used in a meeting notes mode with various people, each having their own respective user devices. 401, 402, 403, 404, 405, 304. The OCD can also be used to record data (e.g. audio data, visual data, etc.) and provide data to people that do not have their own user device. The OCD records the oral conversation of the meeting to, for example, take meeting notes. In another aspect, the OCD also links to the user devices to give them information, for example, in real-time about the topics being discussed during the meeting. The OCD also reduces the computing resources (e.g. hardware and processing resources) on the individual user devices.

In an example embodiment, the user 406 wears a silent OCD 304 to privately interact using with the OCD 301. For example, the user's brain signals, nerve signals, muscle signals, or a combination thereof, are captured are synthesized into speech. In this way, the user 406 can at times give private or silent notes, commands, queries, etc. to the OCD 301, and at other times, provide public notes, commands, queries, etc. to the OCD 301 that are heard by the other users in the meeting.

In an example embodiment, the user devices 401, 402, 403, 404, 405, 304 are in data communication with the OCD 301 via a wireless connection, or a wired connection. In an example embodiment, some of the user devices 401, 402 do not have Internet access, but other user devices 403, 404, 405 do have Internet access over separate data connections X, Y and Z. Therefore, the OCD 301 uses one or more of these data connections X, Y and Z to transmit and receive data from the data enablement platform 303.

The OCD may use different communication routes based on the available bandwidth, which may be dictated by the user devices.

For example, the OCD parses a set of data to be transmitted to the data enablement platform into three separate data threads, and transmits these threads respectively to the user devices 403, 404 and 405. In turn, these data threads are transmitted by the user devices over the respective data connections X, Y and Z to the data enablement platform 303, which reconstitute the data from the separate threads into the original set of data.

Alternatively, the OCD uses just one of the data connections (e.g. X) and therefore funnels the data through the user device 403.

In another example embodiment, the OCD designates the data connections X and Y, corresponding to the user deices 403 and 404, for transmitting data to the data enablement platform 303. The OCD designates the data connection Z, corresponding to the user device 405, for receiving data from the data enablement platform 303.

The data obtained by the OCD, either originating from a user device or the data enablement platform, can be distributed amongst the user devices that are in communication with the OCD. The OCD can also provide central user feedback (e.g. audio data, visual data, etc.) to the users in the immediate vicinity.

It will be appreciated that the OCD therefore acts as a local input and output device that is central to the group of users. In another example aspect, the OCD also acts as a local central processing device to process the sensed data, or processed the data from the data enablement platform, or both. In another example aspect, OCD also acts as a local central communication hub.

In an example embodiment, the OCD, either in the alternative or in addition, the OCD has its own network communication device and transmits and receives data, via the network 201, with the data enablement platform 303.

The OCD provides various functions in combination with the data enablement platform 303. In an example operation, the OCD provides an audio output that orally communicates the agenda of the meeting. In an example operation, the OCD records the discussion items that are spoken during the meeting, and automatically creates text containing meeting minutes. In an example operation, the OCD monitors the flow of the discussion and the current time, and at appropriate times (e.g. after detecting one or more of: pauses, hard stops, end of sentences, etc.) the OCD interjects to provide audio feedback about moving on to the next agenda item that is listed in the agenda. A pause, for example, is a given time period of silence.

In an example operation, the OCD monitors topics and concepts being discussed and, in real-time, distributes ancillary and related data intelligence to the user devices. In an example operation, the OCD monitors topics and concepts being discussed and, in real-time, determines if pertinent related news or facts are to be shared and, if so, interjects the conversation by providing audio or visual outputs (or both) that provides the pertinent related news or facts. In an example aspect, the OCD interjects and provides the audio or visual outputs (or bot) at appropriate times, such as after detecting one or more of: a pause (e.g. a time period of silence), a hard stop, an end of a sentence, etc.

In another example operation, the OCD monitors topics and concepts being discussed and, in real-time, determines if a user provided incorrect information and, if so, interjects the conversation by providing audio or visual output that provides the correct information. For example, the determination of incorrectness is made by comparing the discussed topics in real-time with trusted data sources (e.g. newspapers, internal databases, government websites, etc.).

In another example operation, the OCD provides different feedback to different user devices, to suit the interests and goals specific the different users, during the meeting.

In another example operation, the OCD uses cameras and microphones to record data to determine the emotion and sentiment of various users, which helps to inform decision making.

In another example operation, each of the users can use their user devices in parallel to interact with the OCD or the data enablement platform, or both, to conduct their own research or make private notes (or both) during the meeting.

In another example aspect, private notes of a given user can be made using their own device (e.g. a device like the silent OCD 304 and the device 401), and public notes can be made based on the discussion recorded at threshold audible levels by the OCD 301. The private notes for example, can also be recorded orally or by silent speech using the silent OCD 304. For the given user, the data enablement platform, or their own user device, will compile and present a compilation of both the given user's private notes and public notes that are organized based on time of creation or recordation. For example:

@t1: public notes;
@t2: public notes+given user's private notes;
@t3: public notes
@t4: given user's private notes;
@t5: public notes+given user's private notes.

In another example embodiment, the OCD includes one or more media projectors to project light images on surrounding surfaces.

It will be appreciated that while the housing body of the OCD is shown to be cylindrical, in other example embodiments, it has different shapes.

Figure 4B:
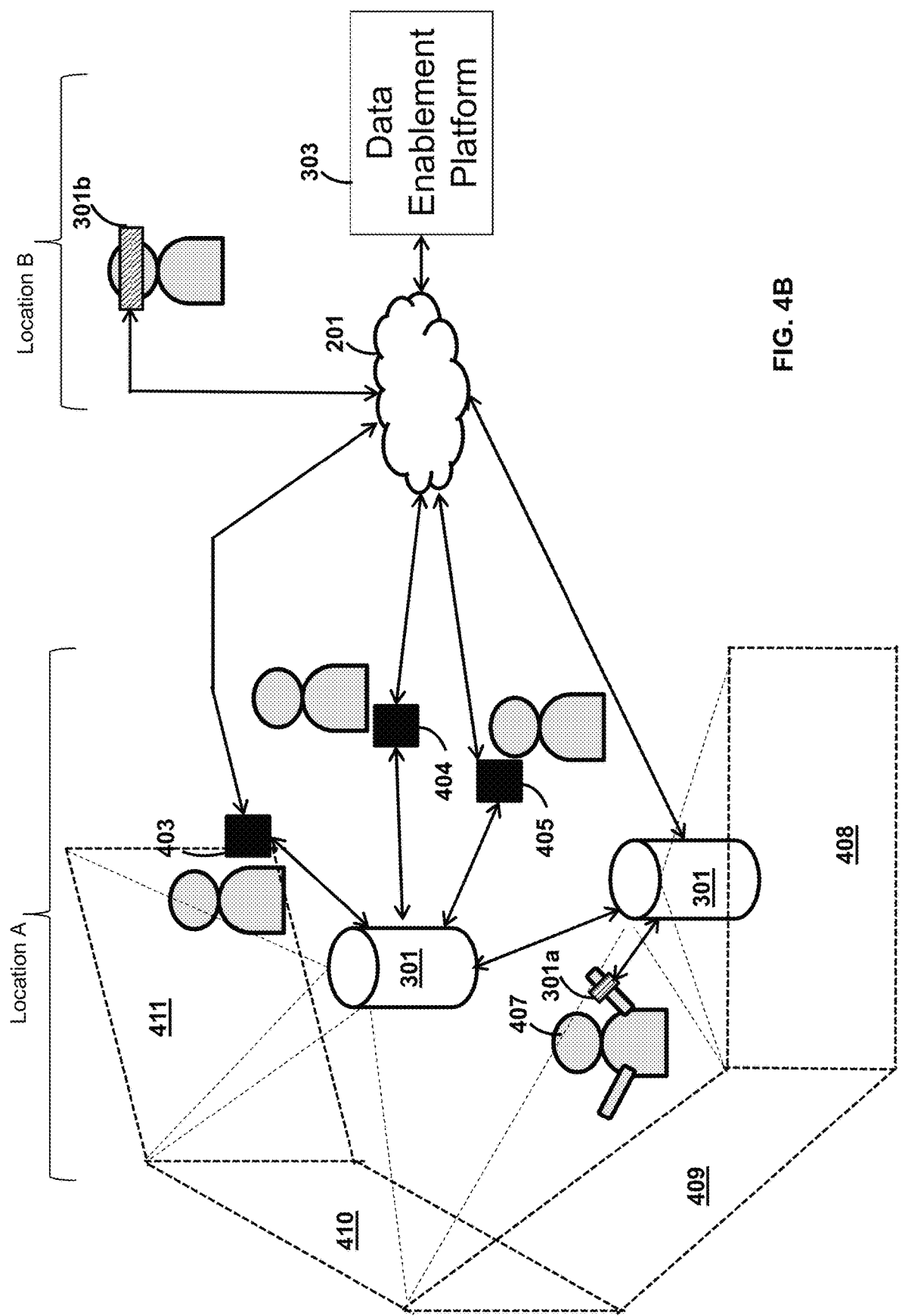
FIG. 4B is a schematic diagram showing different embodiments of an OCD, including wearable devices, and an OCD embodiment configured to provide augmented reality or virtual reality.

Turning to FIG. 4B, users in Location A are interacting with one or more OCDs, and a user in a separate location (i.e. Location B) is interacting with another OCD. Together, these users, although at different locations can interact with each through digital voice and imagery data. The data enablement platform processes their data inputs, which can include voice data, image data, physical gestures and physical movements. These data inputs are then used to by the data enablement platform to provide feedback to the users.

At Location A, two OCD units 301 are in data communication with each other and project light image areas 411,

410, 409, 408. These projected light image areas are positioned in a continuous fashion to provide, in effect, a single large projected light image area that can surround or arc around the users. This produces an augmented reality or virtual reality room. For example, one OCD unit projects light image areas 411 and 410, and another OCD unit projects light image areas 409 and 408.

Also at Location A is a user 407 that is wearing another embodiment of an OCD 301*a*. This embodiment of the OCD 301*a* includes a microphone, audio speakers, a processor, a communication device, and other electronic devices to track gestures and movement of the user. For example, these electronic devices include one or more of a gyroscope, an accelerometer, and a magnetometer. In an example embodiment, the OCD 301*a* is trackable using triangulation computed from radio energy signals from the two OCD units 301 positioned at different locations (but both within Location A).

The users at Location A can talk and see the user at Location B.

Conversely, the user at Location B is wearing a virtual reality or augmented reality headset, which is another embodiment of an OCD 301*b*, and uses this to talk and see the users at Location A. The OCD embodiment 301*b* projects or displays images near the user's eyes, or onto the user's eyes. The OCD embodiment 301*b* also includes a microphone, audio speaker, processor, and communication device, amongst other electronic components. Using the OCD embodiment 301*b*, the user is able to see the same images being projected onto one or more of the image areas 411, 410, 409, and 408.

Figure 5:
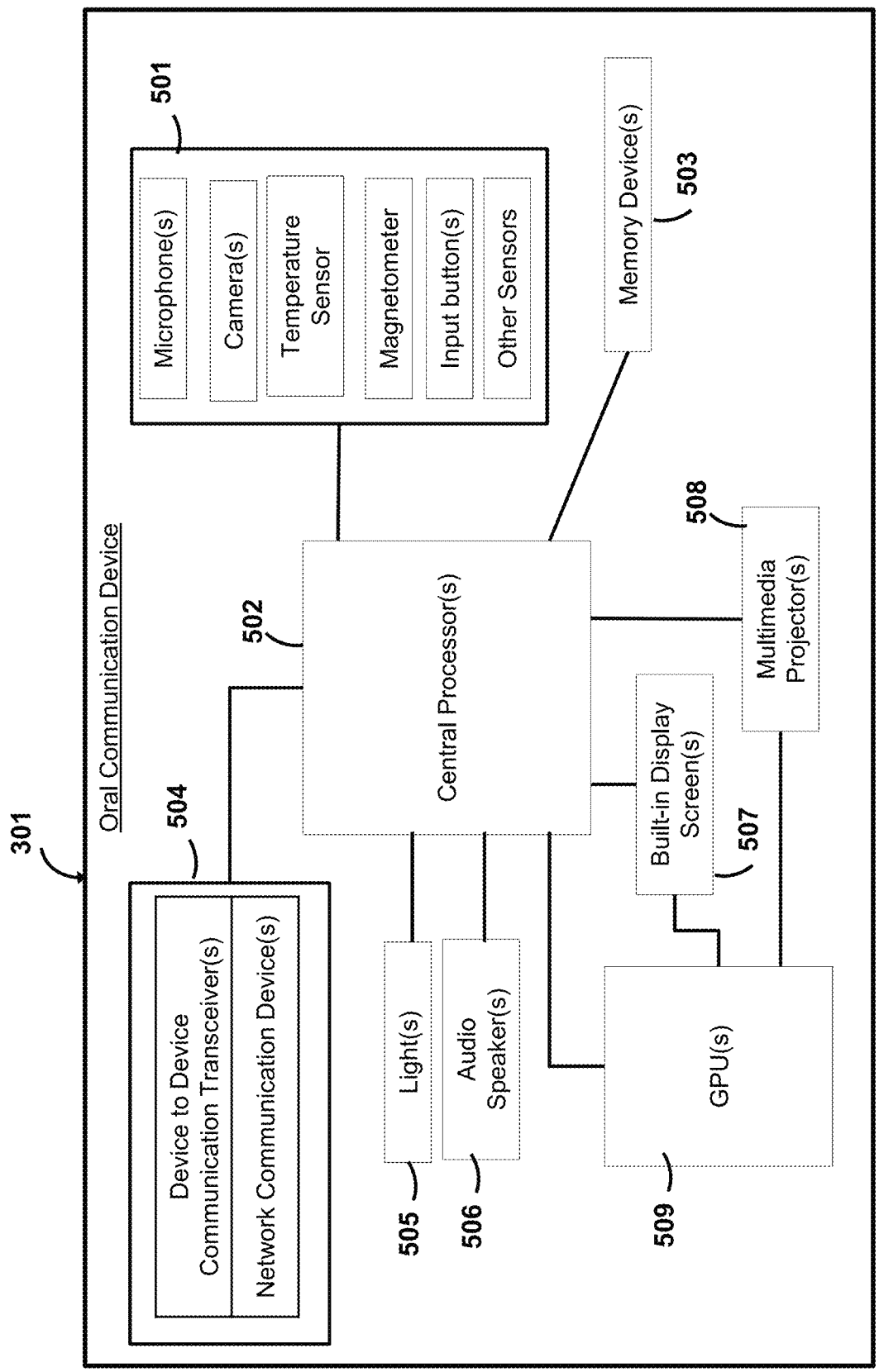
FIG. 5 is a block diagram showing example components of the OCD.

Turning to FIG. 5, example components that are housed within the OCD 301 are shown. The components include one or more central processors 502 that exchange data with various other devices, such as sensors 501. The sensors include, for example, one or more microphones, one or more cameras, a temperature sensor, a magnetometer, one or more input buttons, and other sensors.

In an example embodiment, there are multiple microphones that are oriented to face in different directions from each other. In this way, the relative direction or relative position of an audio source can be determined. In another example embodiment, there are multiple microphones that are tuned or set to record audio waves at different frequency ranges (e.g. a microphone for a first frequency range, a microphone for a second frequency range, a microphone for a third frequency range, etc.). In this way, more definition of audio data can be recorded across a larger frequency range.

In an example embodiment, there are multiple cameras that are oriented to face in different directions. In this way, the OCD can obtain a 360 degree visual field of view. In another example, one or more cameras have a first field of a view with a first resolution and one or more cameras have a second field of view with a second resolution, where the first field of view is larger than the second field of view and the first resolution is lower than the second resolution. In a further example aspect, the one or more cameras with the second field of view and the second resolution can be mechanically oriented (e.g. pitched, yawed, etc.) while the one or more cameras with the first field of view and the first resolution are fixed. In this way, video and images can be simultaneously taken from a larger perspective (e.g. the surrounding area, people's bodies and their body gestures), and higher resolution video and images can be simultaneously taken for certain areas (e.g. people faces and their facial expressions).

The OCD also includes one or more memory devices 503, lights 505, one or more audio speakers 506, one or more communication devices 504, one or more built-in-display screens 507, and one or more media projectors 508. The OCD also includes one or more graphics processing units (GPUs) 509. GPUs or other types of multi-threaded processors are configured for executing AI computations, such as neural network computations. The GPUs are also used, for example, to process graphics that are outputted by the multimedia projector(s) or the display screen(s) 507, or both.

In an example embodiment, the communication devices include one or more device-to-device communication transceivers, which can be used to communicate with one or more user devices. For example, the OCD includes a Bluetooth transceiver. In another example aspect, the communication devices include one or more network communication devices that are configured to communicate with the network 201, such as a network card or WiFi transceiver, or both.

In an example embodiment, there are multiple audio speakers 506 positioned on the OCD to face in different directions. In an example embodiment, there are multiple audio speakers that are configured to play sound at different frequency ranges.

In an example embodiment, the built-in display screen forms a curved surface around the OCD housing body. In an example embodiment, there are multiple media projectors that project light in different directions.

In an example embodiment, the OCD is able to locally pre-process voice data, video data, image data, and other data using on-board hardware and machine learning algorithms. This reduces the amount of data being transmitted to the data enablement platform 303, which reduced bandwidth consumption. This also reduces the amount of processing required by the data enablement platform.

Figure 6:
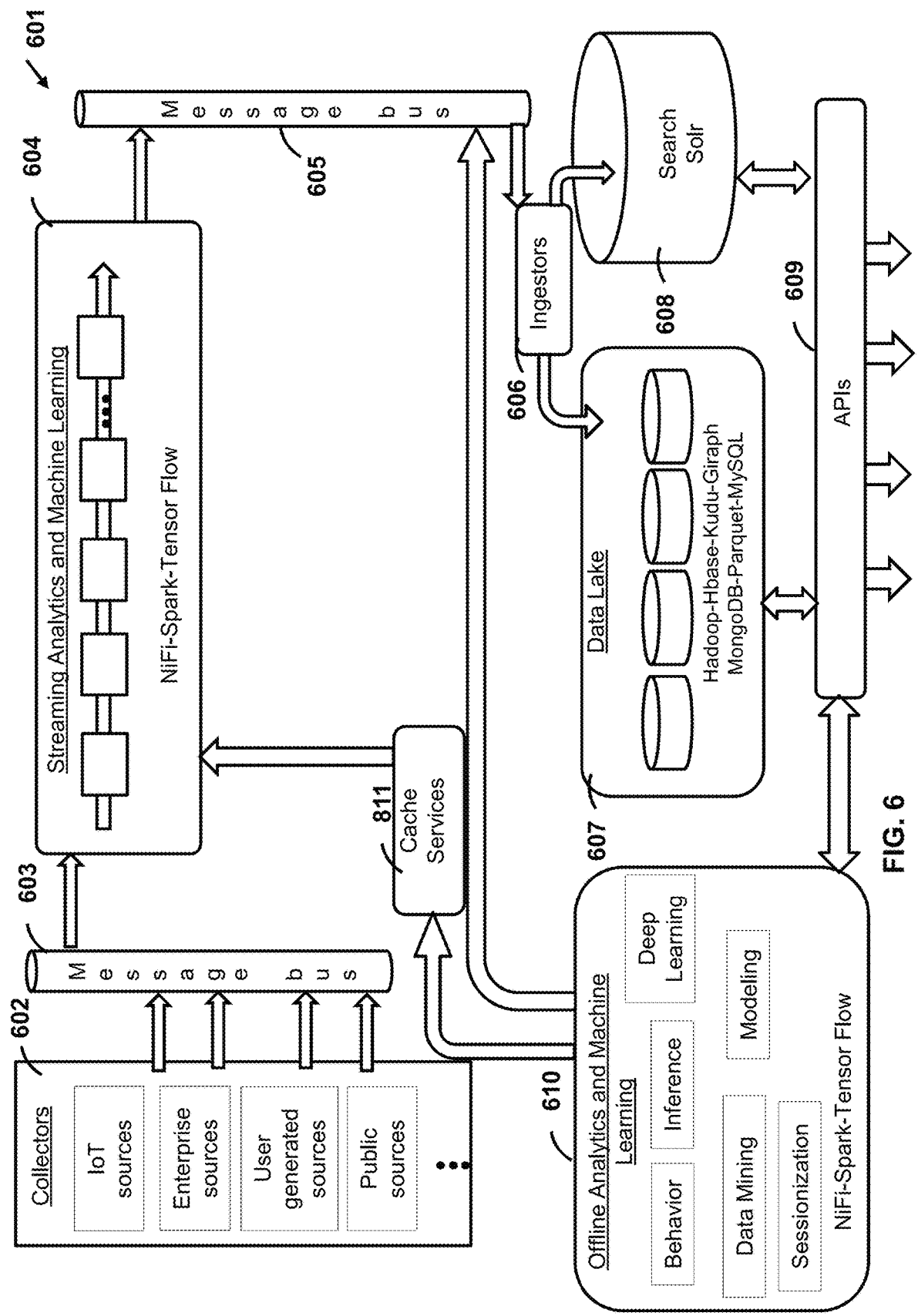
FIG. 6 is a schematic diagram showing an example computing architecture for an artificial intelligence (AI) platform, which is part of the data enablement platform.
Figure 7:
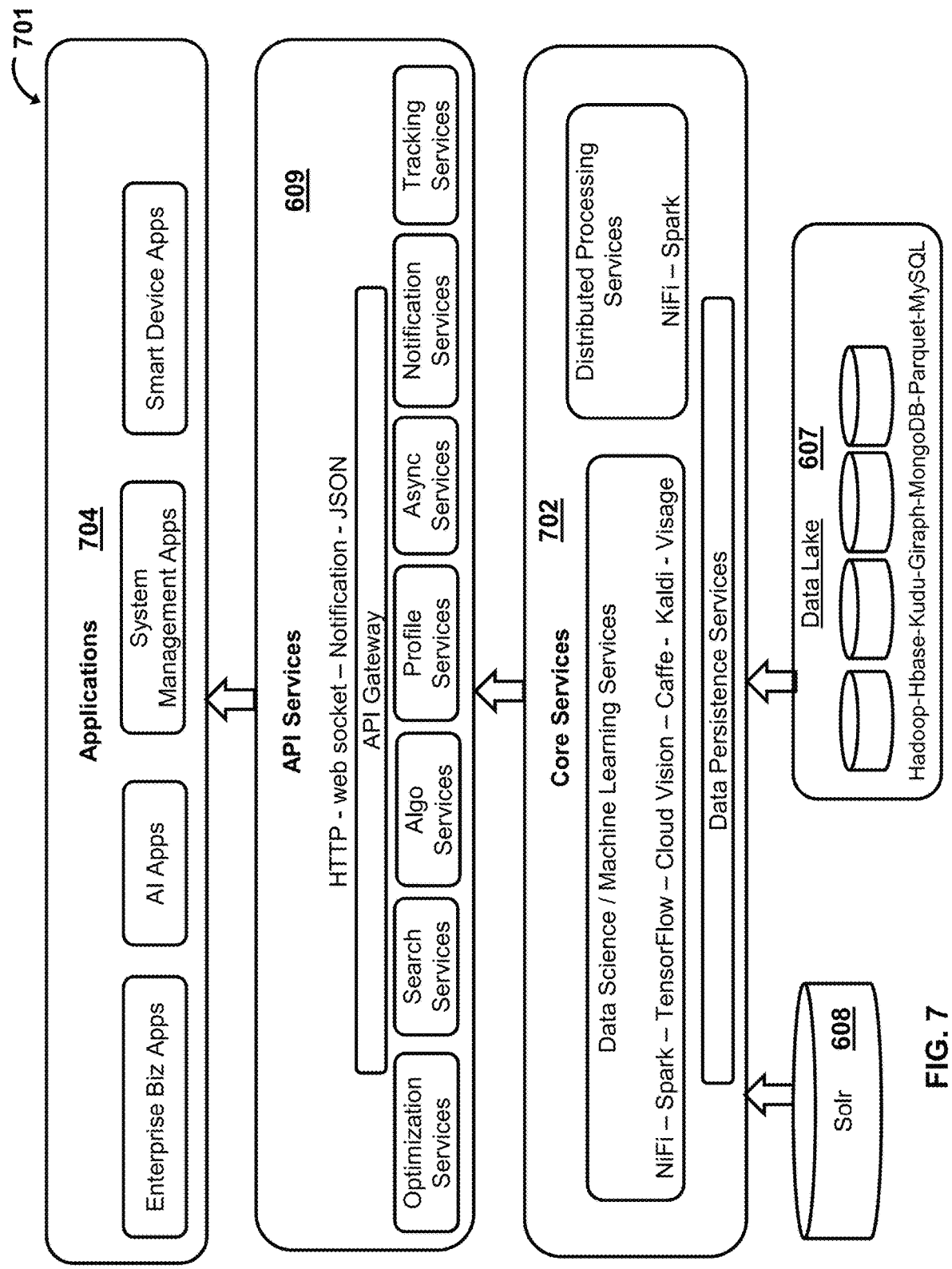
FIG. 7 is a schematic diagram showing another example aspect of the computing architecture for the AI platform.

FIGS. 6 and 7 show example computing architectures of the data enablement platform, which are in alternative to the above-discussed architectures. In another example, these computing architectures shown in FIGS. 6 and 7 are incorporated into the above-discussed architectures.

Turning to FIG. 6, an example computing architecture 601 is provided for collecting data and performing machine learning on the same. This architecture 601, for example, is utilized in the AI platform 107.

The architecture 601 includes one or more data collector modules 602 that obtain data from various sources, such as IoT devices, enterprise software, user generated websites and data networks, and public websites and data networks. Non-limiting examples of IoT devices include sensors used to determine the status of products (e.g. quantity of product, current state of product, location of product, etc.). IoT devices can also be used to determine the status of users (e.g. wearable devices). IoT devices can also be used to determine the state of equipment, environment, and facilities that facilitate the ability for a company to provide product or service, or both. Enterprise software can include CRM software and sales software. User generated data includes social data networks, messaging applications, blogs, and online forums. Public websites and data networks include government websites and databases, banking organization websites and databases, economic and financial affairs websites and databases. It can be appreciated that other digital data sources may be collected by the data collector modules.

The collected data is transmitted via a message bus 603 to a streaming analytics engine 604, which applies various data transforms and machine learning algorithms. For example, the streaming analytics engine 604 has modules to transform the incoming data, apply language detection, add custom tags to the incoming data, detect trends, and extract objects and meaning from images and video. It will be appreciated that other modules may be incorporated into the engine 604. In an example implementation, the engine 604 is structured using one or more of the following big data computing approaches: NiFi, Spark and TensorFlow.

NiFi automates and manages the flow of data between systems. More particularly, it is a real-time integrated data logistics platform that manages the flow of data from any source to any location. NiFi is data source agnostic and supports different and distributes sources of different formats, schemas, protocols, speeds and sizes. In an example implementation, NiFi operates within a Java Virtual Machine architecture and includes a flow controller, NiFi extensions, a content repository, a flowfile repository, and a provenance repository.

Spark, also called Apache Spark, is a cluster computing framework for big data. One of the features of Spark is Spark Streaming, which performs streaming analytics. It ingests data in mini batches and performs resilient distributed dataset (RDD) transformations on these mini batches of data.

TensorFlow is software library for machine intelligence developed by Google. It uses neural networks which operate on multiple central processing units (CPUs), GPUs and tensor processing units (TPUs).

Offline analytics and machine learning modules 610 are also provided to ingest larger volumes of data that have been gathered over a longer period of time (e.g. from the data lake 607). These modules 610 include one or more of a behavior module, an inference module, a sessionization module, a modeling module, a data mining module, and a deep learning module. These modules can also, for example, be implemented by NiFi, Spark or TensorFlow, or combinations thereof. Unlike these the modules in the streaming analytics engine 604, the analysis done by the modules 610 is not streaming. The results are stored in memory (e.g. cache services 611), which then transmitted to the streaming analytics engine 604.

The resulting analytics, understanding data and prediction data, which are outputted by the streaming analytics engine 604, are transmitted to ingestors 606, via the message bus 605. The outputted data from the offline analytics and machine learning modules 610 can also be transmitted to the ingestors 606.

The ingestors 606 organize and store the data into the data lake 607, which comprise massive database frameworks. Non-limiting examples of these database frameworks include Hadoop, HBase, Kudu, Giraph, MongoDB, Parquet and MySQL. The data outputted from the ingestors 606 may also be inputted into a search platform 608. A non-limiting example of the search platform 608 is the Solr search platform built on Apache Lucene. The Solr search platform, for example, provides distributed indexing, load balanced querying, and automated failover and recovery.

Data from the data lake and the search engine are accessible by API services 609.

Turning to FIG. 7, another architecture 701 is shown, which used after the data has been stored in the data lake 607 and indexed into the search platform 608.

A core services module 702 obtains data from the search platform 608 and the data lake 607 and applies data science and machine learning services, distributed processing services, data persistence services to the obtained data. For example, the data science and machine learning services are implemented using one or more of the following technologies: NiFi, Spark, TensorFlow, Cloud Vision, Caffe, Kaldi, and Visage. It will be appreciated that other currently known and future known data science or machine learning platforms can be used to execute algorithms to process the data. Non-limiting examples of distributed processing services include NiFi and Spark.

The API services module 609 includes various APIs that interact with the core services module 702 and the applications 704. The API services module 609, for example, exchanges data with the applications in one or more of the following protocols: HTTP, Web Socket, Notification, and JSON. It will be appreciated that other currently known or future known data protocols can be used.

The module 609 includes an API gateway, which accesses various API services. Non-limiting examples of API service modules include an optimization services module, a search services module, an algorithm services module, a profile services module, an asynchronous services module, a notification services module, and a tracking services module.

In an example embodiment, the modules 609 and 702 are part of the AI platform 107, and the applications 704 reside on one or more of the data science servers 104, the internal applications and databases 105, and the user device 102. Non-limiting examples of the applications include enterprise business applications, AI applications, system management applications, and smart device applications.

Figure 8:
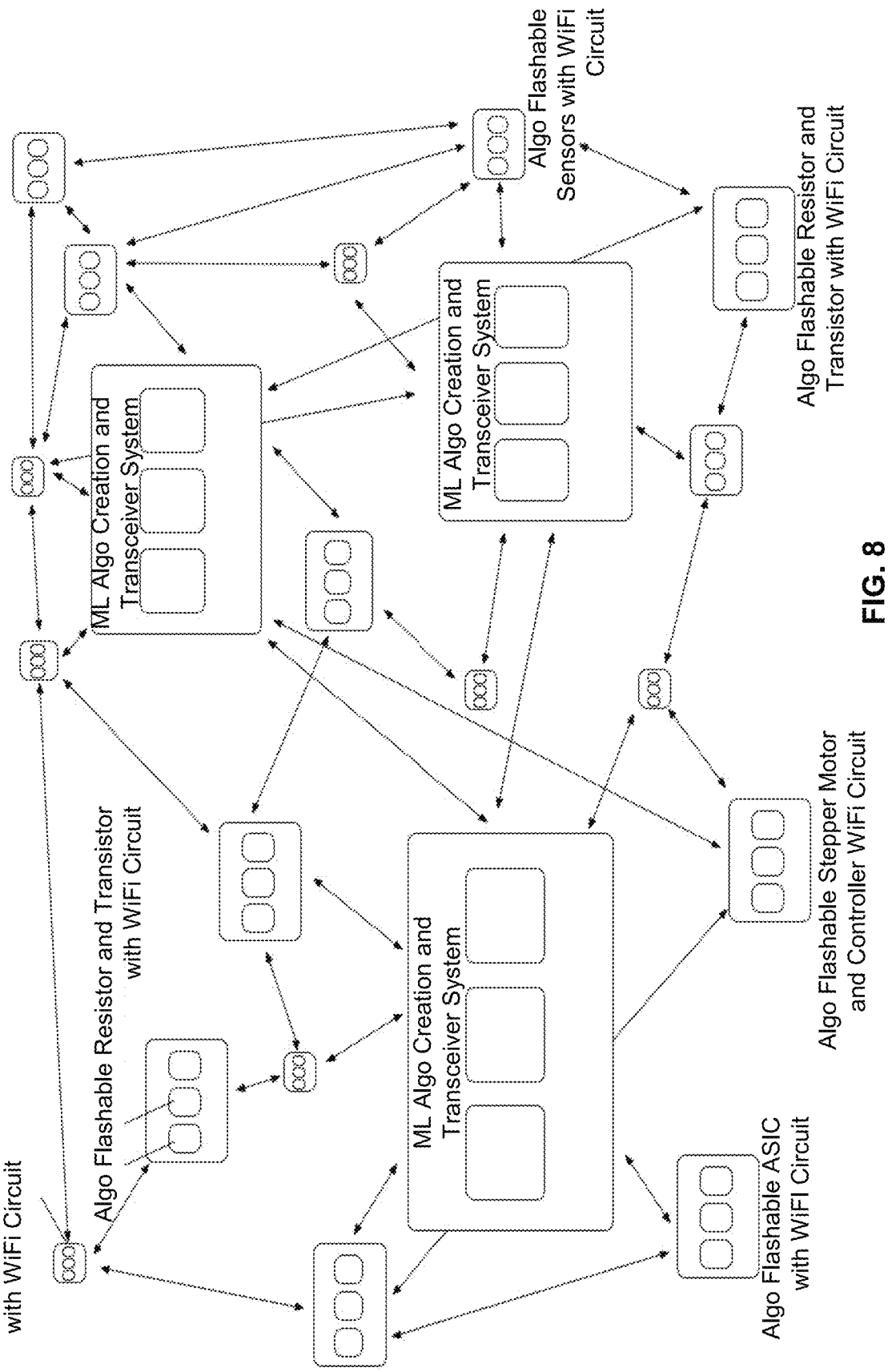
FIG. 8 is a schematic diagram showing an example computing architecture for an extreme data platform, which is an example aspect of the AI platform.

Turning to FIG. 8, an example embodiment of an AI XD platform 109 is shown, comprising various types of Intelligent Devices represented by different sized boxes, according to an embodiment described herein. The AI XD platform 109 includes, for example, a plurality of intelligent devices, intelligent device message buses, and networks. The various Intelligent Devices can be dispersed throughout the platform. Similar to a human brain with neurons and synapses, neurons can be considered akin to Intelligent Edge Nodes and synapses can be considered akin to Intelligent Networks. Hence, Intelligent Edge Nodes are distributed and consequently support the notion of distributed decision making—an important step and embodiment in performing XD decision science resulting in recommendations and actions. However, unlike the synapses of a human brain, the Intelligent Networks in the platform 109 as disclosed herein can have embedded "intelligence", wherein intelligence can refer to the ability to perform data or decision science, execute relevant algorithms, and communicate with other devices and networks.

Intelligent Edge Nodes are a type of an Intelligent Device, and can comprise various types of computing devices or components such as processors, memory devices, storage devices, sensors, or other devices having at least one of these as a component. Intelligent Edge Nodes can have any combination of these as components. Each of the aforementioned components within a computing device may or may not have data or decision science embedded in the hardware, such as microcode data or decision science running in a GPU, data or decision science running within the operating system and applications, and data or decision science running as software complimenting the hardware and software computing device.

As shown in FIG. 8, the AI XD platform 109 can comprise various Intelligent Devices including, but not limited to, for example, an Algo Flashable Microcamera with WiFi Circuit, an Algo Flashable Resistor and Transistor with WiFi Circuit, an Algo Flashable ASIC with WiFi Circuit, an Algo Flashable Stepper Motor and Controller WiFi Circuit, Algo Flashable Circuits with WiFi Sensors, and an ML Algo Creation and Transceiver System. Intelligent Devices listed above may be "Algo Flashable" in a sense that the algorithms (e.g., data or decision science related algorithms) can be installed, removed, embedded, updated, loaded into each device. Other examples of Intelligent Devices include user devices and OCDs.

Each Intelligent Device in the platform 109 can perform general or specific types of data or decision science, as well as perform varying levels (e.g., complexity level) of computing capability (data or decision science compute, store, etc.). For example, Algo Flashable Sensors with WiFi circuit may perform more complex data science algorithms compared to those of Algo Flashable Resistor and Transistor with WiFi circuit, or vice versa. Each Intelligent Device can have intelligent components including, but not limited to, intelligent processors, RAM, disk drives, resistors, capacitors, relays, diodes, and other intelligent components. Intelligent Networks (represented as bi-directional arrows in FIG. 8) can comprise one or more combinations of both wired and wireless networks, wherein an Intelligent Network includes intelligence network devices, which are equipped with or configured to apply data or decision science capabilities.

Each Intelligent Device can be configured to automatically and autonomously query other Intelligent Devices in order to better analyze information and/or apply recommendations and actions based upon, or in concert with, one or more other Intelligent Devices and/or third party systems. This exemplifies applying perfect or near perfect information, by using as much data and data or decision science prior to taking an action given all information that is available at that specific moment.

Each Intelligent Device can also be configured to predict and determine which network or networks, wired or wireless, are optimal for communicating information based upon local and global parameters including but not limited to business rules, technical metrics, network traffic conditions, proposed network volume and content, and priority/severity levels, to name a few. An Intelligent Device can optionally select a multitude of different network methods to send and receive information, either in serial or in parallel. An Intelligent Device can optionally determine that latency in certain networks are too long or that a certain network has been compromised, for example, by providing or implementing security protocols, and can reroute content using different encryption methods and/or reroute to different networks. An Intelligent Device can optionally define a path via for example nodes and networks for its content. An Intelligent Device can optionally use an Intelligent Device Message Bus to communicate certain types of messages (e.g. business alerts, system failures) to other Intelligent Devices. One or more Intelligent Device Message Buses can connect multiple devices and/or networks.

Each Intelligent Device can optionally have an ability to reduce noise and in particular, to reduce extreme data, especially at the local level or through the entire platform 109. This may provide the platform 109 the ability to identify eminent trends and to make preemptive business and technical recommendations and actions faster, especially since less duplicative data or extreme data allows for faster identification and recommendations.

Each Intelligent Device can include data or decision science software including but not limited to operating systems, applications, and databases, which directly support the data or decision science driven Intelligent Device actions. Linux, Android, MySQL, Hive, and Titan or other software could reside on System-on-Chip devices so that the local data or decision science can query local, on device, related data to make faster recommendations and actions.

Each Intelligent Device can optionally have an Intelligent Policy and Rules System. The Intelligent Policy and Rules System provides governing policies, guidelines, business rules, nominal operating states, anomaly states, responses, key performance indicator (KPI_metrics, and other policies and rules so that the distributed IDC devices can make local and informed autonomous actions following the perfect information guiding premise as mentioned above. A number (e.g., NIPRS) of Intelligent Policy and Rules Systems can exist, and the aforementioned systems can have either identical, or differing policies and rules amongst themselves or alternatively can have varying degrees or subsets of policies and rules. This latter alternative is important when there are localized business and technical conditions that may not be appropriate for other domains or geographic regions.

Figure 9:
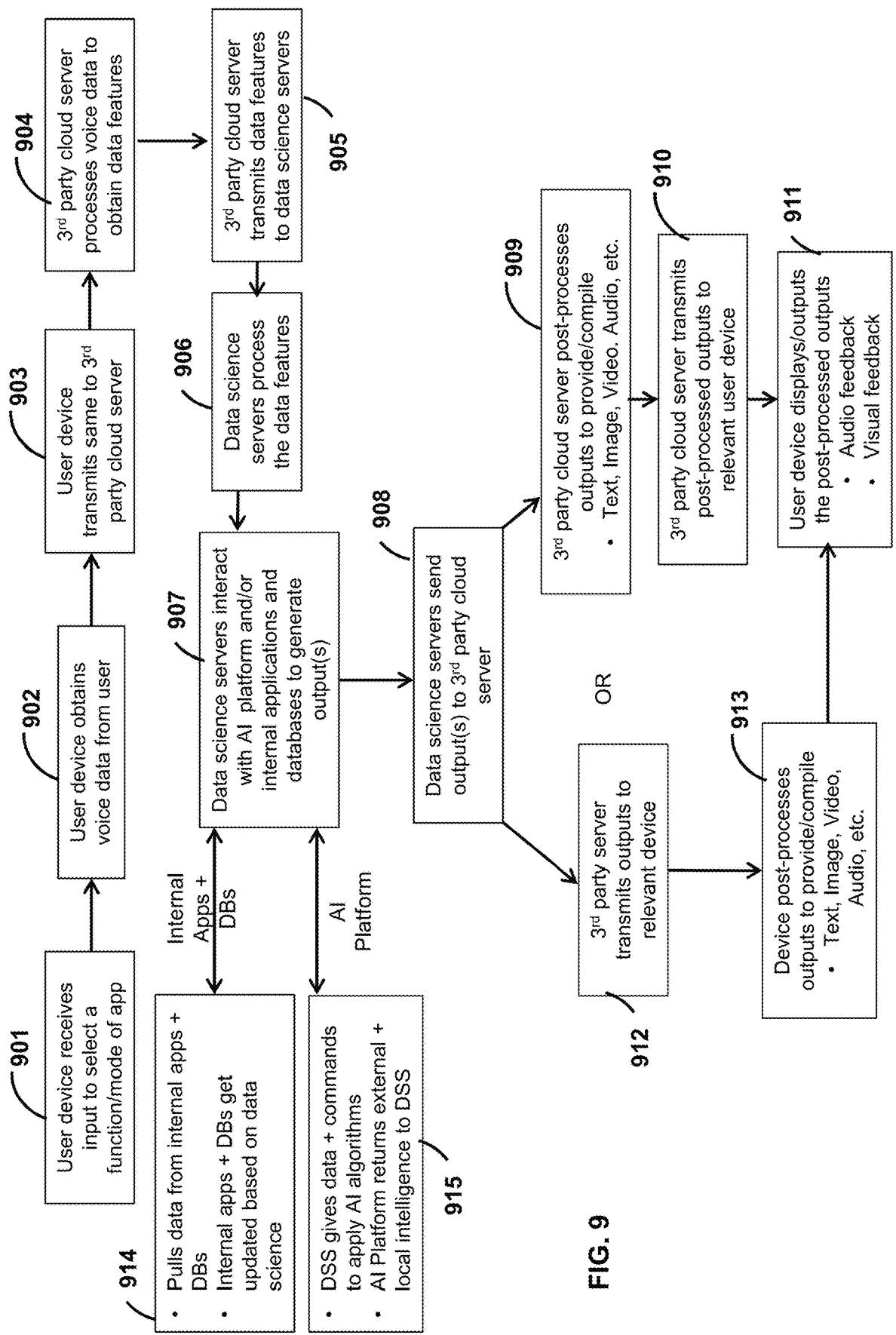
FIG. 9 is a flow diagram of executable instructions for processing voice data using a user device and further processing the data using the data enablement platform.

Turning to FIG. 9, example computer executable instructions are provided for processing data using the data enablement platform. At block 909, a user device or an OCD, or both, receives input to select a function or a mode of an application (e.g. the data enablement application) that resides on the user device. At block 902, the user device or the OCD, or both, obtains voice data from a user. At block 903, the user device or the OCD, or both, transmits the same data to the $3^{rd}$ party cloud computing servers. The user device also transmits, for example, contextual data. At block 904, the $3^{rd}$ party cloud computing servers processes the voice data to obtain data features.

Non-limiting examples of extracted data features include text, sentiment, action tags (e.g. commands, requests, questions, urgency, etc.), voice features, etc. Non-limiting examples of contextual features include the user information, device information, location, function or mode of the data enablement application, and a date and time tag.

In an alternative example embodiment, the voice data is processed locally on the user device to generate text (e.g. using speech-to-text processing) and the text is sent to the servers for further processing.

The extracted data features and the contextual features are transmitted to the data science servers (block 905). The original data (e.g. raw audio data) may also be transmitted to the data science servers. At block 906, the data science servers process this received data.

At block 907, the data science servers interact with the AI platform, or the internal applications and internal databases, or both, to generate one or more outputs.

The data science servers then send the one or more outputs to the $3^{rd}$ party cloud computing servers (block 908). In one example embodiment, the $3^{rd}$ party cloud computing servers post-processes the outputs to provide or compile text, image, video or audio data, or combinations thereof (block 909). At block 910, the $3^{rd}$ party cloud computing servers transmit the post-processed outputs to the relevant user device(s) or OCD(s). At block 911, the user device(s) or the OCD(s), or both, output the post-processed outputs, for example, via an audio device or a display device, or both.

In an alternative embodiment, stemming from block 908, the $3^{rd}$ party cloud computing server transmits the outputs to the one or more relevant devices (e.g. user devices or OCDs) at block 912. The post-processing is then executed locally on the one or more relevant devices (block 913). These post-processed outputs are then outputted via audio devices or visual devices, or both on the one or more user devices or OCDs (block 911).

Turning back to block 907, in an example aspect, the data science servers pull data from the internal applications and internal databases, or the internal applications and internal database are updated based on the results produced by the data science servers, or both (block 914).

In another example aspect, the data science servers transmit data and commands to the AI platform, to apply AI processes on the transmitted data. In return, the AI platform transmits external and local information and data intelligence to the data science servers. These operations are shown in block 915.

It can be appreciated that any two or more of the operations in blocks 907, 914, and 915 can affect each other. In an example embodiment, the outputs of block 914 are used in the operations of block 915. In another example embodiment, the outputs of block 915 are used in the operations of block 914.

It is herein recognized that the devices, systems and the methods described herein enable the provision of actionable data that can be used in various industries. One example industry, among other applicable industries, is sales and marketing.

Sales people, sales management, and senior executives continue to waste a lot of time understanding, qualifying, evaluating, and predicting sales opportunities. The devices in combination with the data enablement platform provides the aforementioned people with "Perfect Information", a concept from economists.

A software example applying perfect information is the Bloomberg terminal. This software platform integrates and display all global exchanges (stock markets, currency, natural resources, etc.), global news that impacts industries and companies, and the ability to buy and sell on these exchanges to provide traders with the most up to data global "perfect information" to make trades.

By way of analogy, the data enable platform described herein, in combination with the user device or the OCD, or both, provide perfect information to help sales organizations integrate and display all information related to sales and sales opportunities. A user, for example, talks with a bot on the user device or the OCD.

The bot engages with the sales people, sales managers, and executives by autonomously capturing, analyzing, recommending, and taking actions related to leads and opportunities. Examples include: creating new leads and opportunities spoken by the salesperson to the bot; the bot conversing with the salesperson about a new executive champion at the opportunity company; the bot conversing with the salesperson about a new feature released in a competitive product that could increase opportunity closure risk; the bot conversing with the salesperson to provide specific information about the opportunity (e.g. executive opportunity sponsorship, confirmed budget, etc.) to move the opportunity from one sales process step to the next; and, the bot conversing with the salesperson requesting permission to automatically move the opportunity into the CRM system because all of the information is now validated and ready for the CRM systems and applications. It will be appreciated that other example actions and interactions can be performed using the devices, systems and the methods described herein.

In an example aspect, there are N number of specialized bots residing and operating within the data enablement platform, the user device, or the OCD, or a combination thereof.

These sales and marking bots make distributed and autonomous decision science based recommendations and actions that increasingly become smarter and faster over time as the bot and salesperson interact more and more. In particular, a bot assigned to a specific salesperson begins to learn the salesperson's patterns and behaviors and subsequently makes recommendations and provides opportunity updates based on salesperson's behavior, likes, and dislikes. The bot also recommends actions and best practices from other top salespeople in the sales organization that help the given salesperson increase their own sales process and ultimately help close deals faster.

In preferred embodiments, the bot is a chat bot that has language capabilities to interact with the user via text language or spoken language or both. However, in other example embodiment, the bot does not necessarily chat with a user, but still affects the display of data being presented to the user.

Figure 10:
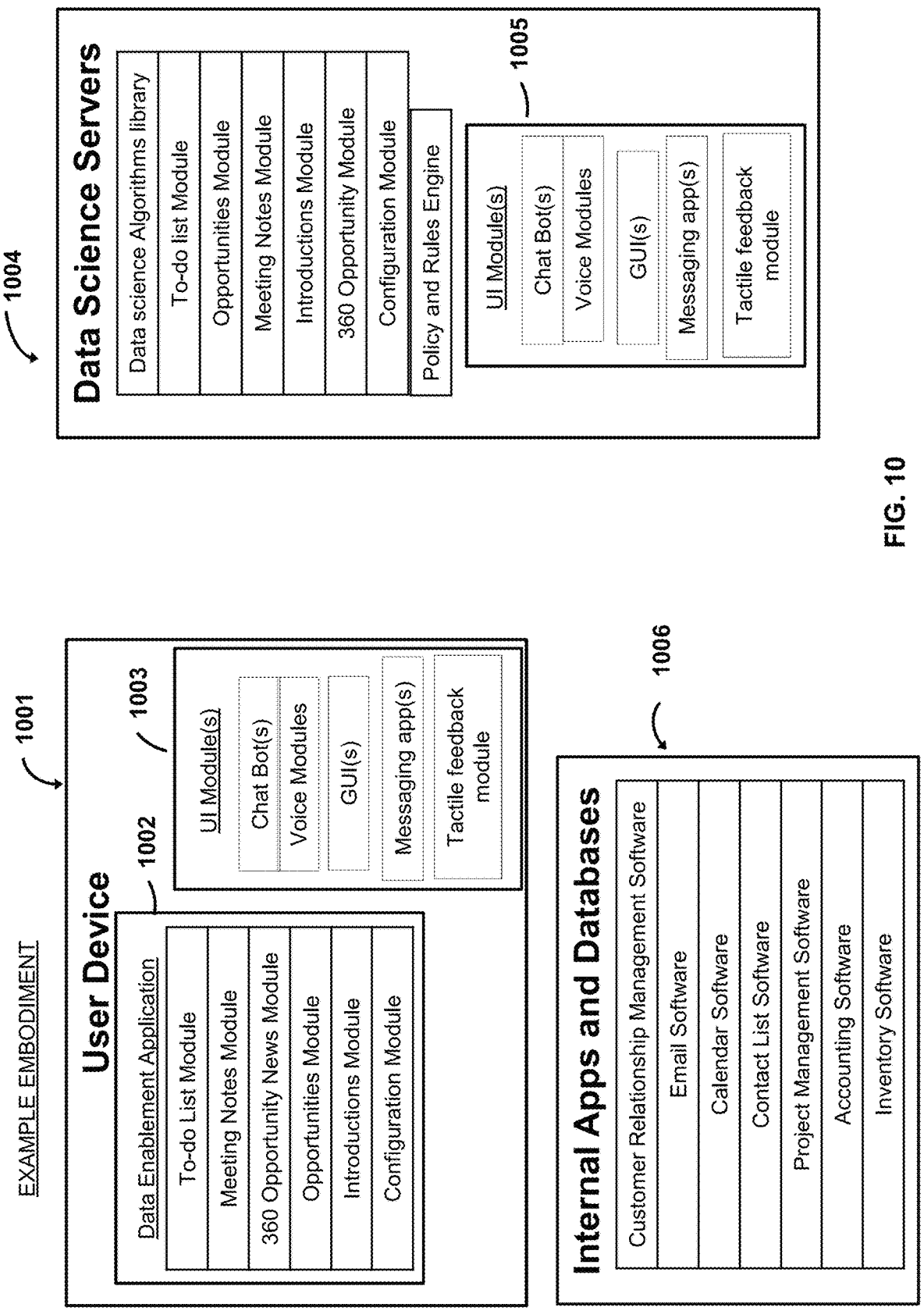
FIG. 10 is a block diagram of example software modules residing on the user device and the data enablement platform, which are used in the sales and marketing industry.

Turning to FIG. 10, an example embodiment is provided of software modules that reside on a given user device 1001, data science servers 1004, and internal applications and databases 1006, which are suited for enabling sales and marketing actions.

For example, a data enablement application 1002 resides on the user device and the application includes: a to-do list module, a meeting notes module, an opportunity news module, an opportunities module, an introductions module, and a configuration module. The user device also includes user interface (UI) modules 1003, which can be part of the data enablement application 1002, or may interact with the data enablement application 1002. The UI modules include one or more chat bots, one or more voice libraries/modules associated to be utilized by the one or more chatbots, one or more GUIs, one or more messaging application, one or more tactile feedback modules, or combinations thereof.

The data science servers 1004 include a data science algorithms library, a to-do list module, a meeting notes module, an opportunity news module, an opportunities module, an introductions module, a configuration module, and a policy and rules engine. For example, the policy and rules engine includes policies and rules that are specific to the company or organization using the data enablement platform.

In an example aspect, the policy and rules engine is a data science driven system that autonomously prompts the salesperson to progressively add opportunity related data to an opportunity. The opportunity data may come in the form of autonomously collected data from the sales enablement platform, data directly inputted (oral or typed in) by the salesperson, or data captured during meetings (audio to text to NLP processing), or any combination of the aforementioned.

In another example aspect, this policy and rules engine helps ensure the salesperson is complying with the sales organization sales process so that data is correct, accurate, and timely submitted into the intelligent sales enablement system prior to moving the complete and timely opportunity information into a traditional CRM application. Autonomously performing these sales process steps along the way increases the data accuracy and timeliness as opposed to last minute and haphazardly trying to recall and enter opportunity data into a CRM system.

In other example embodiments, this policy and rules engine can reside on the user's smartphone, or in public or private clouds, or at the employee's data center, or any combination of the aforementioned.

Regarding the data science algorithms library, it will be appreciated that data science herein refers to math and science applied to data in the form including but not limited to algorithms, machine learning, artificial science, neutral networks, etc. The results from data science include, but are not limited to, business and technical trends, recommendations, actions, trends, etc.

In an example aspect, Surface, Trend, Recommend, Infer, Predict and Action (STRIPA) algorithms are included in the data science algorithms library. This family of STRIPA algorithms worth together and are used to classify specific types of data science to related classes.

Non-limiting examples of other data science algorithms that are in the data science library include: Word2vec Representation Learning; Sentiment (e.g. multi-modal, aspect, contextual, etc.); Negation cue, scope detection; Topic classification; TF-IDF Feature Vector; Entity Extraction; Document summary; Pagerank; Modularity; Induced subgraph; Bi-graph propagation; Label propagation for inference; Breadth First Search; Eigen-centrality, in/out-degree; Monte Carlo Markov Chain (MCMC) simulation on GPU; Deep Learning with region based convolutional neural networks (R-CNN); Torch, Caffe, Torch on GPU; Logo detection; ImageNet, GoogleNet object detection; SIFT, SegNet Regions of interest; Sequence Learning for combined NLP & Image; K-means, Hierarchical Clustering; Decision Trees; Linear, Logistic regression; Affinity Association rules; Naive Bayes; Support Vector Machine (SVM); Trend time series; Burst anomaly detection; KNN classifier; Language Detection; Surface contextual Sentiment, Trend, Recommendation; Emerging Trends; Whats Unique Finder; Real-time event Trends; Trend Insights; Related Query Suggestions; Entity Relationship Graph of Users, products, brands, companies; Entity Inference: Geo, Age, Gender, Demog, etc.; Topic classification; Aspect based NLP (Word2Vec, NLP query, etc.); Analytics and reporting; Video & audio recognition; Intent prediction; Optimal path to result; Attribution based optimization; Search and finding; and Network based optimization.

In other example embodiments, the aforementioned data science can reside on the user's smartphone, or in public or private clouds, or at the employee's data center, or any combination of the aforementioned.

Continuing with FIG. 10, UI modules 1005 also reside on the data science servers 1004.

The internal applications and database 1006 also include various software and database that are used to assist in sales and marketing actions. These include CRM software, email software, calendar software, contact list software, project management software, accounting software, and inventory software.

Figure 11:
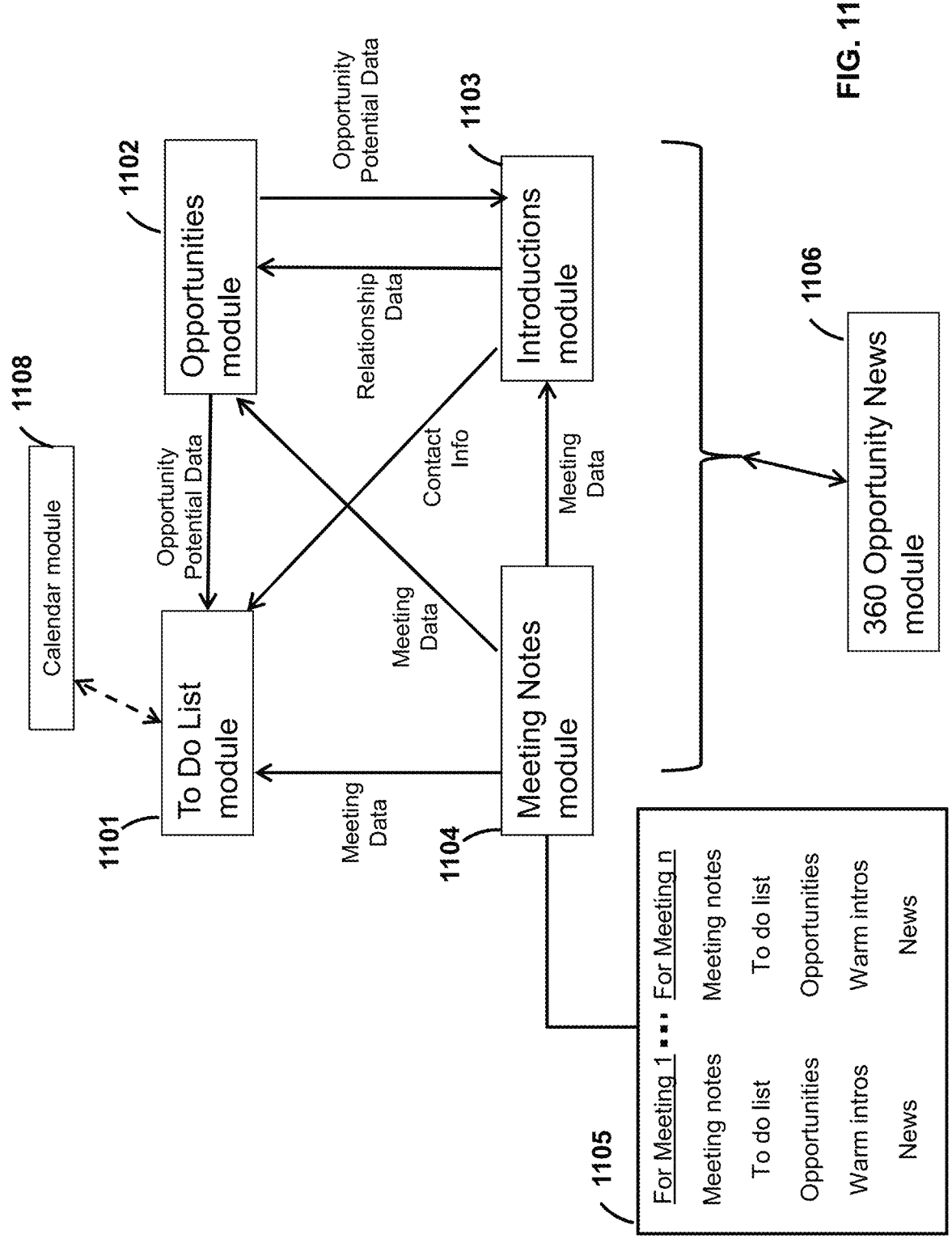
FIG. 11 is an example schematic diagram showing the flow of data between the software modules shown in FIG. 10.

Turning to FIG. 11, an example data flow diagram shows the flow of data between different modules. Data can flow between the to-do list module 1101, the opportunities module 1102, the introductions module 1103, the meeting notes module 1104, and the opportunity news module 1106 in various combinations other than what is shown in FIG. 11. However, FIG. 11 does provide an example embodiment. The meeting notes module records meeting notes (e.g. via audio input) and generates meeting data. This meeting data is transmitted to the introductions module, the opportunities module and the to-do list module. In an example embodiment, the meeting data includes data obtained in a meeting setting (see for example FIG. 4A).

The meeting data is used by the introductions module to determine relevant contact information and relationship data, which are transmitted to the opportunities module and the to-do list module.

The opportunities module uses the relationship data and the meeting data to determine important opportunities. The opportunities module also obtains data from the opportunities news module to determine new opportunities and important opportunities.

The to-do list module obtains the opportunity potential data from the opportunities module, the contact information from the introductions module, and the meeting data from the meeting notes module to generate action items and prioritize the action items for the salesperson. For example, an action item is created to have lunch with a first certain contact to discuss a potential opportunity with a second certain contact, and this action item is prioritized as urgent, given the sales opportunity. The to-do list module interacts with the calendar module 1108 to automatically schedule actions.

The opportunity news module is able to interact with the other modules to obtain related external data or related internal data, or both.

For example, a user is in a current given mode (e.g. a meeting notes mode). The user's input generates a response from the data enablement application that includes text data, an indication of a voice library, and the current mode. The user device receives this response and propagates the text to other modules associated with other modes that are not currently active (e.g. the to-do list module, the opportunities module, the introduction module). In this way, the other modules receive updated data that are relevant to their functions.

In an example embodiment, when a user is view a given meeting, the user can view the meeting notes, the related action items generated by the to-do list module, the related opportunities generated by the opportunities module, the related warm introductions generated by the introductions module, and the related news obtained from the opportunity news module.

In example aspects, these modules use machine learning to learn and model opportunities that are right for the organization; learn and model the right tasks that a salesperson should perform from the day an opportunity arises through ongoing upsell/cross sell customer opportunities; learn and model best practices performed by other salespeople that may apply to a saleperson(s); learn and model what tasks a salesperson should perform daily, weekly, etc. for each opportunity; learn and model what tasks and reports that a sale manager needs to optimize his sales teams performance; and learn and model the tasks and behaviors that the CEO and other executives need in order to predict, with confidence, revenue. These are just a few of the learn-and-model practices that the data enablement system performs. Actions in response to these machine learning models include, but are not limited to, taking autonomous actions such as sending prospects relevant emails, sending reminder prompts requesting data from a salesperson, reminding the salesperson about upcoming meetings, etc.

FIGS. 12-19 include screenshots of example GUIs shown for applying the data enablement system to sales and marketing.

Figure 12:
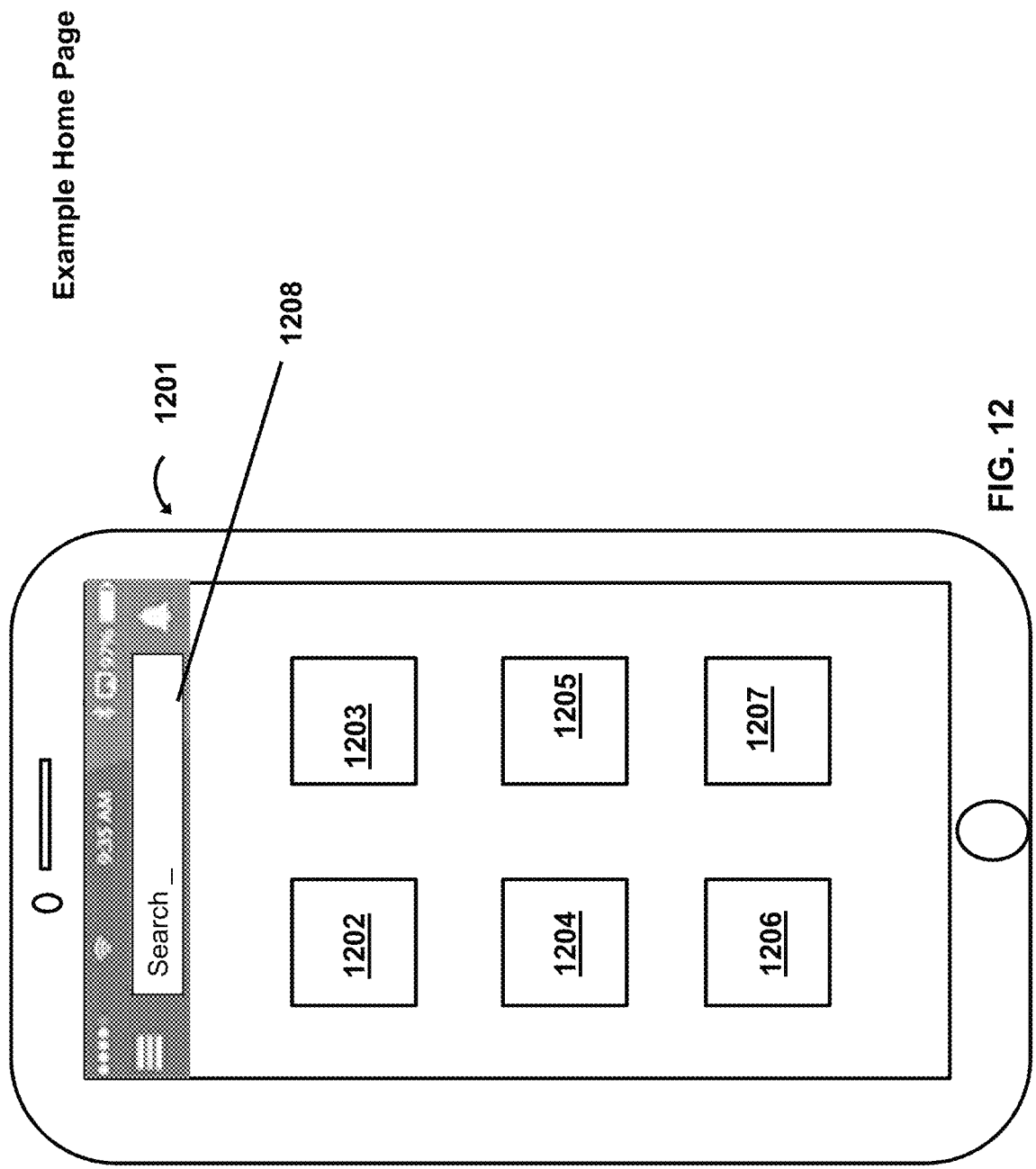
FIGS. 12-19 are screenshots of example graphical user interfaces (GUIs) relating to the software modules shown in FIG. 10.

In FIG. 12, a home landing page 1201 for the data enablement application. It includes GUI controls for a my to-do list 1202, my opportunities 1203, my meeting notes 1204, my warm introductions 1205, my opportunity news 1206, and configuration settings 1207.

By selecting the My To Do List control 1202, a conversational and intelligent AI bot is launched that automatically recommends and prioritizes tasks for the salesperson based on notes, meetings with customers, calendar events, etc. each day and updated real time.

By selecting the My Opportunities control 1203, a conversational and intelligent AI bot is launched that automatically creates, updates, and deletes opportunities and real time updates opportunity information using a baseball card-like metaphor.

By selecting the My Meeting Notes control 1204, a conversational and intelligent AI bot is launched that can record customer meetings, sales manager meetings, salesperson's reminder notes and apply NLP and STRIPA. The results from the NLP and STRIPA subsequently updates the My To Do list bot, My Opportunity bot, etc.

By selecting the My Warm Intros control 1205, a conversational and intelligent AI bot is launched that automatically searches my peers, friends, acquaintances, former employees and bosses, etc. who are related to an opportunity and that could help provide insights and provide access to decision makers, executive sponsors, etc. at a lead or opportunity The conversational bot orally provides new information to the salesperson if the salesperson is currently working that opportunity to provide the faster information in order to help the salesperson and also provides this update in the My Opportunities area By selecting a My Opportunity News control 1206, a conversational and intelligent AI bot is launched that automatically searches press releases, news, social sites, blogs, forums, etc. that related to an opportunity and that helps provide insights and recommendations to the salesperson so that the saleperson is armed with all of the most up to date information to understand and close the opportunity. The conversational bot orally provides new information to the salesperson if the salesperson is currently working that opportunity to provide the faster information in order to help the salesperson and also provides this update in the My Opportunities area By selecting the Configuration settings control 1207, the setup, configuration, and preferences section of the application are launched.

A search field 1208 in this GUI does a global level search across all the modules based on the user's inputted keyword (e.g. inputted via voice or by typing).

The depicted control elements are for example. Other control elements with different data science, bots, features, and functionality may be added and mixed with other control elements.

Figure 13:
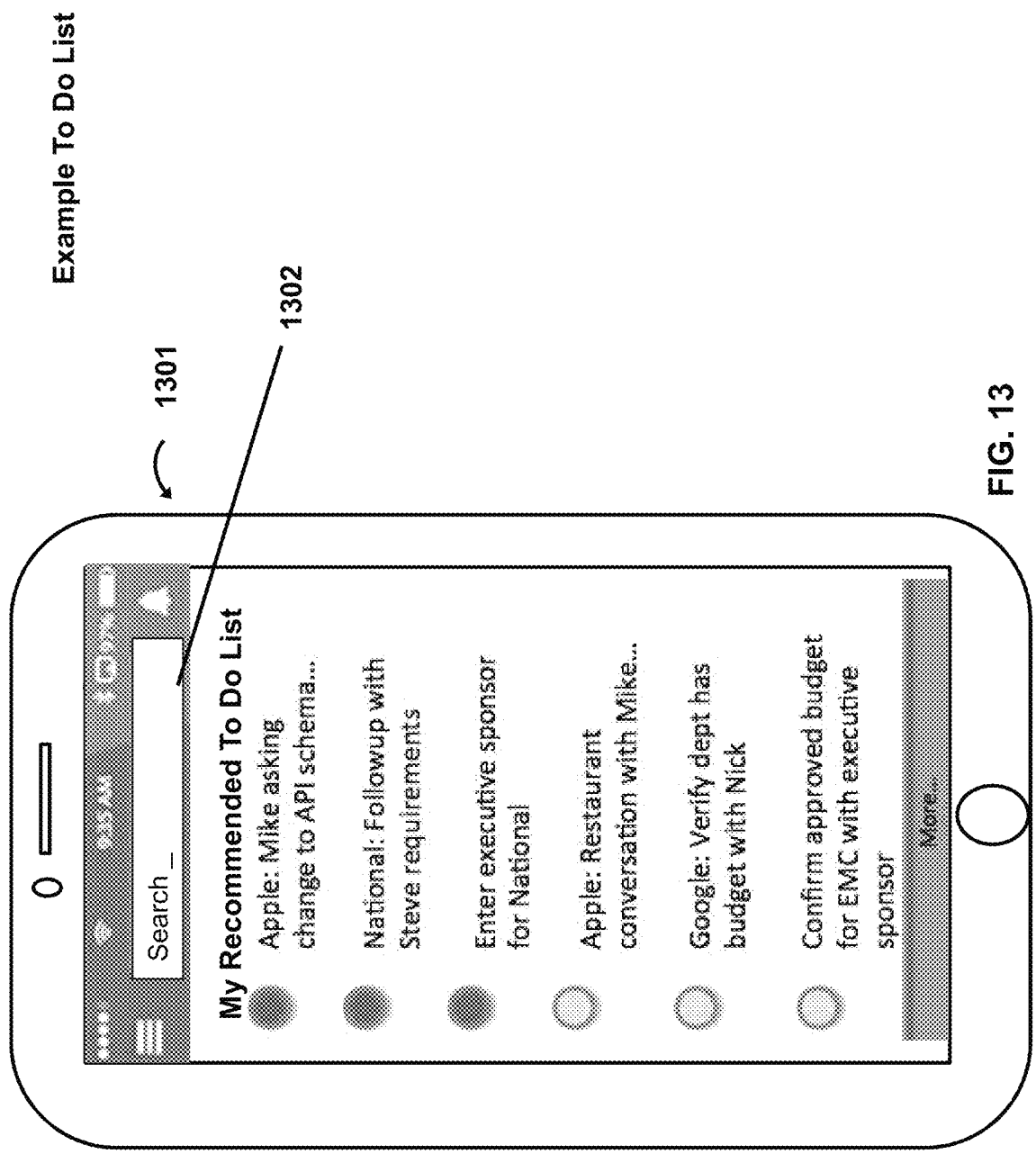

Turning to FIG. 13, an example embodiment of a My To Do List page GUI 1301 is shown. Under this mode, a conversational question and answer bot talks with an account representative to orally create new opportunity tasks, answer outstanding tasks and mark complete tasks. The bot also allows the account representative to orally enter opportunity data. In another example aspect, the bot is uses AI to provide a recommended task list that is ordered based on importance. The bot dynamically updates the task list and the prioritization based on the status of new tasks entered, new data becoming available, and the completion of tasks. The bot also reminds the account rep to orally enter company required opportunity data. The bot then transmits this opportunity data to the CRM software, for example, when the account representative is ready for CRM review. Using this system, an account representative can more naturally provide relevant information, and the bot will extract, structure and organize the information for storage in the CRM software. The bot is also able use AI to perform sales forecasts.

A search field 1302 in this GUI takes the user's input (e.g. voice input or typed input) to conduct a search of the recommended to-do-list.

Figure 14:
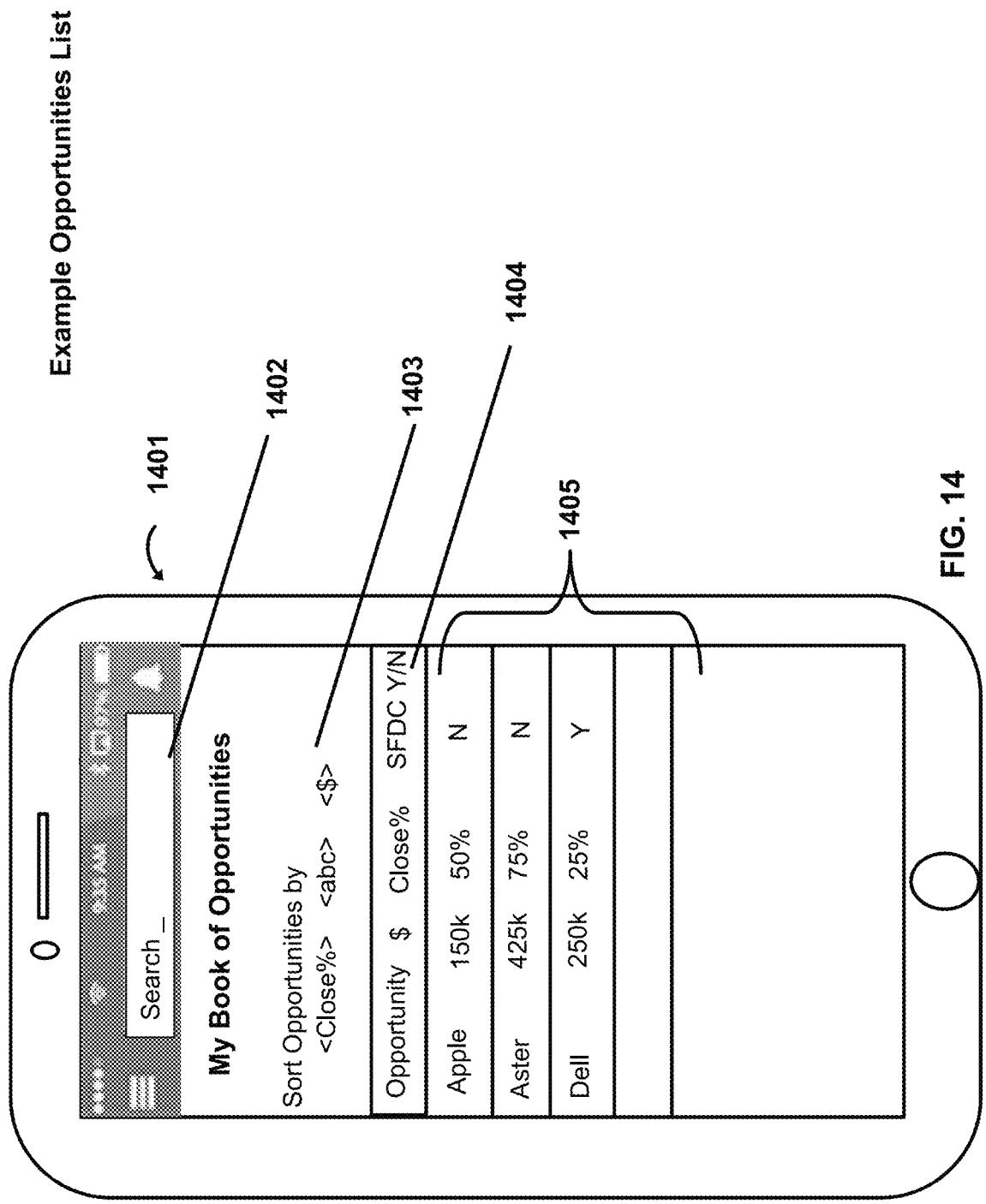

Turning to FIG. 14, an example embodiment of a My Opportunities page GUI 1401 is shown. Under this mode, a conversational question and answer bot talks with a user to search for opportunities and to sort the opportunities. For example, the user can orally speak to the bot to search for a specific opportunity related to a certain company, business, industry, or person. The user can also orally command the bot to sort the opportunities list, such as by dollar amount, past closure rate, alphabetically, predicted chance of closing the deal, or a combination thereof. Other features may be used to sort the opportunities list. The user may also orally control the both regarding whether or not a given opportunity is to be loaded into the CRM software (e.g. SalesForce.com platform). The bot also generates or identifies related action items specific to a given opportunity, and orally presents them to the user.

The GUI 1401 also conveys this information visually. For example, a search field 1402 is shown in the GUI, as well as various controls 1403 to sort the list of opportunities. For example, the search field 1402 is used to implement a search within the opportunities module. A status flag 1404 is also displayed to indicate whether or not the opportunity has been loaded into the CRM software. The level of risk of a given opportunity is also visually displayed by color coding each entry in the list 1405.

Figure 15:
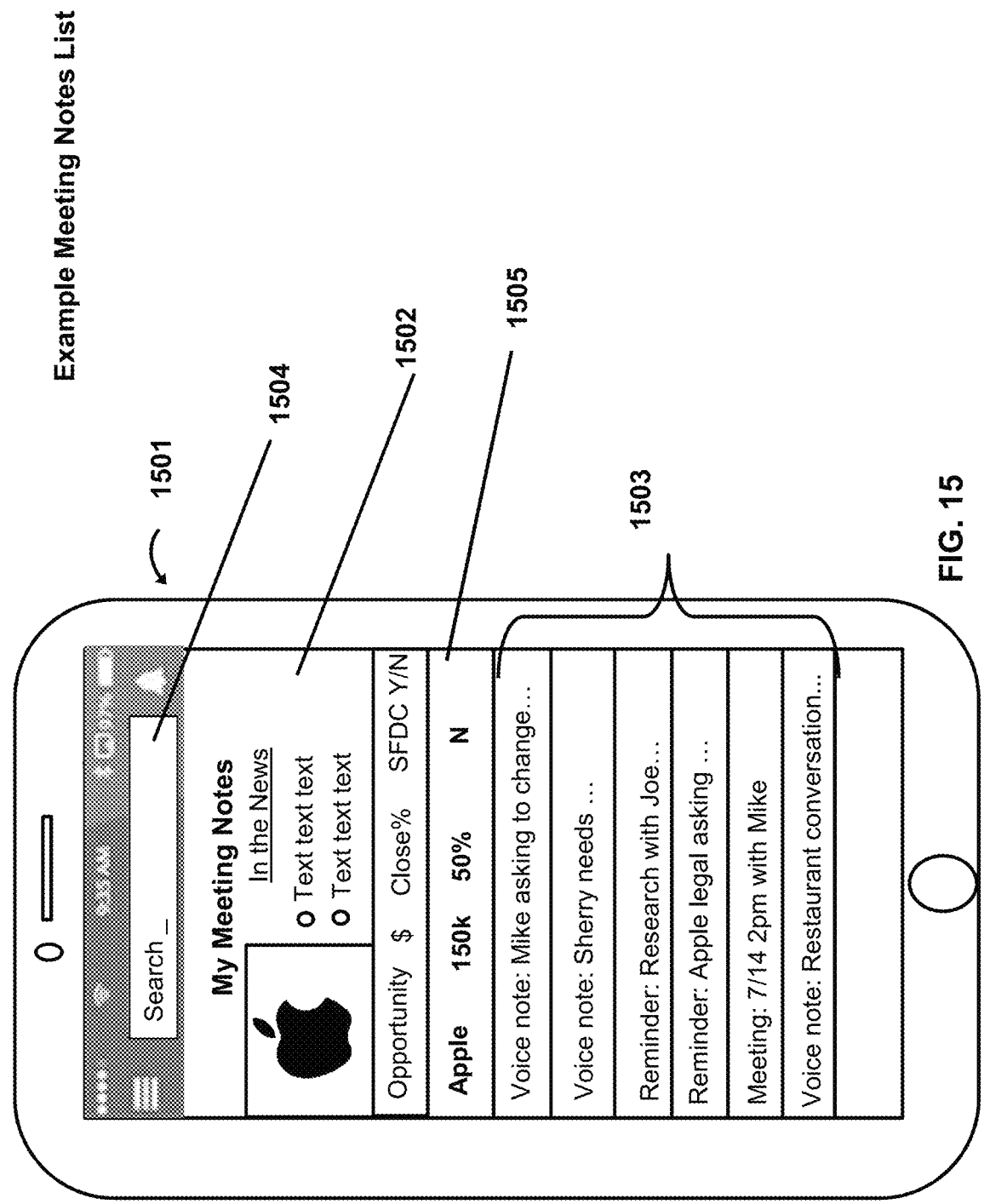

Turning to FIG. 15, a GUI 1501 showing My Meeting Notes includes daily news items 1502 that are related to certain opportunities. Below the new items, there are action notes (e.g. voice data, other data) and reminders 1503 which are prioritized using machine learning algorithms. In an example embodiment, a chat bot provides audio news and uses audio output to relay the action notes. There is also a summary of the opportunity status 1505. A search field 1504 is used to launch a search within the meeting notes module.

Figure 16:
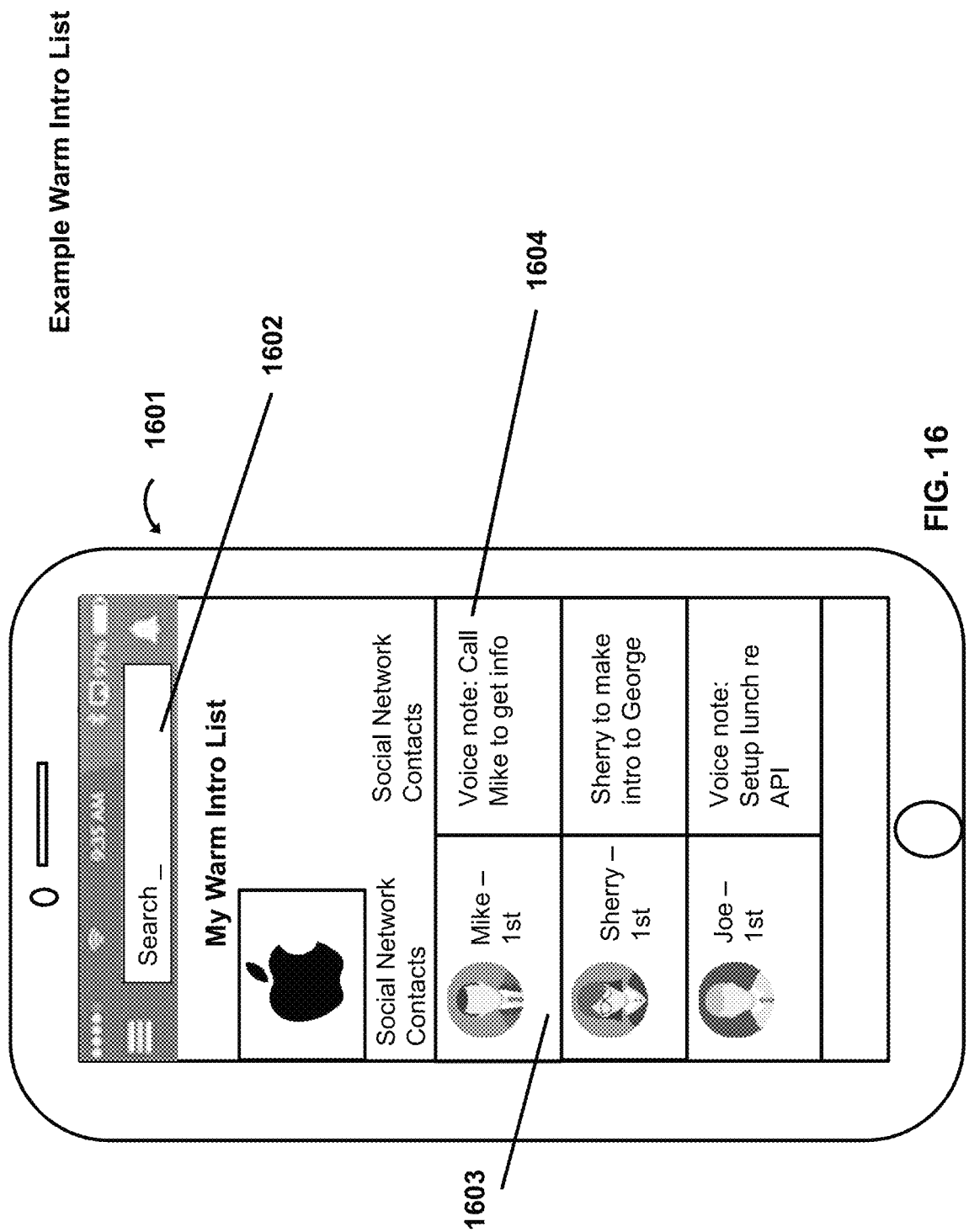

Turning to FIG. 16, a GUI 1601 shows an AI driven list of people 1603 (e.g. from LinkedIn, Outlook, Gmail, social network database of peers, etc.) who can potentially help the account representative to access opportunities and to gain further opportunity insights. The GUI also includes voice notes 1604 regarding to-do notes or action items that are specific to a given person on the list 1603. A search field 1602 may also be included to facilitate a user to search within the warm intro list module.

Figure 17:
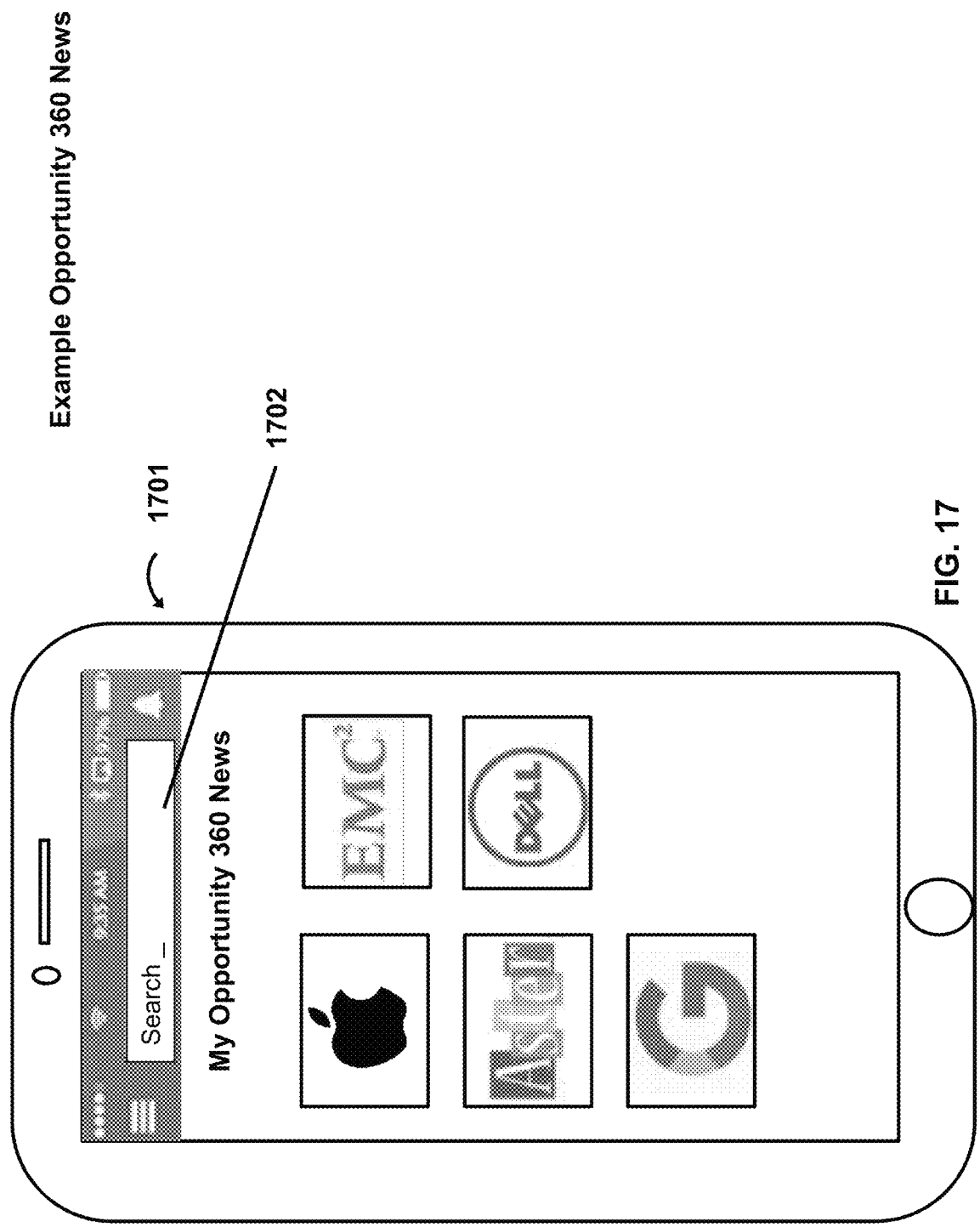

Turning to FIG. 17, a GUI shows opportunity news controls for various companies (e.g. sales opportunities). When a user verbally selects a control or taps a control for a given company, a screen is displayed that shows news items for the given company.

Figure 18:
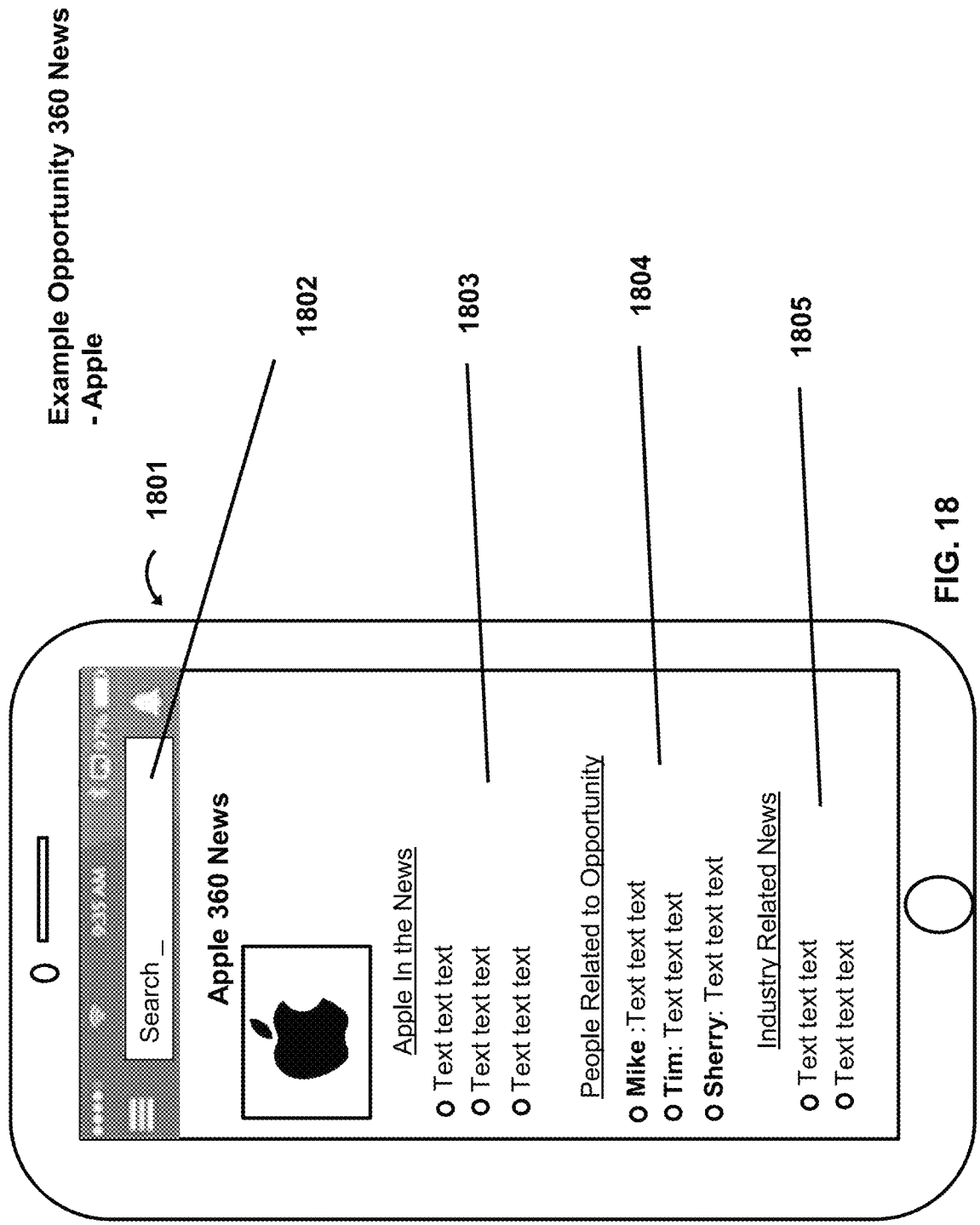
Figure 19:
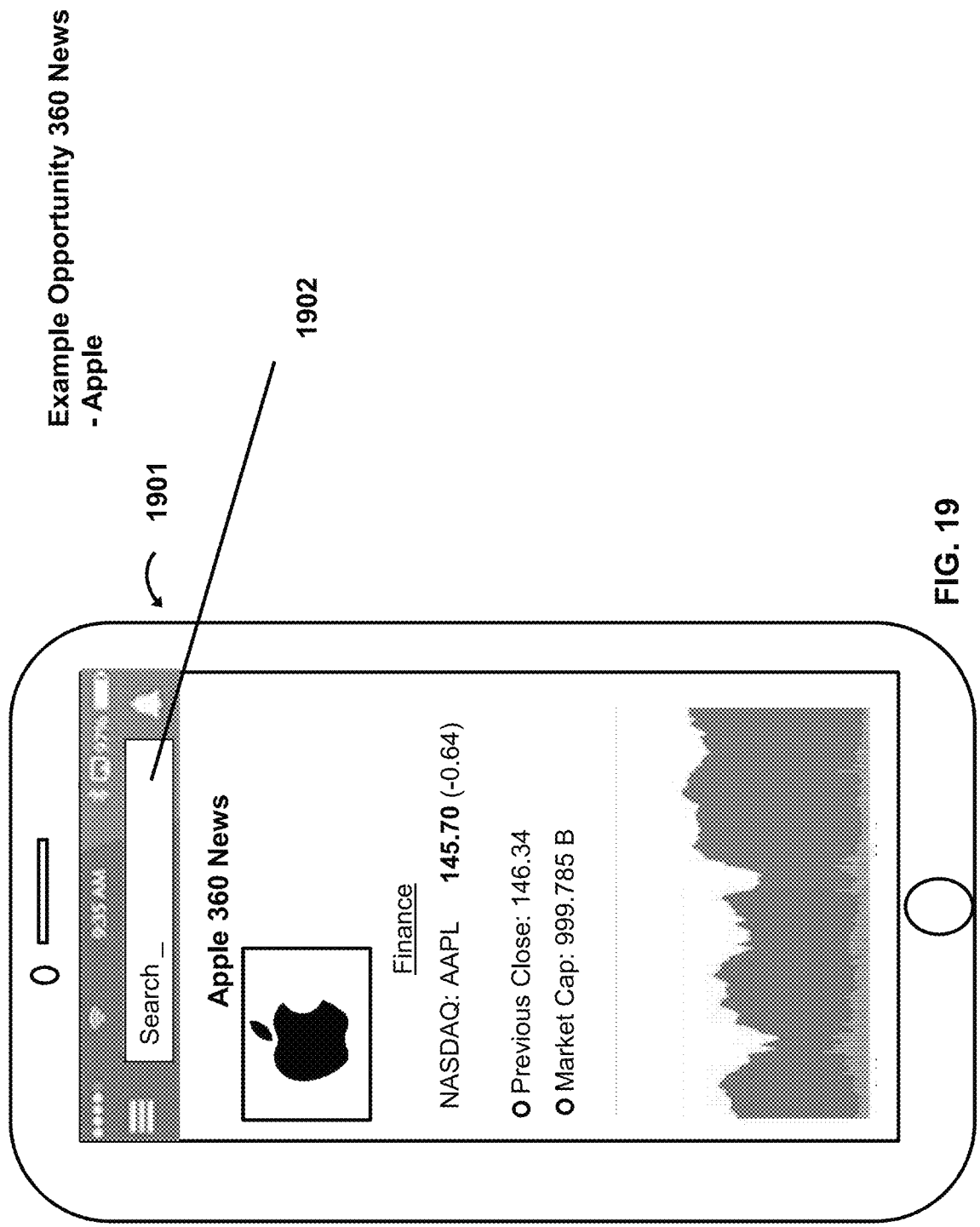

For example, FIGS. 18 and 19 show GUIs containing the news items for the given company. The news items are sorted, for example, according the news that provides the greatest sales opportunity for the given salesperson, as determined using machine learning.

Below are example questions and statement posed by a user, and oral feedback provided by the chatbot. It will be appreciated that the bot or chatbot is conversational and adapts to the style of the user to which it is speaking.

Example 1

User: Hey Bot, provide me with news about opportunity X.
Bot: Hey User, here is the latest new on customer opportunity X.

The Bot reads out the latest 3 to 5 latest new summaries pulled from various data sources.

Example 2

User: Hey Bot, how much commission do I make on a customer x deal?
Bot: Hey User, if sell 100,000 software license seats, you will earn 350,000 dollars, the largest seat deployment in the company.

Example 3

User: Hey Bot, tell me the pricing for this product or service?
Bot: Hey User, the retail price is 70 dollars per seat for less than 50,000 seat subscription, 50 dollars per seat for 50,000 to 150,000 seats, and 35 dollars per seat for over 150,000 seats.

Example 4

User: Hey Bot, tell me the best system engineer or product manager that know this product.
Bot: Hey User, Jacob Smith is the best subject matter expert based on his recent customer feedback and the product managers feedback.
In an example aspect, the data enablement platform applies NLP sentiment processing on internal company reviews, intranet website comments, and other data sources regarding user performance.

Example 5

User: Hey Bot, tell me 3 to 5 things I know about the key decision maker at customer X or prospect X?
Bot: Hey User, John Smith is the CFO and LinkedIn suggest that he is the decision maker on this initiative. Here is a link to John Smith's bio at LinkedIn.

Example 6

User: Hey Bot, tell me which customers over 50% closure I should talk with next?
Bot: Hey User, you should focus on the Google opportunity, the Lenovo opportunity, and the CocaCola opportunity based on your previous notes.

Example 7

User: Hey Bot, summarize and tell me my notes and actions form my last meeting at Lenovo.
Bot: Hey User, there are 3 Lenovo actions you need to complete. First call Alice Anders and see if you can learn more about the dollar budget for this initiative. Second, call Bob Bingham and see if this initiative is budgeted for 2017. And third, you need to talk to Jacob Smith to see if the API will support the number of requests.

Figure 20:
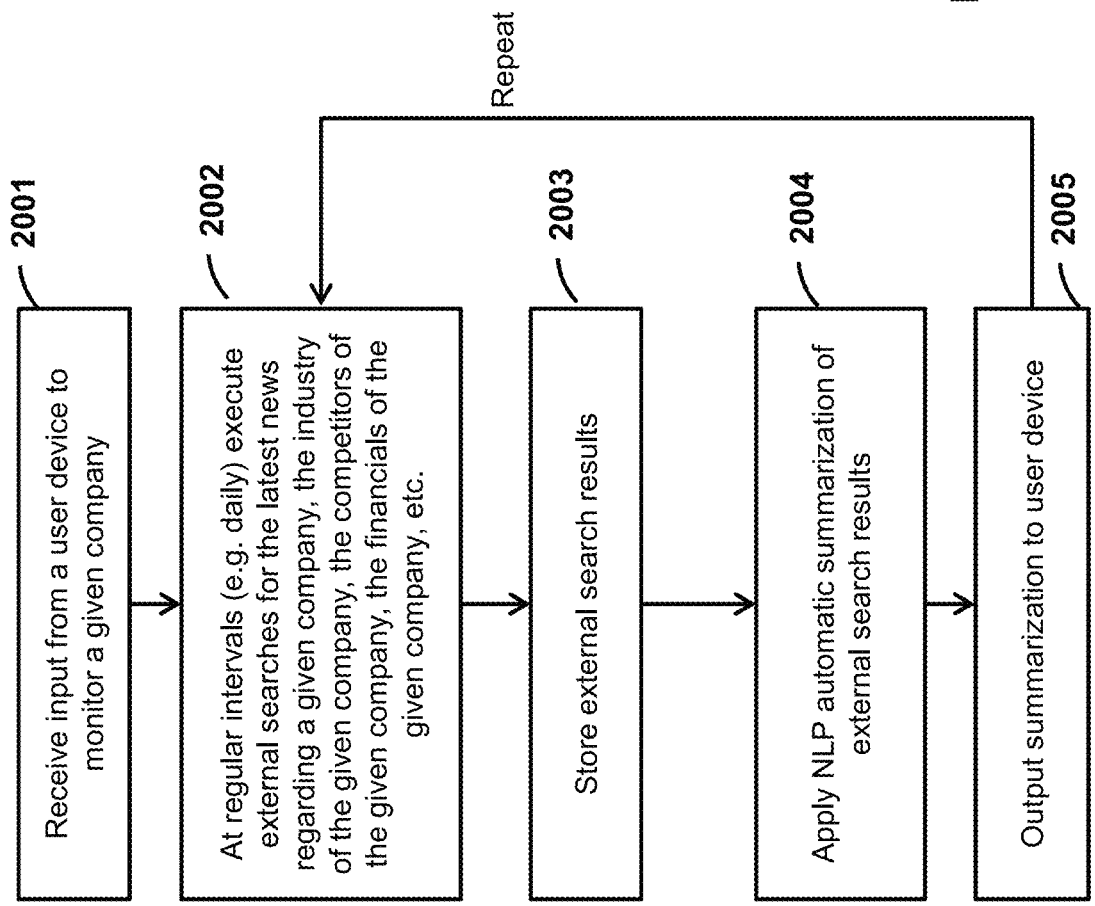
FIG. 20 is a flow diagram of example executable instructions for using the data enablement platform to monitor a given company.

Turning to FIG. 20, an example computation is shown for applying natural language processing (NLP). At block 2001, the user device or the OCD receives input to monitor a given company. At block 2002, at regular intervals (e.g. daily), the data enablement platform executes external searches for the latest news regarding a given company, the industry of the given company, the competitors of the given company, the financials of the given company, etc. At block 2003, the external search results are stored in memory. At block 2004, the data enablement platform applies NLP automatic summarization of the search results and outputs the summarization to the user device (e.g. via audio feedback) (block 2005). The process then repeats at regular intervals, as per block 2002.

Figure 21:
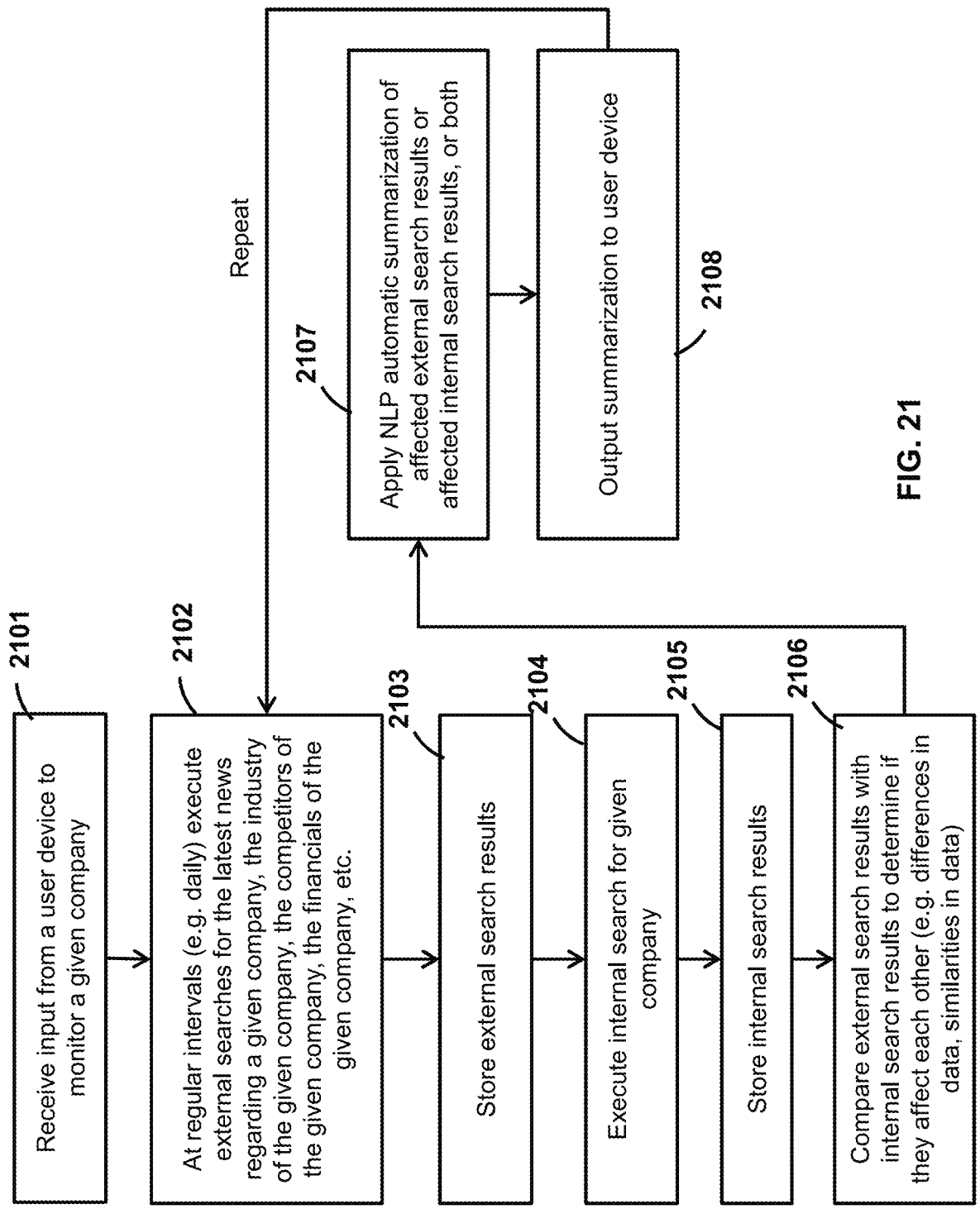
FIG. 21 is a flow diagram of example executable instructions for using the data enablement platform to monitor a given company, including using both internal and external data.

Turning to FIG. 21, another example computation is provided. At block 2101, the user device or the OCD receives input to monitor a given company. At block 2102, at regular intervals (e.g. daily), the data enablement platform executes external searches for the latest news regarding a given company, the industry of the given company, the competitors of the given company, the financials of the given company, etc. At block 2103, the external search results are stored in memory. At block 2104, the data enablement platform executed internal searches for the given company. At block 2105, these internal search results are stored. At block 2106, the data enablement platform compares the external search results with the internal search results to determine if they affect each other. For example, the data enablement platform determines if there are differences in the data or similarities in the data, or both. At block 2107, the data enablement platform applies NLP automatic summarization of the affected external search results, or the affected internal search results, or both. The summarization is outputted to the user device for visual display or audio feedback (block 2108). In this way, a user is informed of relevant news and why the news is relevant (e.g. affected internal data, opportunities, etc.).

In an example embodiment, the above methods in FIG. 20 or 21 are used to provide a bot, or chatbot, that provides a fast and easy way to consume news summaries (e.g. press releases, product and competitor reviews, financials, LinkedIn, Facebook fan page, etc.) for each specific sales opportunity and creates an opportunity score card using machine learning and other data science algorithms. This saves time and increases accuracy on new leads and renewal efforts.

Figure 22:
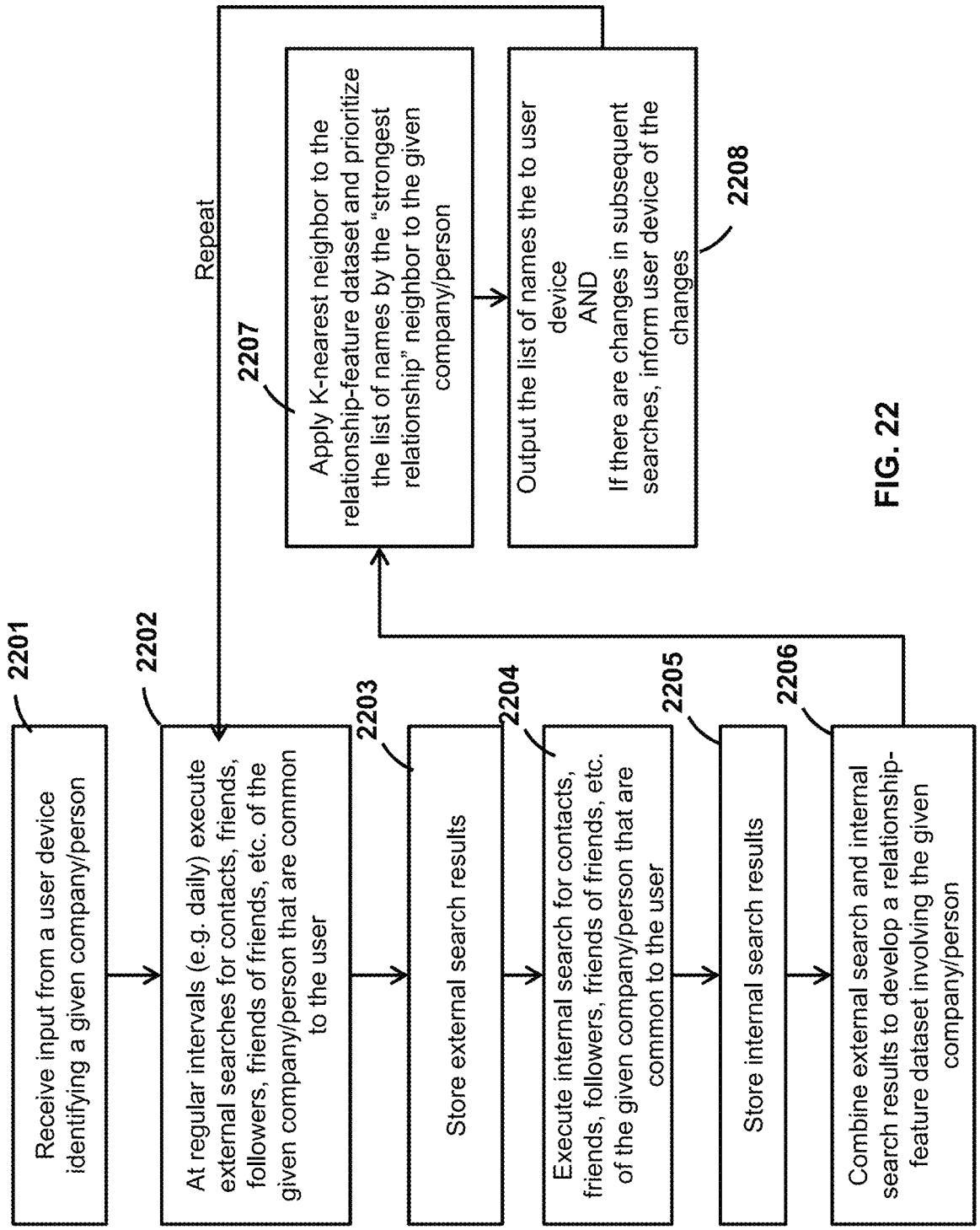
FIG. 22 is a flow diagram of example executable instructions for using the data enablement platform to identify one or more contacts people relevant to given company or person.

Turning to FIG. 22, example executable instructions are provided for using K-nearest neighbor computations to identify contacts that are considered close to a given company or given user, in relation to a sales opportunity.

Block 2201: Receive input from a user device identifying a given company/person.
Block 2202: At regular intervals (e.g. daily) execute external searches for contacts, friends, followers, friends of friends, etc. of the given company/person that are coming to the user.
Block 2203: Store external search results.
Block 2204: Execute internal search for contacts, friends, followers, friends of friends, etc. of the given company/person that are common to the user.
Block 2205: Store internal search results.
Block 2206: Combine external search and internal search results to develop a relationship-feature dataset involving the given company/person.
Block 2207: Apply K-nearest neighbor to the relationship-feature dataset and prioritize the list of names by the "strongest relationship" neighbor to the given.
Block 2208: Output the list of names to the user device, and if there are changes in subsequent searches, inform the user device of the changes.

In an example implementation of the above computing operations, the Warm Intro Bots is provided, which dynamically searches and presents a list of employees, friends, and acquaintances that the account representative needs to leverage in order to get a warm opportunity introduction and obtain respective opportunity insights using search and graph data science. Warm leads have higher close rates.

In another example aspect, the data enablement platform uses keywords, sentences, full conversations and hashtags to characterize the opportunity. The data enablement platform subsequently performs a search for existing internal opportunities so that one given salesperson does not spend time on the same opportunity being pursued by a peer salesperson.

Figure 23:
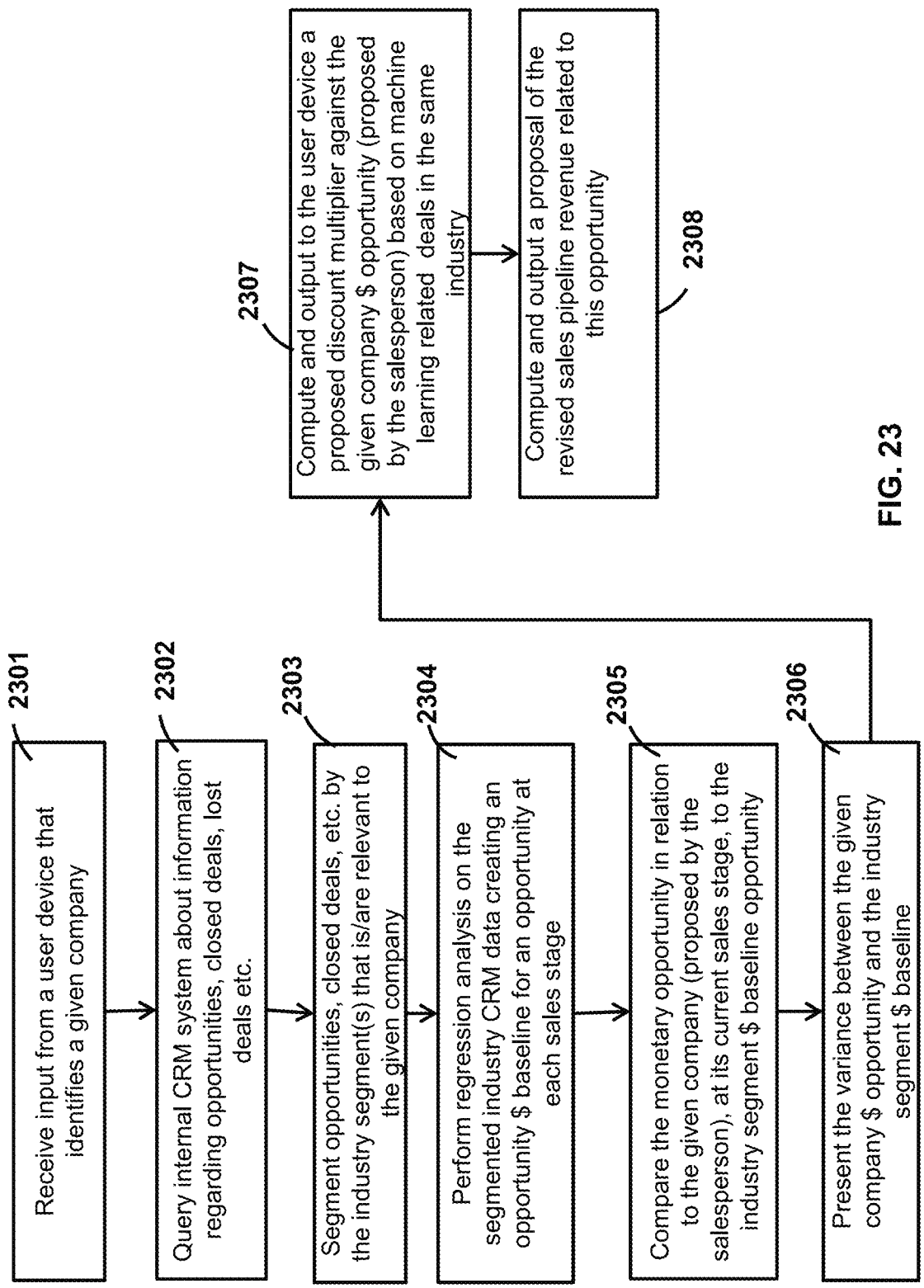
FIG. 23 is a flow diagram of example executable instructions for using the data enablement platform to provide business analytics.

Turning to FIG. 23, another example embodiment of executable instructions are provided for using regression analysis to determine an opportunity baseline in dollar value.

Block 2301: Receive input from a user device that identifies a given company.

Block 2302: Query internal CRM system about information regarding opportunities, closed deals, lost deals etc.

Block 2303: Segment opportunities, closed deals, etc. by the industry segment(s) that is/are relevant to the given company.

Block 2304: Perform regression analysis on the segmented industry CRM data creating an opportunity $ baseline for an opportunity at each sales stage.

Block 2305: Compare the monetary opportunity in relation to the given company (proposed by the salesperson), at its current sales stage, to the industry segment $ baseline opportunity.

Block 2306: Present the variance between the given company $ opportunity and the industry segment $ baseline.

Block 2307: Compute and output to the user device a proposed discount multiplier against the given company $ opportunity (proposed by the salesperson) based on machine learning related deals in the same industry.

Block 2308: Compute and output a proposal of the revised sales pipeline revenue related to this opportunity.

In an example embodiment, the computing operation in FIG. 23 are used by a chatbot to predict sales. In particular, the chatbot provides realistic (e.g. unbiased) and accurate sales pipeline numbers by account representative using use machine learning and data science algorithms. In another example aspect, the chatbot helps new sales people understand what is needed to be successful and create ideal hiring profiles.

Figure 24:
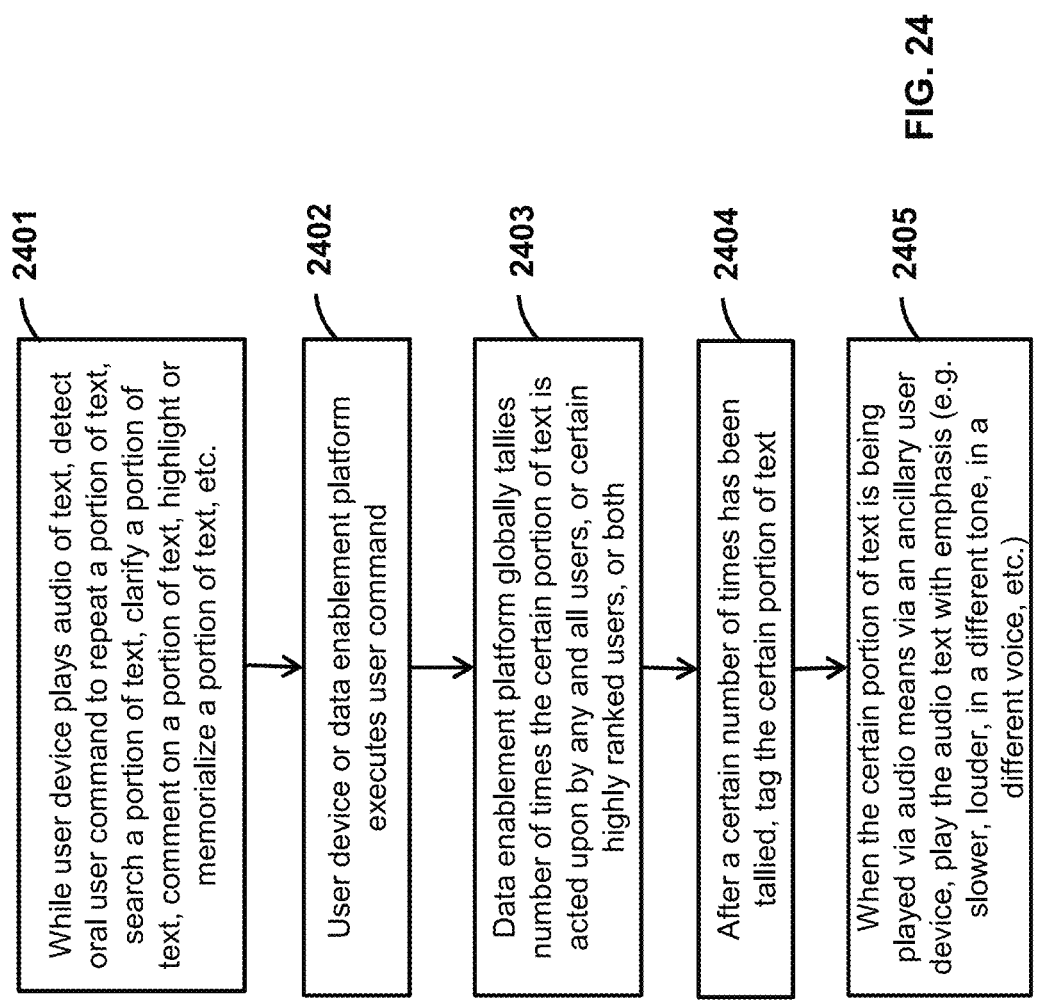
FIG. 24 is a flow diagram of example executable instructions for using the data enablement platform to modify the audio parameters of certain phrases and sentences.

Turning to FIG. 24, example executable instructions are provided for using dynamic searches to affect the way certain data is outputted at the user device.

Block 2401: While the user device plays audio of text, the user device detects a user's oral command to at least one of: repeat a portion of text, search a portion of text, clarify a portion of text, comment on a portion of text, highlight or memorialize a portion of text, etc.

Block 2402: The user device or the data enablement platform, or both, executes the user's command.

Block 2403: The data enablement platform globally tallies the number of times the certain portion of text is acted upon by any and all users, or certain highly ranked users, or both.

Block 2404: After a certain number of times has been counted, the data enablement platform tags the certain portion of text.

Block 2405: When the certain portion of text, which is tagged, is being played via audio means via an ancillary user device, the user device plays the audio text with emphasis (e.g. slower, louder, in a different tone, in a different voice, etc.). In other words, the data enablement platform has tagged the certain portion of the text and has performed an audio transformation on the certain portion of text.

Figure 25:
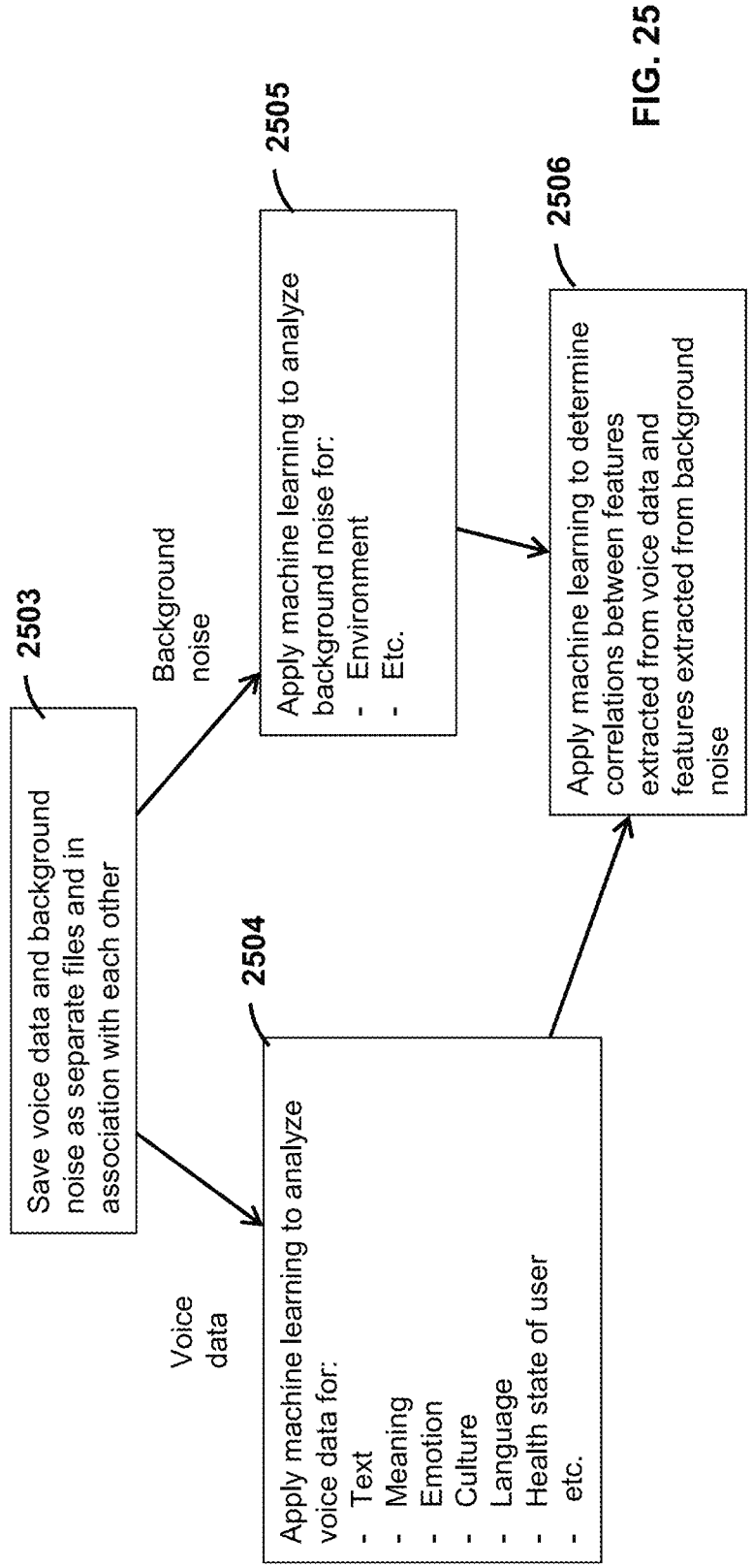
FIG. 25 is a flow diagram of example executable instructions for using the data enablement platform to extract data features from voice data and associated background noise.

Turning to FIG. 25, example executable instructions are provided for processing voice data and background noise.

Block 2501: The user device or the OCD records audio data, including voice data and background noise.

Block 2502: The data enablement platform applies audio processing to separate voice data from background noise.

Block 2503: The data enablement platform saves the voice data and the background noise as separate files and in association with each other.

Block 2504: The data enablement platform applies machine learning to analyze voice data for: text; meaning; emotion; culture; language; health state of user; etc.

Block 2505: The data enablement platform applies machine learning to analyze background noise for: environment, current activity engaged by user, etc.

Block 2506: The data enablement platform applies machine learning to determine correlations between features extracted from voice data and features extracted from background noise.

In this way, information about the user can be more accurately determined, such as their behavior and their surroundings. This in turn can be used provide sales opportunities that are better customized to the user.

Figure 26:
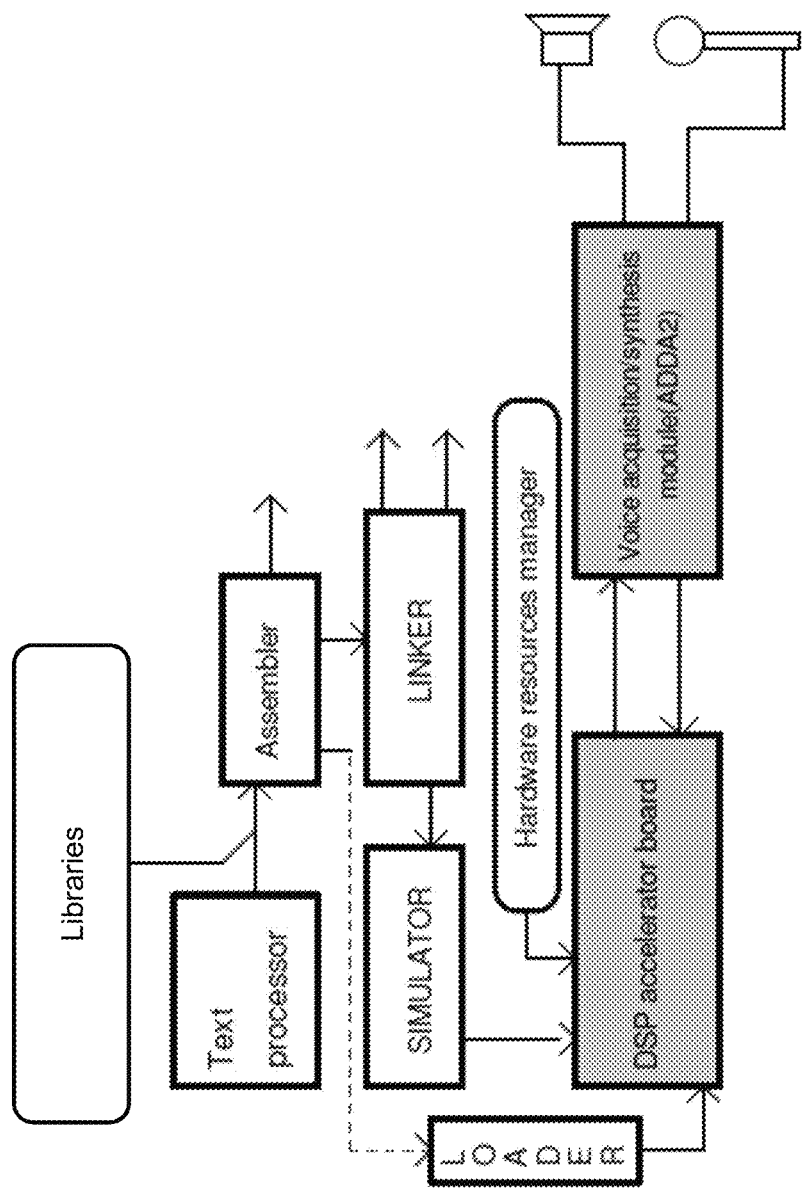
FIG. 26 is an example embodiment of a Digital Signal Processing (DSP)-based voice synthesizer.

In an example embodiment, the user device, including and not limited to the OCD, includes an onboard voice synthesizer to generate synthesized voices. Turning to FIG. 26, the onboard voice synthesizer is a Digital Signal Processing (DSP) based system that resides on the user device. It includes one or more voice libraries. It also includes a text processor, an assembler, a linker module, a simulator, a loader, a DSP accelerator module which is managed by a hardware resources manager, and a voice acquisition and synthesis module (e.g. an analog/digital converter and digital/analog converter). The voice acquisition and synthesis module is in data communication with a microphone and an audio speaker.

Figure 27:
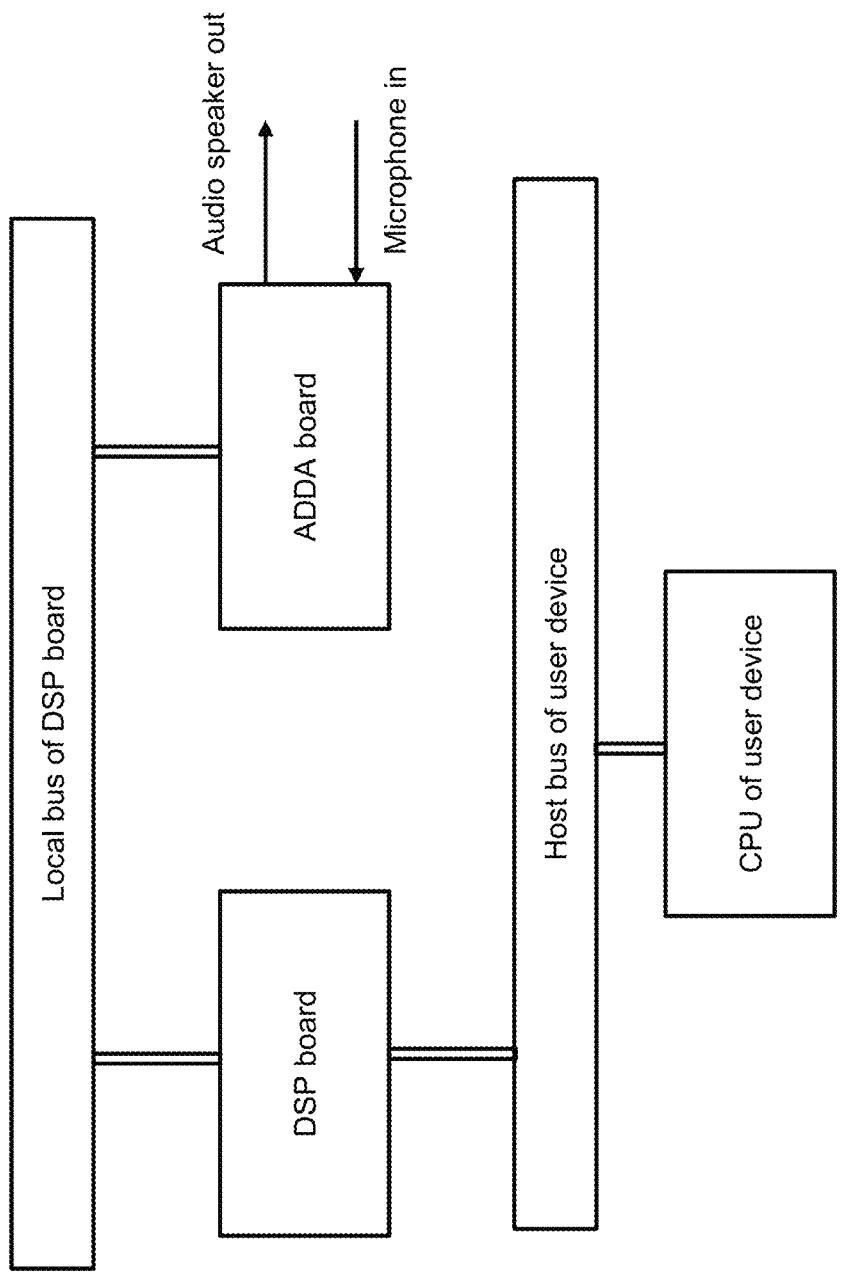
FIG. 27 is an example embodiment of a hardware system used by the DSP-based voice synthesizer.

FIG. 27 shows an example subset of components on a user device, which includes a DSP board/chip, an ADDA2 board/chip, a local bus of the DSP board, a host bus, and a CPU of the smart device. These components, for example, support the software architecture shown in FIG. 26.

It will be appreciated that different software and component architectures (i.e. different from the example architectures shown in FIGS. 26 and 27) in a user device can be used to facilitate outputting synthesized voice data.

Figure 28:
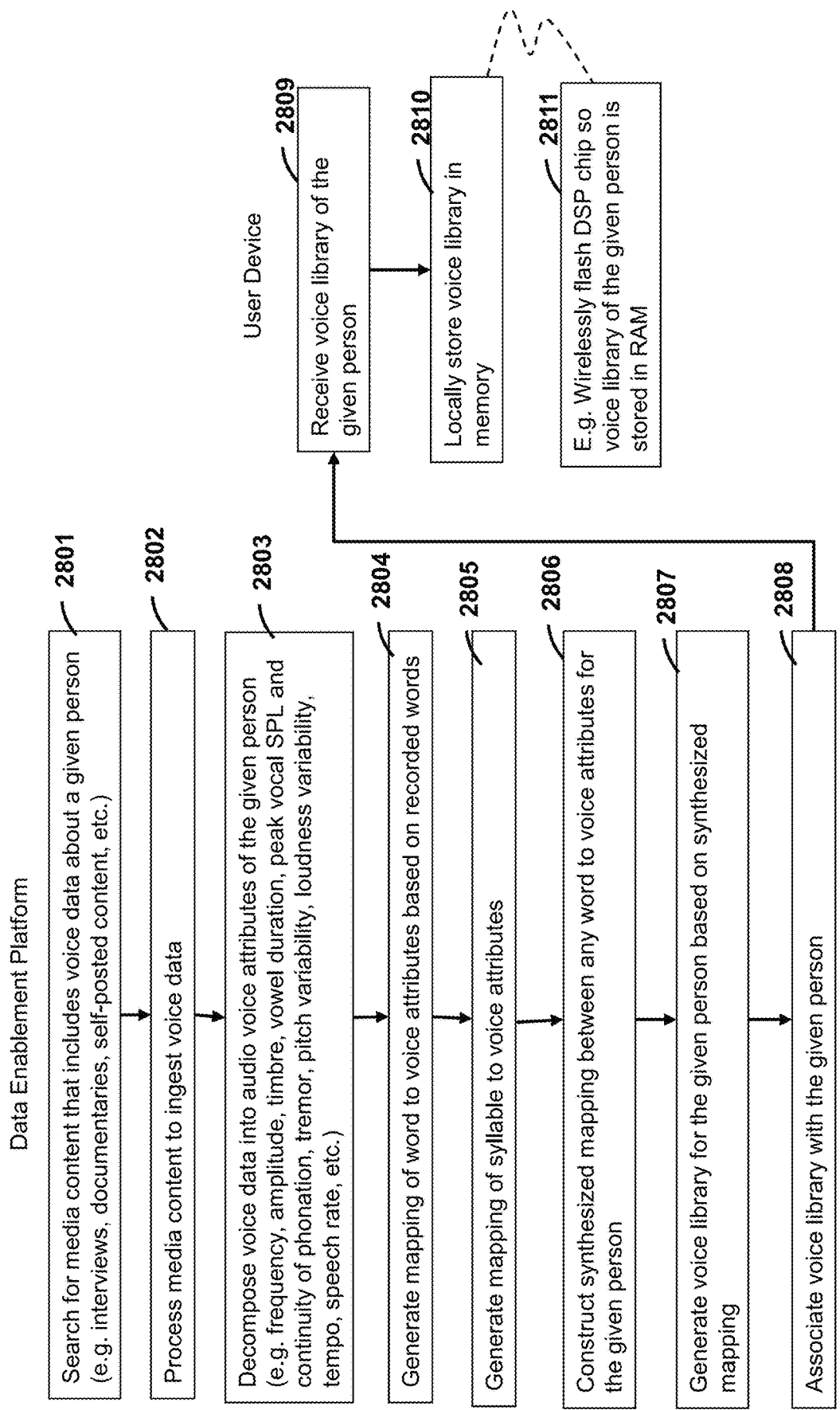
FIG. 28 is a flow diagram of example executable instructions for building a voice library of a given person.

Turning to FIG. 28, example executable instructions are provided for building a voice library.

Block 2801: The data enablement platform searches for media content that includes voice data about a given person (e.g. interviews, documentaries, self-posted content, etc.). Example data formats of media content with voice data include videos and audio-only media.

Block 2802: The data enablement platform processes the media content to ingest the voice data.

Block 2803: The data enablement platform decomposes the voice data into audio voice attributes of the given person. Examples of audio voice attributes include frequency, amplitude, timbre, vowel duration, peak vocal sound pressure level (SPL), continuity of phonation, tremor, pitch variability, loudness variability, tempo, speech rate, etc.

Block 2804: The data enablement platform generates a mapping of word to voice attributes based on the recorded words.

Block 2805: The data enablement platform generates a mapping of syllable to voice attributes.

Block 2806: The data enablement platform constructs a synthesized mapping between any word to voice attributes for the given person.

Block 2807: The data enablement platform generates a voice library for the given person based on synthesized mapping.

Block 2808: The data enablement platform associates the voice library with the given person.

Block 2809: The user device that belongs to the user receives the voice library of the given person.

Block 2810: The user device of locally stores the voice library in memory. For example, the system wirelessly flashes the DSP chip so that the voice library of the given person is stored in RAM on the smart device (block 2811). This data can also be stored in some other manner on the user device.

Figure 29:
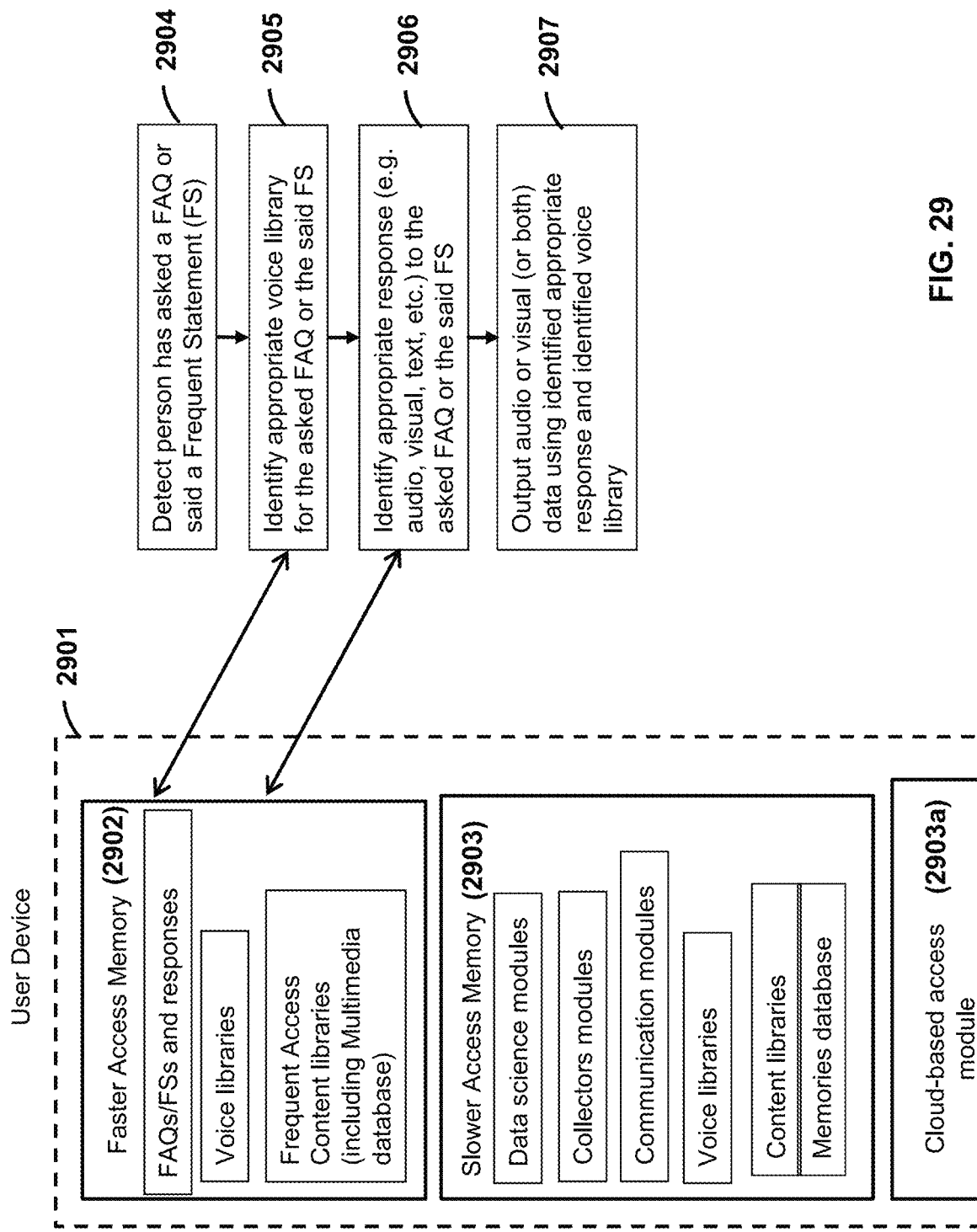
FIG. 29 is a flow diagram of example executable instructions for a smart device interacting with a user.

FIG. 29 shows an example of memory devices 2901 on a user device. The memory devices include faster access memory 2902 and slower access memory 2903. In one example embodiment, the faster access memory is RAM and the slower access memory is ROM. Other combinations of faster and slower memory devices can be used in alternative to RAM and ROM.

The faster access memory 2902 has stored on it, amongst other things, a library of frequently asked questions (FAQs) and frequent statements (FSs), and corresponding responses to these FAQs and FSs. The faster access memory also has stored on it voice libraries of persons who interact with the user, and a frequently accessed content libraries. These frequently accessed content libraries include multimedia. The information or content stored in memory 2902 provides local, edge, fast "hot" reacting content that is frequently needed, so that there is no need to go to the data enablement platform for same known-known data.

The slower access memory 2903 includes, amongst other things: data science modules, collectors modules, communication modules, other voice libraries, content libraries, and memories databases. The information or content stored in memory 2903 provides local, edge, fast "medium" reacting content that is needed, but not as frequently or immediately, so that there is no need to go to the data enablement platform for same known-known data.

Another data module called the cloud-based access module 2903*a* allows for the user device to interact with the data enablement platform to access content libraries. This is also called cloud "cold" reacting content that is relatively less frequently used.

Block 2904: The user device detects a user has asked a FAQ or said a FS.

Block 2905: The user device accesses the faster access memory 2902 and identifies an appropriate voice library for the asked FAQ or the said FS.

Block 2906: The user device accesses the faster access memory 2902 and identifies the appropriate response (e.g. audio, visual, text, etc.) to the asked FAQ or the said FS.

Block 2907: The user device outputs audio or visual (or both) data using the identified appropriate response and the identified voice library. In this way, responses to FAQs and FSs occur very quickly, or even in real time, so provide a conversation like experience.

Figure 30:
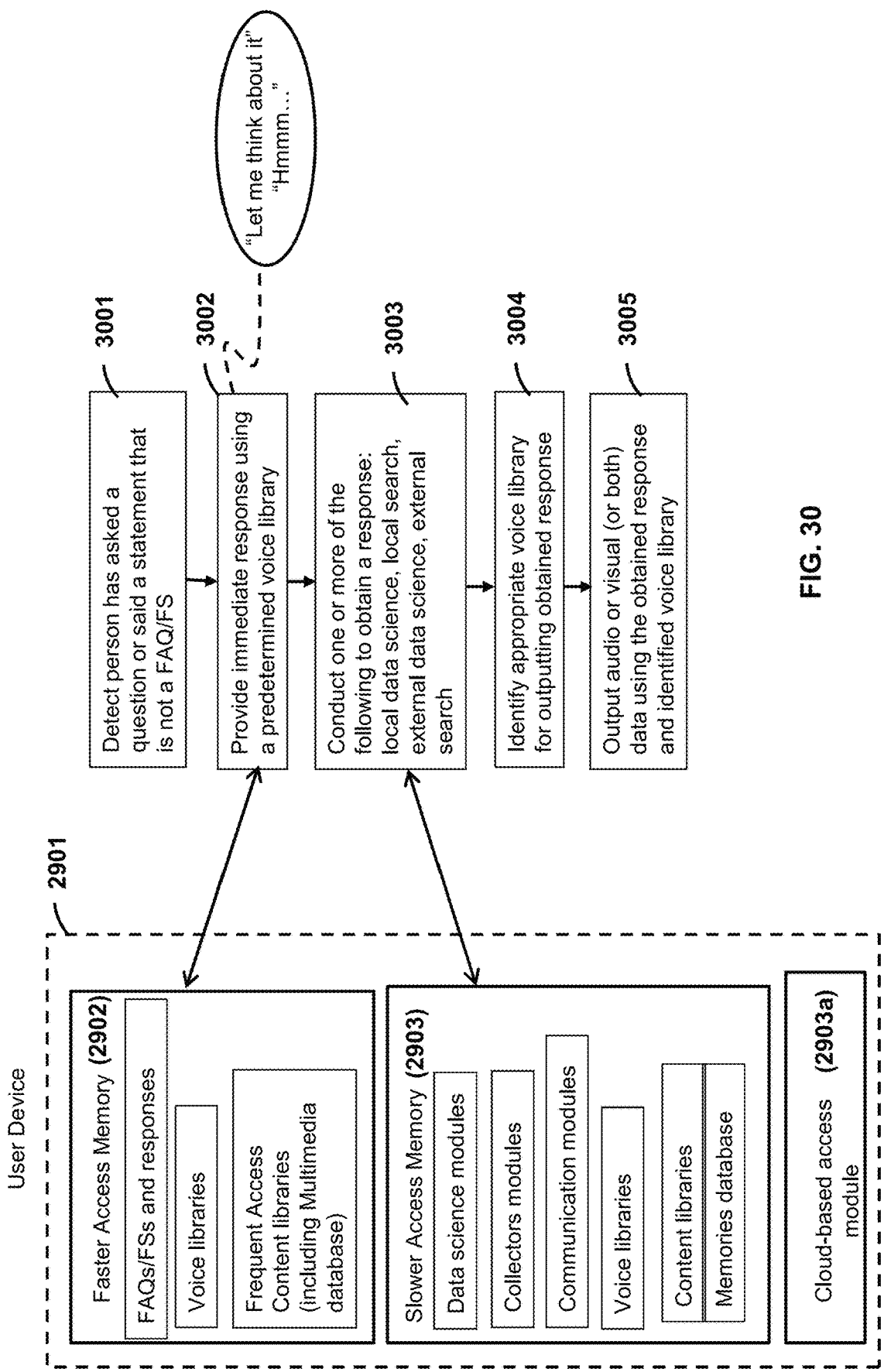
FIG. 30 is a flow diagram of example executable instructions for a smart device interacting with a user.

Turning to FIG. 30, another example set of executable instructions are executed by the smart device of the patient.

Block 3001: The user device detects the person has asked a question or said a statement that is not a FAQ/FS.

Block 3002: The user device provides an immediate response using a predetermined voice library. For example, the smart device says "Let me think about it" or "Hmmm". This response, for example, is preloaded into the faster access memory 2902 for immediate retrieval.

Block 3003: The user device conducts one or more of the following to obtain a response: local data science, local search, external data science, and external search. This operation, for example, includes accessing the slower access memory 2903.

Block 3004: The user device identifies an appropriate voice library for outputting the obtained response.

Block 3005: The user device outputs audio or visual (or both) data using the obtained response and identified voice library.

In this way, more complex algorithms are computed locally on the user device, either in part or in whole, while still providing an immediate response.

Figure 31:
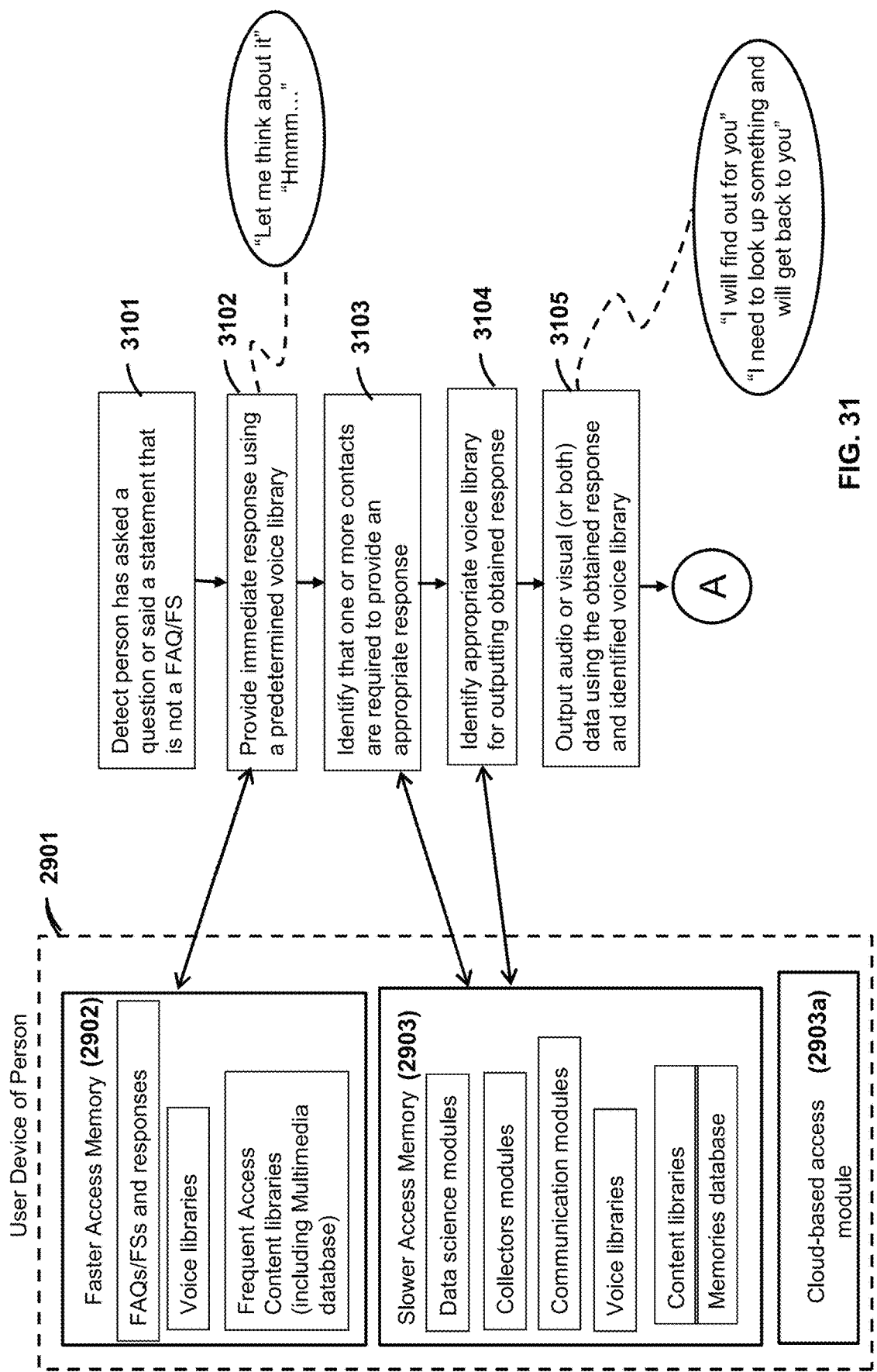
FIG. 31 is a flow diagram of example executable instructions for a smart device interacting with a user.
Figure 32:
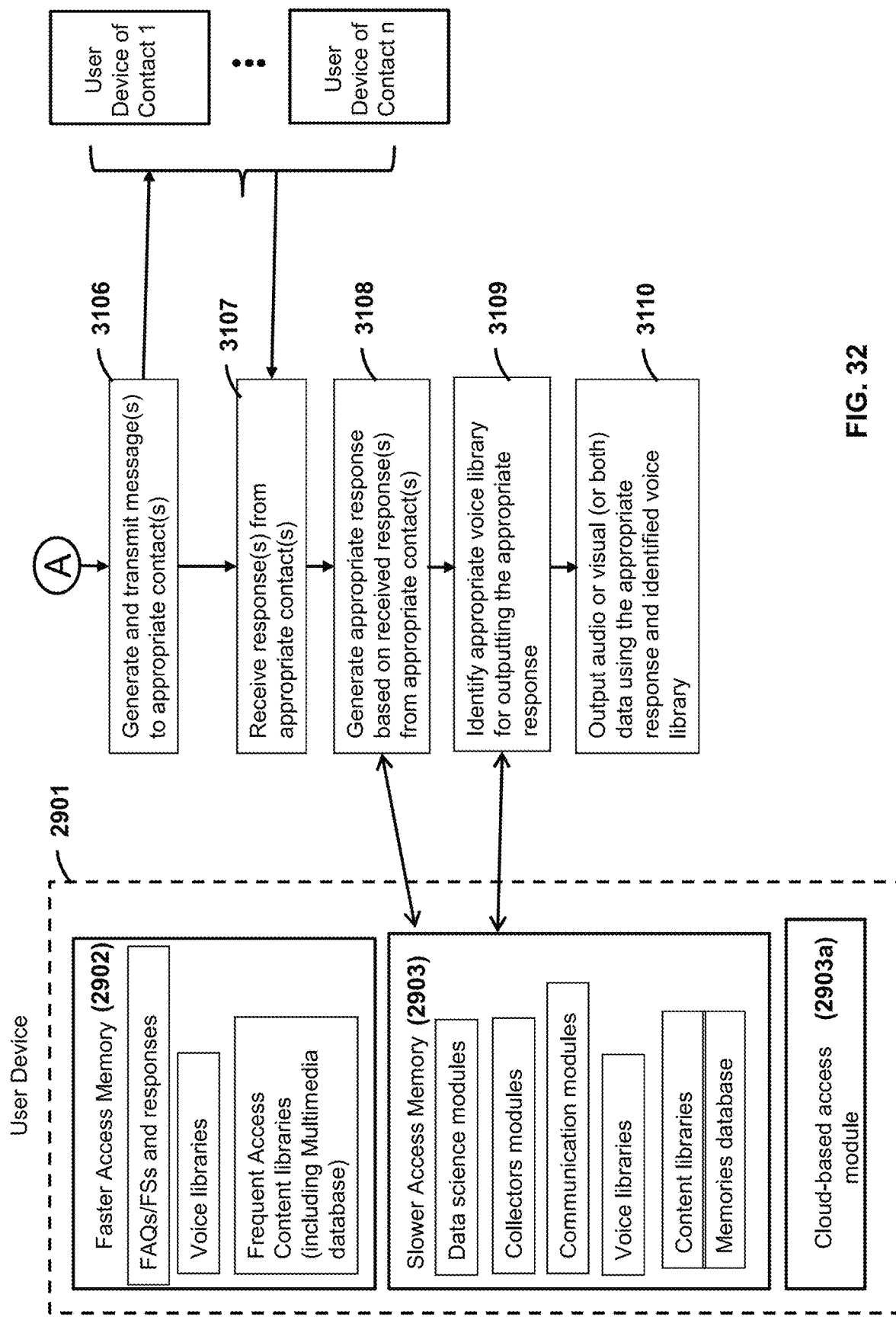
FIG. 32 is a flow diagram of example executable instructions for a smart device interacting with a user, which continues from the flow diagram in FIG. 31.

FIGS. 31 and 32 show another example embodiment of executable instructions executed by a user device of a user. If an answer to a user's question or statement is not known, then the user device initiates a message or communication session with a computing device belonging to a relevant contact of the user (e.g. a co-worker, a colleague, a friend, a client, a family member, a service provider, a contractor, etc.).

Block 3101: The user device detects that the user has asked a question or said a statement that is not a FAQ/FS.

Block 3102: The user device provides an immediate response using a predetermined voice library. For example, the smart device accesses the faster access memory 2902.

Block 3103: The user device identifies that one or more contacts are required to provide an appropriate response. For example, the user device accesses the slower access memory 3103 to obtain this information.

Block 3104: The user device identifies an appropriate voice library for outputting obtained response. For example, the user device accesses the slower access memory 3103 to obtain this information.

Block 3105: The user device outputs audio or visual (or both) data using the obtained response and identified voice library. For example, the smart device says: "I will find out for you" or "I need to look up something and will get back to you".

Block 3106: The user device generates and transmits message(s) to appropriate contact(s).

The one or more user devices of the contact then receive responses from the contacts. For example, the contact receives a text message, phone call, video call, etc. in relation to the message from the user device of the patient, and Block 3107: The user device receives response(s) from appropriate contact(s).

Block 3108: The user device generates appropriate response based on received response(s) from appropriate contact(s).

Block 3109: The user device identifies the appropriate voice library for outputting the appropriate response.

Block 3110: The user device outputs audio or visual (or both) data using the appropriate response and identified voice library.

In this way, the response from the one or more contacts are relayed back to the user device of the user.

Figure 33:
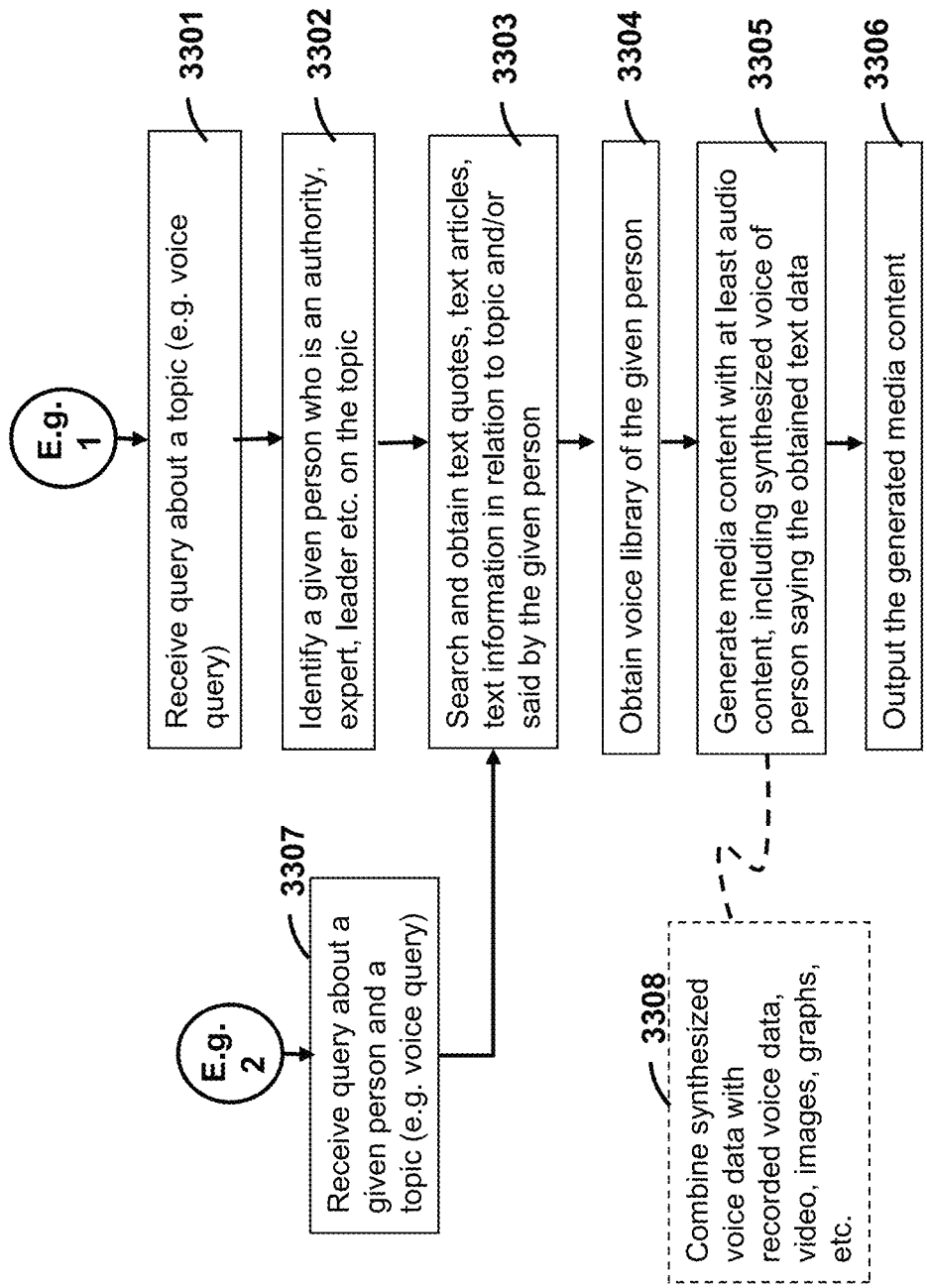
FIG. 33 is a flow diagram of example executable instructions for a smart device interacting with a user in relation to a given topic and using a synthesized voice of a given person.

Turning to FIG. 33, example executable instructions are provided for outputting media content that includes synthesized voice content.

For example, a user asks "Tell me about Tesla's car production". The data enablement application identifies that Elon Musk is a related authority on this topic, finds the related content (e.g. text content, audio, video, etc.), and uses Elon Musk's synthesized voice to explain Tesla's car production. For example, a chat bot using Elon Musk's synthesized voice says "Hello, I'm Elon Musk. Tesla's car manufacturing plants are located in . . . ".

In another example, a user asks "What does Bill Gates know about Alzheimers?". The data enablement application does a search for content (e.g. text content, audio, video, etc.) of Bill Gates in relation to Alzheimer disease, and uses Bill Gate's synthesized voice to explain his involvement with Alzheimer disease. For example, a chat bot using Bill Gate's synthesized voice says "Hello, I'm Bill Gates. I am involved in funding research for detecting Alzheimer disease . . . ".

In a first example embodiment in FIG. 33, the process starts with block 3301.

Block 3301: Receive query about a topic (e.g. voice query)

Block 3302: Identify a given person who is an authority, expert, leader etc. on the topic Block 3303: Search and obtain text quotes, text articles, text information in relation to topic and/or said by the given person Block 3304: Obtain voice library of the given person Block 3305: Generate media content with at least audio content, including synthesized voice of person saying the obtained text data Block 3306: Output the generated media content In a second example embodiment, the process starts at block 3307 and continues from block 3307 to block 3303, then block 3304 and so forth.

Block 3307: Receive query about a given person and a topic (e.g. voice query)

In an example aspect of block 3305, the data enablement platform combines the synthesized voice data with recorded voice data, video, images, graphs, etc. (block 3308). In other words, the generated media content includes multiple types of media.

Figure 34:
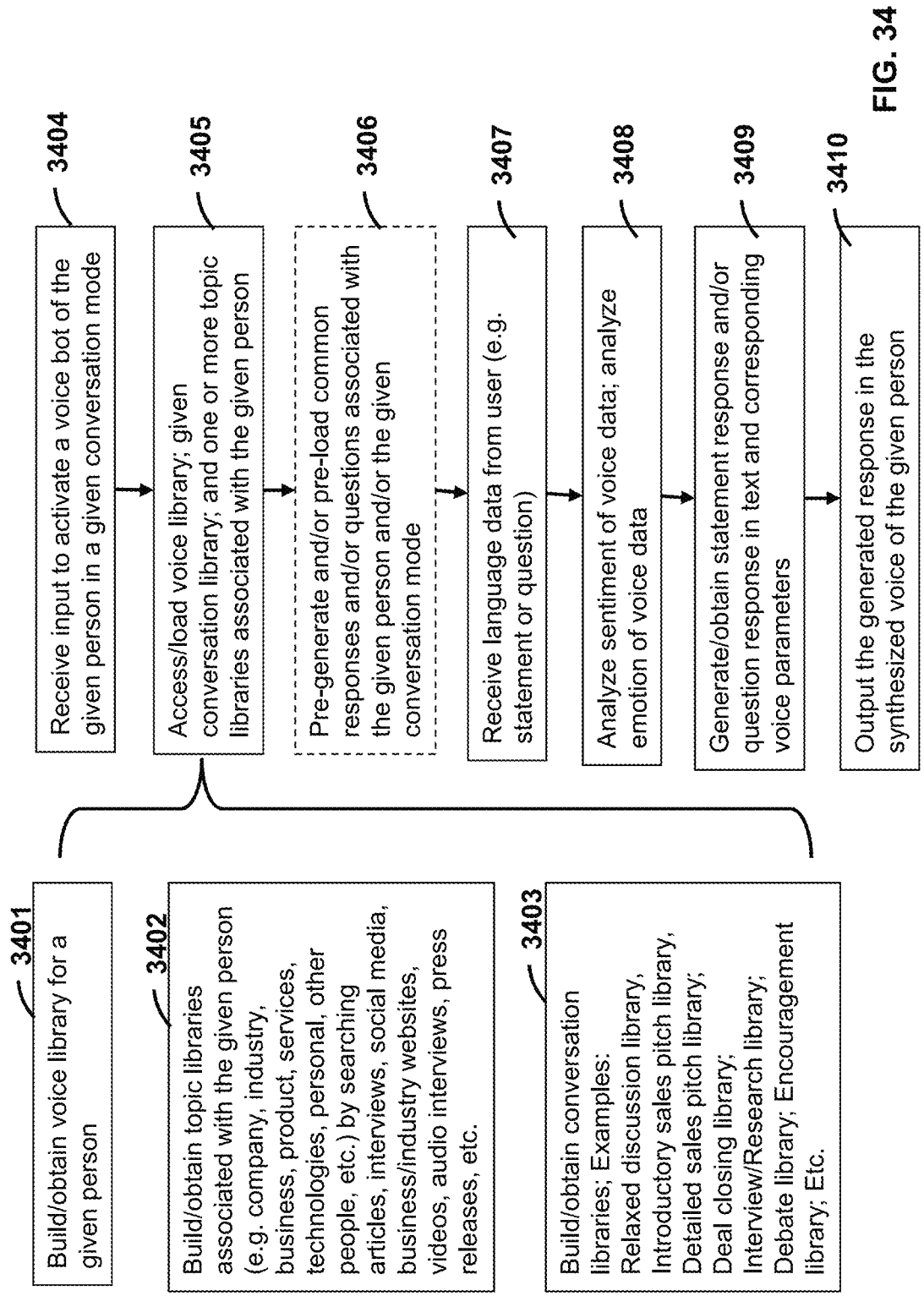
FIG. 34 is a flow diagram of example executable instructions for a smart device interacting with a user in relation to a given conversation mode and using a synthesized voice of a given person.

Turning to FIG. 34, an example embodiment is provided for a user to initiate a chat bot (e.g. a synthesized voice bot) of a given person in a given conversation mode. A conversation mode herein refers to a set of parameters that affect the voice attributes and type of response or questions that are used with a given voice bot. For example, a voice bot of a Bill Gates can be used with a first conversation mode in one example implementation; the voice bot of Bill Gates can be used with a second conversation mode is another implementation; a voice bot of Elon Musk can be used with the first conversation mode in another implementation; and the voice bot of Elon Musk can be used with the second conversation mode in another implementation. In other words, different voice bots can be paired with different conversation modes, and vice versa.

In an example embodiment, a conversation mode includes one or more the following parameters: tone; frequency (e.g. also called timbre); loudness; rate at which a word or phrase is said (e.g. also called tempo); phonetic pronunciation; lexicon (e.g. choice of words); syntax (e.g. choice of sentence structure); articulation (e.g. clarity of pronunciation); rhythm (e.g. patterns of long and short syllables); melody (e.g. ups and downs in voice); phrases; questions; and amount of detail given in a question or a statement. In an example embodiment, multiple conversation libraries store the parameters that define each conversation mode.

In FIG. 34, the data enablement system builds or obtains various libraries, as per blocks 3401, 3402, 3403.

At block 3401, the data enablement system builds or obtains a voice library for a given person.

At block 3402, the data enablement system builds or obtains topic libraries associated with the given person by searching articles, interviews, social media, business/industry websites, videos, audio interviews, press releases, etc.

Non-limiting examples of topics include company, industry, business, product, services, technologies, personal, other people, etc.

Block 3402, the data enablement system builds or obtains conversation libraries that respectively correspond to different parameters of different conversation modes. Non-limiting examples of conversation libraries include one or more of: Relaxed discussion library; Introductory sales pitch library; Detailed sales pitch library; Deal closing library; Interview/Research library; Debate library; and Encouragement library.

It will be appreciated that these libraries are established before implementing the process in blocks 3404 to 3410.

Block 3404: Receive input to activate a voice bot of the given person in a given conversation mode.

Block 3405: Access/load the voice library of the given person, the given conversation library, and one or more topic libraries associated with the given person.

Block 3406: In an example embodiment, the data enablement platform pre-generate or pre-loads (or both) common responses or common questions (or both) associated with the given person or the given conversation mode (or both). For example, this can be pre-loaded into the user device for local access, or can be pre-loaded in a virtual machine on the data enablement platform that is interacting with the user device.

Block 3407: Receive voice data from user. For example, the user says a statement or asks a question.

Block 3408: Analyze the sentiment of the voice data. Analyze the emotion of the voice data.

Block 3409: Generate/obtain statement response and/or question response. The statement response or the question response (or both) is outputted in an intermediate form of text and corresponding voice parameters. This is determined by the given conversation library, the given topic library, and the given voice library.

Block 3410: Output the generated response in the synthesized voice of the given person.

For example, using the above process, a person can activate a voice bot of Bill Gates in a relaxed discussion conversation mode, and input the language data "Hi Bill, what do you think about vaccines?". A chat bot using Bill Gate's synthesized voice will then engage the user in a discussion about vaccines, based on data extracted from various data sources involving Bill Gates and vaccines. Bill Gate's synthesized voice will sound informative, relaxed and will also ask the user questions.

In another example, using the above process, a person can activate a voice bot of Elon Musk in an introductory sales pitch conversation mode, and input the language data "Hi Elon, there is this exciting new technology that can solve transportation problems." A chat bot using Elon Musk's synthesized voice will then engage the user as a potential investor and respond back with statements and questions like "What is potential market capitalization?"; "How does your technology provide a 10× improvement?"; and "It's an intriguing idea—tell me how this relates to Tesla, SpaceX or the Boring Company." Elon Musk's synthesized voice will sound inquisitive and critical, and the syntax content of the chat bot's responses will be inquisitive and critical.

Other example features of the devices, systems and the methods are provided below.

In an example embodiment, the devices, systems and the methods described herein help sales people and sales managers to more accurately screen, evaluate and value early stage sales opportunities.

In an example embodiment, the devices, systems and the methods described herein autonomously and updates information in real-time pertaining to early sales opportunities, including but not limited to: people and relationships related to the early stage sales opportunity; peers; friends; employees throughout organizations; salespersons organization; buy side people and organization; acquaintances; competition; competitor's recently released products and services; pricing and cost related to competitive products and services; substitute solutions; latest industry news; orthogonal news that could change the opportunity evaluation; financial news; global regional news; and government regulations and laws.

In an example embodiment, the devices, systems and the methods described herein autonomously capture early stage sales opportunities and autonomously update these opportunities through detailed information. This detailed information, for example, is also herein referred to as close-to-"perfect information", or "perfect information".

In an example embodiment, the devices, systems and the methods described herein autonomously predict and recommend what prioritized sales opportunities and prioritized tasks a salesperson should work, day by day, in order to achieve certain business metrics and goals.

In an example embodiment, the devices, systems and the methods described herein autonomously predicts and recommends which sales leads should be assigned to a specific salesperson based on a salespersons' experience, knowledge, historical track record, to name a few, in order to increase sales opportunity closure rate.

In an example embodiment, the devices, systems and the methods described herein autonomously evaluate salespeople.

In an example embodiment, the devices, systems and the methods described herein autonomously evaluate marketing efforts that provide early stage sales opportunities.

In an example embodiment, the system described herein includes machine learning software intelligence residing on a salesperson smartphone or the OCD, or both. The data enablement platform includes machine learning software that recognizes behaviors and patterns, and predicts behaviors and patterns, within and outside the salesperson's organization. The data enablement platform uses these recognized data features and predicted data features to make intelligent recommendations within the salesperson's organization.

In an example embodiment, the machine learning includes data science algorithms, and further includes co-computing alongside human interactions. In other words, human interactions with user devices, OCDs and other internal and external computing systems are used as inputs that are ingested by the data enablement platform. This helps to provide relevant results for the salesperson, salespersons' manager, and executives.

In an example embodiment, the data enablement platform performs autonomous actions on the salesperson's smartphone or OCD, or both, and the salesperson's organizational systems and apps. For example, these autonomous actions include making recommendations, automating sales people and sales manager tasks, and autonomously performing research that can impact an opportunity.

In an example embodiment, the data enablement platform ingests data from N number external data sources (e.g. global news, blogs, forums, social sites, industry blogs, financial sites, 3rd party proprietary sites and systems, etc.).

In an example embodiment, the data enablement platform ingests data from N number internal data sources within the salesperson's organization (CRM, ERP, HR, internal websites, proprietary systems, etc.).

In an example embodiment, the data enablement platform applies STRIPA data science including but not limited to algorithms, graph database, machine learning, AI, etc, against the internal and external data sources to surface, trend, infer, predict, and act. In particular, STRIPA computing operations are applied to existing, new, and changing information pertaining to an opportunity and generates a machine-learned based opportunity score.

In an example embodiment, the data enablement platform applies STRIPA data science during computer interactions with the salespeople, sales manager, and executives using AI based voice conversations. These computations accelerate and enable a computing system to capture opportunity information, in an oral fashion (e.g. via microphone devices). In an example implementation, the resulting data intelligence provides a holistic view of an opportunity at different perspectives, such as from the perspectives of a salesperson, a sales manager, and an executive. These computations also learn ad hoc information from any one or more of the salesperson, the sales manager and the executive regarding an opportunity in progress.

In an example embodiment, the data enablement platform applies STRIPA data science to, and during, interactions with the salespeople, sales managers, and executives using the AI based voice conversations to autonomously remind these people to take specific actions in order to increase the opportunity (e.g. opportunity closure rate, opportunity value, etc.).

In an example embodiment, the data enablement platform applies STRIPA data science to interact with the salespeople, sales managers, and executives using AI based voice conversations to create ad hoc opportunities that are too early to put into a traditional CRM system but that can lead to material opportunities automatically and without human intervention.

In an example embodiment, the data enablement platform applies STRIPA data science to interact with the salespeople, sales managers, and executives using AI based voice conversations to remind sales people to orally provide certain information in order to move an opportunity from one sales step to another sales step, for compliance purposes (e.g. as per internal policy).

In an example embodiment, the data enablement platform applies STRIPA data science to interact with the salespeople, sales managers, and executives using AI based voice conversations to update the salesperson with the latest news about an opportunity including but not limited to a new employee that has personal relationships at the opportunity, a new executive at the opportunity, a competitor's product or service that might impact the opportunity, etc.

In an example embodiment, the data enablement platform applies STRIPA data science to interact with the salespeople, sales managers, and executives using AI based voice conversations to follow company specific sales process compliance steps and rules.

In an example embodiment, the data enablement platform applies STRIPA data science to interact with the salespeople, sales managers, and executives using AI based voice conversations to learn each person's behaviors to consequently make recommendations to increase/optimize the effectiveness of a salesperson or a sales manager, or both.

In an example embodiment, the data enablement platform applies STRIPA data science to learn and autonomously give marketing leads to certain salespeople who have historically demonstrated (via STRIPA, machine learning, AI, etc.) a higher probability of closing an opportunity in a certain industry, function, company or solution characteristics, etc.

In an example embodiment, the data enablement platform uses some or all of the aforementioned operations and features in order to customize the solution for a sales organization. In other example embodiment, the data enablement platform is applied to other industries.

Additional general example embodiments and aspects are described below.

In an example embodiment, an oral computing device is provided, which includes a housing that holds at least: a memory device that stores thereon a data enablement application that includes a conversational bot and a user account ID, the user account ID used to access private databases; a microphone that is configured to record a user's spoken words as audio data; a processor configured to use the conversational bot to identify contextual data associated with the audio data, the contextual data including a current mode of the data enablement application and the user account ID; a data communication device configured to transmit the audio data and the contextual data via a data network and, in response, receive response data, wherein the response data is a function of data obtained from the private database and data obtained from external databases; and an audio speaker that is controlled by the processor to output the response data as audio response data.

In an example aspect, the oral computing device is a wearable device to dynamically interact with the data. For example, the wearable device includes inertial measurement sensors. In another example, the wearable device is a smart watch. In another example, the wearable device is a headset. In another example, the wearable device projects images to provide augmented reality.

In another example aspect, the oral computing device projects light images on surrounding surfaces to provide augmented reality of virtual reality. In another example aspect, the oral computing device is in data connection with other devices that projects light images to provide augmented reality or virtual reality in a room. In effect, people that are physically present in the room, or virtual people being displayed by the projected light images, simultaneously interact and collaborate with each other.

In an example aspect, the oral computing device includes a graphics processing unit (GPU) that exchanges data with the processor, the GPU configured to pre-process the audio data using parallel threaded computations to extract data features, and the data communication device transmits the extracted data features in association with the contextual data and the audio data.

In an example embodiment, the oral computing device is a user device 102 or the specific embodiment of the OCD 301.

In another general example embodiment, a data enablement system (also herein called the data enablement platform) is provided that includes cloud computing servers that ingest audio data originating from one or more user devices, the audio data comprising at least oral conversation of one or more users, and the cloud computing servers configured to apply machine learning computations to extract at least content and sentiment data features. The data enablement system also includes data science servers in data communication with the cloud computing servers, internal applications and databases, and an external artificial intelligence computing platform. The data science servers also include a library of data science algorithms used to process the content and sentiment features using internal data obtained from the internal applications and databases, and external data obtained from the external artificial intelligence computing platform. The data science servers output response data to the cloud computing servers, the response data being in response to the audio data. Subsequently, the cloud computing servers format the response data into an audio data format playable by a given user device, and transmit the formatted response data.

In another general example embodiment, a speech computing device comprises: a memory device that stores thereon at least a data enablement application that comprises multiple modules that correspond to different modes, a conversational bot and one or more synthesized voice libraries, wherein each of the one or more synthesized voice libraries comprise voice parameter features of one or more corresponding people; an input sensor that is configured to record a user's input as speech data; a processor configured to use the conversational bot to identify contextual data associated with the speech data, the contextual data including a current mode corresponding to a currently activated module of the data enablement application; and a data communication device configured to transmit the audio data and the contextual data via a data network and, in response, receive response data, wherein the response data comprises an indication of a given synthesized voice library, text data, and the current mode; the processor further configured to use the conversational bot to generate an audio response from the given synthesized voice library and the text data, and to propagate the text data to one or more other modules that are currently inactive; and an audio speaker that is controlled by the processor to output the audio response.

In an example aspect, the currently activated module is a meeting notes module; the speech data comprises a topic; and the text data comprises data in relation to the topic.

In a further example aspect, the computing device detects at least one of a pause or an end of a sentence in the speech data and then outputs the audio response.

In a further example aspect, the speech data and the text data is added to a meeting notes file.

In a further example aspect, the data communication device is in communication with at least one other user device, and the computing device further transmits additional data about the topic to the other user device within a same given time period as outputting the audio response.

In a further example aspect, the input sensor obtains public speech data, the computing device further receives private meeting notes, and the computing device further generates meeting notes that comprise the privates meeting notes and public notes derived from the public speech data and the text data in the response data.

In a further example aspect, the private notes and the public notes are organized by time of creation.

In a further example aspect, the data communication device is in communication with at least a silent communication device to obtain private speech data; and the computing device further generates the private meeting notes from the private speech data.

In a further example aspect, the computing system further comprises a visual display device, and the response data further includes visual data that is outputted with the audio response.

In a further example aspect, the visual display device is a projector.

In a further example aspect, the speech data comprises a topic; and the text data comprises a summarization of multiple news articles in relation to the topic.

In a further example aspect, the currently activated module is an introductions module associated with a social network platform of the user; the speech data comprises a topic or an entity; and the text data comprises a list of names obtained from the social network platform that are related to the topic or the entity.

In a further example aspect, the multiple modules comprise a to-do list module, an opportunities module, an introductions module, a meeting notes module and a new module; and wherein the currently activated of the multiple modules propagates the text data to at least two or more of the other ones of the multiple modules.

In a further example aspect, the memory device further stores conversation libraries that include one or more parameters that are used by the conversational bot to affect the audio response; and the parameters comprise one or more of: tone; frequency; loudness; rate at which a word or phrase is said; phonetic pronunciation; lexicon; syntax; articulation; rhythm; melody; phrases; and questions.

In a further example aspect, the speech data comprises a topic; and the indication of the given synthesized voice library is associated with a person that is an authority or an expert of the topic.

In a further example aspect, the speech data comprises a topic and a name of a person; the indication of the given synthesized voice library is associated with the person; and the text data is in relation to both the topic and the person.

In a further example aspect, the computing device includes a graphics processing unit (GPU) that exchanges data with the processor, the GPU configured to pre-process the audio data using parallel threaded computations to extract data features, and the data communication device transmits the extracted data features in association with the contextual data and the audio data.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The GUIs and screen shots described herein are just for example. There may be variations to the graphical and interactive elements according to the principles described herein. For example, such elements can be positioned in different places, or added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A speech computing device comprising a housing that holds at least:
   a memory device that stores thereon at least a data enablement application that comprises multiple modules that correspond to different modes, a conversational bot and one or more synthesized voice libraries, wherein each of the one or more synthesized voice libraries comprise voice parameter features of one or more corresponding people;
   an input sensor that is configured to record a user's input as speech data;
   a processor configured to use the conversational bot to identify contextual data associated with the speech data, the contextual data including a current mode corresponding to a currently activated module of the data enablement application;
   a data communication device configured to transmit the audio data and the contextual data via a data network and, in response, receive response data, wherein the response data comprises an indication of a given synthesized voice library, text data, and the current mode;
   the processor further configured to use the conversational bot to generate an audio response from the given synthesized voice library and the text data, and to propagate the text data to one or more other modules that are currently inactive; and
   an audio speaker that is controlled by the processor to output the audio response.

2. The computing device of claim 1 wherein the currently activated module is a meeting notes module; the speech data comprises a topic; and the text data comprises data in relation to the topic.

3. The computing device of claim 2 wherein the computing device detects at least one of a pause or an end of a sentence in the speech data and then outputs the audio response.

4. The computing device of claim 2 wherein the speech data and the text data is added to a meeting notes file.

5. The computing device of claim 2 wherein the data communication device is communication with at least one other user device, and the computing device further transmits additional data about the topic to the other user device within a same given time period as outputting the audio response.

6. The computing device of claim 2 wherein the input sensor obtains public speech data, the computing device further receives private meeting notes, and the computing device further generates meeting notes that comprise the privates meeting notes and public notes derived from the public speech data and the text data in the response data.

7. The computing device of claim 6 wherein the private notes and the public notes are organized by time of creation.

8. The computing device of claim 6 wherein the data communication device is in communication with at least a silent communication device to obtain private speech data; and the computing device further generates the private meeting notes from the private speech data.

9. The computing device of claim 1 further comprising a visual display device, and the response data further includes visual data that is outputted with the audio response.

10. The computing device of claim 9 wherein the visual display device is a projector.

11. The computing device of claim 1 wherein the speech data comprises a topic; and the text data comprises a summarization of multiple news articles in relation to the topic.

12. The computing device of claim 1 wherein the currently activated module is an introductions module associated with a social network platform of the user; the speech data comprises a topic or an entity; and the text data comprises a list of names obtained from the social network platform that are related to the topic or the entity.

13. The computing device of claim 1 wherein the multiple modules comprise a to-do list module, an opportunities module, an introductions module, a meeting notes module and a new module; and wherein the currently activated of the multiple modules propagates the text data to at least two or more of the other ones of the multiple modules.

14. The computing device of claim 1 wherein the memory device further stores conversation libraries that include one or more parameters that are used by the conversational bot to affect the audio response; and the parameters comprise one or more of: tone; frequency; loudness; rate at which a word or phrase is said; phonetic pronunciation; lexicon; syntax; articulation; rhythm; melody; phrases; and questions.

15. The computing device of claim 1 wherein the speech data comprises a topic; and the indication of the given synthesized voice library is associated with a person that is an authority or an expert of the topic.

16. The computing device of claim 1 wherein the speech data comprises a topic and a name of a person; the indication of the given synthesized voice library is associated with the person; and the text data is in relation to both the topic and the person.

17. The computing device of claim 1 further comprising a graphics processing unit (GPU) that exchanges data with the processor, the GPU configured to pre-process the audio data using parallel threaded computations to extract data features, and the data communication device transmits the extracted data features in association with the contextual data and the audio data.

* * * * *